United States Patent
Addepalli et al.

(10) Patent No.: US 9,654,937 B2
(45) Date of Patent: May 16, 2017

(54) SYSTEM AND METHOD FOR ROUTING, MOBILITY, APPLICATION SERVICES, DISCOVERY, AND SENSING IN A VEHICULAR NETWORK ENVIRONMENT

(71) Applicant: CISCO TECHNOLOGY, INC., San Jose, CA (US)

(72) Inventors: Sateesh K. Addepalli, San Jose, CA (US); Raghuram S. Sudhaakar, Sunnyvale, CA (US); Lillian Lei Dai, Rockville, MD (US); Vina Ermagan, San Jose, CA (US); Preethi Natarajan, Los Gatos, CA (US); Kevin C. Lee, San Jose, CA (US); Pere Monclus, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/664,101

(22) Filed: Mar. 20, 2015

(65) Prior Publication Data
US 2015/0264554 A1  Sep. 17, 2015

Related U.S. Application Data

(62) Division of application No. 13/118,220, filed on May 27, 2011, now Pat. No. 9,036,509.
(Continued)

(51) Int. Cl.
*H04L 12/16* (2006.01)
*H04W 4/04* (2009.01)
(Continued)

(52) U.S. Cl.
CPC .......... *H04W 4/046* (2013.01); *B60R 16/023* (2013.01); *B60W 50/10* (2013.01); *G06F 3/017* (2013.01);
(Continued)

(58) Field of Classification Search
None
See application file for complete search history.

(56) References Cited

U.S. PATENT DOCUMENTS

| 5,428,666 A | 6/1995 | Fyfe et al. |
| 5,604,787 A | 2/1997 | Kotzin et al. |

(Continued)

FOREIGN PATENT DOCUMENTS

| DE | 10146664 A1 | 2/2003 |
| EP | 1337119 A | 8/2003 |

(Continued)

OTHER PUBLICATIONS

"Cisco Mobile Network Solutions for Commercial Transit Agencies," Cisco.com, © 2008 Cisco Systems, Inc., Aug. 2008, 8 pages http://www.cisco.com/en/US/prod/collateral/routers/ps272/white_paper_c11-4921115.html.
(Continued)

*Primary Examiner* — Nicholas Sloms
(74) *Attorney, Agent, or Firm* — Patent Capital Group

(57) ABSTRACT

A method includes selecting a path for routing a data packet from a source node to a destination node in a vehicular ad hoc network, storing the data packet if the selected path is identified as a dead end, and establishing a communication link with a first node. The method also includes forwarding the data packet to the first node if a first distance between the first node and the destination node is less than a second distance between the source node and the destination node. More specific embodiments include sending a query for location information of the destination node, receiving the location information including two or more available paths from the source node to the destination node, and determining the path for routing the data packet is an optimal path of the two or more available paths.

17 Claims, 42 Drawing Sheets

Related U.S. Application Data

(60) Provisional application No. 61/433,138, filed on Jan. 14, 2011.

(51) Int. Cl.

| | | |
|---|---|---|
| *H04W 72/04* | (2009.01) | |
| *H04W 28/06* | (2009.01) | |
| *H04W 52/12* | (2009.01) | |
| *G06F 9/54* | (2006.01) | |
| *H04W 48/06* | (2009.01) | |
| *H04W 48/18* | (2009.01) | |
| *B60W 50/10* | (2012.01) | |
| *G06F 3/01* | (2006.01) | |
| *G06F 3/16* | (2006.01) | |
| *H04L 12/26* | (2006.01) | |
| *H04L 29/06* | (2006.01) | |
| *H04W 12/08* | (2009.01) | |
| *G06F 21/45* | (2013.01) | |
| *H04W 12/06* | (2009.01) | |
| *H04W 28/02* | (2009.01) | |
| *H04W 40/20* | (2009.01) | |
| *H04W 48/02* | (2009.01) | |
| *H04L 29/08* | (2006.01) | |
| *B60R 16/023* | (2006.01) | |
| *H04L 12/721* | (2013.01) | |
| *H04L 29/12* | (2006.01) | |
| *H04W 8/06* | (2009.01) | |
| *H04W 8/08* | (2009.01) | |
| *H04W 8/26* | (2009.01) | |
| *H04W 40/02* | (2009.01) | |
| *H04L 1/00* | (2006.01) | |
| *H04W 4/00* | (2009.01) | |
| *H04W 4/10* | (2009.01) | |
| *H04W 12/02* | (2009.01) | |
| *H04W 12/04* | (2009.01) | |
| *H04W 76/00* | (2009.01) | |
| *H04W 80/02* | (2009.01) | |
| *H04W 84/00* | (2009.01) | |
| *H04W 36/08* | (2009.01) | |
| *H04W 52/14* | (2009.01) | |
| *H04W 52/22* | (2009.01) | |
| *H04W 52/24* | (2009.01) | |
| *H04W 52/34* | (2009.01) | |
| *H04W 84/12* | (2009.01) | |
| *H04W 92/18* | (2009.01) | |

(52) U.S. Cl.
CPC ............. *G06F 3/167* (2013.01); *G06F 9/542* (2013.01); *G06F 21/45* (2013.01); *H04L 1/008* (2013.01); *H04L 12/266* (2013.01); *H04L 29/06578* (2013.01); *H04L 43/0811* (2013.01); *H04L 43/0876* (2013.01); *H04L 45/12* (2013.01); *H04L 61/2592* (2013.01); *H04L 63/08* (2013.01); *H04L 63/107* (2013.01); *H04L 67/12* (2013.01); *H04L 67/32* (2013.01); *H04L 69/18* (2013.01); *H04W 4/00* (2013.01); *H04W 4/10* (2013.01); *H04W 8/06* (2013.01); *H04W 8/08* (2013.01); *H04W 8/26* (2013.01); *H04W 12/02* (2013.01); *H04W 12/04* (2013.01); *H04W 12/06* (2013.01); *H04W 12/08* (2013.01); *H04W 28/0215* (2013.01); *H04W 28/06* (2013.01); *H04W 40/02* (2013.01); *H04W 40/20* (2013.01); *H04W 48/02* (2013.01); *H04W 48/06* (2013.01); *H04W 48/18* (2013.01); *H04W 52/12* (2013.01); *H04W 72/0406* (2013.01); *H04W 72/0493* (2013.01); *H04W 76/005* (2013.01); *H04W 80/02* (2013.01); *H04W 36/08* (2013.01); *H04W 52/143* (2013.01); *H04W 52/225* (2013.01); *H04W 52/241* (2013.01); *H04W 52/346* (2013.01); *H04W 72/042* (2013.01); *H04W 84/005* (2013.01); *H04W 84/12* (2013.01); *H04W 92/18* (2013.01)

(56) References Cited

U.S. PATENT DOCUMENTS

| | | |
|---|---|---|
| 5,737,215 A | 4/1998 | Schricker et al. |
| 5,763,862 A | 6/1998 | Jachimowicz et al. |
| 5,933,773 A | 8/1999 | Barvesten |
| 5,987,325 A | 11/1999 | Tayloe |
| 6,002,929 A | 12/1999 | Bishop et al. |
| 6,078,652 A | 6/2000 | Barak |
| 6,169,387 B1 | 1/2001 | Kaib |
| 6,175,789 B1 | 1/2001 | Beckert et al. |
| 6,285,869 B1 | 9/2001 | Shannon et al. |
| 6,320,351 B1 | 11/2001 | Ng et al. |
| 6,427,072 B1 | 7/2002 | Reichelt |
| 6,427,073 B1 | 7/2002 | Kortesalmi et al. |
| 6,484,082 B1 | 11/2002 | Millsap et al. |
| 6,490,679 B1 | 12/2002 | Tumblin et al. |
| 6,516,357 B1 | 2/2003 | Hamann et al. |
| 6,526,272 B1 | 2/2003 | Bansal et al. |
| 6,542,071 B1 | 4/2003 | Ohtsubo et al. |
| 6,574,734 B1 | 6/2003 | Colson et al. |
| 6,587,127 B1 | 7/2003 | Leeke et al. |
| 6,604,140 B1 | 8/2003 | Beck et al. |
| 6,643,504 B1 | 11/2003 | Chow et al. |
| 6,668,179 B2 | 12/2003 | Jiang |
| 6,714,799 B1 | 3/2004 | Park et al. |
| 6,721,580 B1 | 4/2004 | Moon |
| 6,735,506 B2 | 5/2004 | Breed et al. |
| 6,757,262 B1 | 6/2004 | Weisshaar et al. |
| 6,823,244 B2 | 11/2004 | Breed |
| 6,868,282 B2 | 3/2005 | Carlsson |
| 6,914,517 B2 | 7/2005 | Kinsella |
| 6,925,425 B2 | 8/2005 | Remboski et al. |
| 6,928,299 B1 | 8/2005 | Rinne et al. |
| 6,934,391 B1 | 8/2005 | Linkola et al. |
| 6,957,199 B1 | 10/2005 | Fisher |
| 6,980,830 B2 | 12/2005 | Ahonen |
| 7,039,221 B1 | 5/2006 | Tumey et al. |
| 7,050,897 B2 | 5/2006 | Breed et al. |
| 7,064,711 B2 | 6/2006 | Strickland et al. |
| 7,069,144 B2 | 6/2006 | Yoshihara et al. |
| 7,082,359 B2 | 7/2006 | Breed |
| 7,096,316 B1 | 8/2006 | Karr et al. |
| 7,171,460 B2 | 1/2007 | Kalavade et al. |
| 7,178,724 B2 | 2/2007 | Tamagno et al. |
| 7,185,161 B2 | 2/2007 | Kang |
| 7,218,930 B2 | 5/2007 | Ko et al. |
| 7,222,783 B2 | 5/2007 | Merrien |
| 7,259,469 B2 | 8/2007 | Brummett et al. |
| 7,363,056 B2 | 4/2008 | Faisy |
| 7,389,178 B2 | 6/2008 | Raz et al. |
| 7,412,313 B2 | 8/2008 | Isaac |
| 7,412,380 B1 | 8/2008 | Avendano et al. |
| 7,558,110 B2 | 7/2009 | Mizushima et al. |
| 7,564,842 B2 | 7/2009 | Callaway et al. |
| 7,593,605 B2 | 9/2009 | King et al. |
| 7,603,107 B2 | 10/2009 | Ratert et al. |
| 7,606,643 B2 | 10/2009 | Hunt et al. |
| 7,630,802 B2 | 12/2009 | Breed |
| 7,631,033 B2 | 12/2009 | Zehler |
| 7,636,626 B2 | 12/2009 | Oesterling et al. |
| 7,689,231 B2 | 3/2010 | Mardiks et al. |
| 7,689,251 B2 | 3/2010 | Bae |
| 7,729,725 B2 | 6/2010 | Stenmark |
| 7,738,891 B2 | 6/2010 | Tenhunen et al. |
| 7,755,472 B2 | 7/2010 | Grossman |
| 7,778,227 B2 | 8/2010 | Gibbs |
| 7,787,602 B2 | 8/2010 | Pearson et al. |
| 7,791,310 B2 | 9/2010 | Luz et al. |

(56) References Cited

U.S. PATENT DOCUMENTS

| | | |
|---|---|---|
| 7,792,618 B2 | 9/2010 | Quigley et al. |
| 7,808,375 B2 | 10/2010 | Bertness et al. |
| 7,844,817 B2 | 11/2010 | Mueller et al. |
| 7,849,020 B2 | 12/2010 | Johnson |
| 7,904,569 B1 | 3/2011 | Gelvin et al. |
| 7,917,251 B2 | 3/2011 | Kressner et al. |
| 7,957,729 B2 | 6/2011 | Roter et al. |
| 7,957,744 B2 | 6/2011 | Oesterling et al. |
| 8,054,038 B2 | 11/2011 | Kelty et al. |
| 8,061,140 B2 | 11/2011 | Harmon |
| 8,063,797 B1 | 11/2011 | Sonnabend et al. |
| 8,081,643 B2 | 12/2011 | Sonoda et al. |
| 8,086,395 B2 | 12/2011 | Mino |
| 8,095,184 B2 | 1/2012 | Hiltunen et al. |
| 8,100,206 B2 | 1/2012 | Kressner et al. |
| 8,131,317 B2 | 3/2012 | Lee |
| 8,135,443 B2 | 3/2012 | Aleksic et al. |
| 8,140,064 B2 | 3/2012 | Mardiks |
| 8,143,741 B2 | 3/2012 | Funakoshi et al. |
| 8,144,596 B2 | 3/2012 | Veillette |
| 8,180,400 B2 | 5/2012 | Shin et al. |
| 8,185,300 B2 | 5/2012 | Miura et al. |
| 8,195,233 B2 | 6/2012 | Morikuni et al. |
| 8,195,235 B2 | 6/2012 | Montes |
| 8,207,642 B2 | 6/2012 | Lafontaine et al. |
| 8,233,389 B2 | 7/2012 | Yim et al. |
| 8,244,468 B2 | 8/2012 | Scalisi et al. |
| 8,244,909 B1 | 8/2012 | Hanson et al. |
| 8,249,087 B2 | 8/2012 | Takada et al. |
| 8,255,107 B2 | 8/2012 | Yang et al. |
| 8,294,420 B2 | 10/2012 | Kocher |
| 8,296,373 B2 | 10/2012 | Bosworth et al. |
| 8,335,493 B2 | 12/2012 | Angelhag |
| 8,364,959 B2 | 1/2013 | Bhanoo et al. |
| 8,378,623 B2 | 2/2013 | Kusch et al. |
| 8,514,825 B1 | 8/2013 | Addepalli et al. |
| 8,602,141 B2 | 12/2013 | Yee et al. |
| 8,705,527 B1 | 4/2014 | Addepalli et al. |
| 8,712,474 B2 | 4/2014 | Gehrman |
| 8,718,797 B1 | 5/2014 | Addepalli et al. |
| 8,719,431 B2 | 5/2014 | Reif et al. |
| 8,837,363 B2 | 9/2014 | Jones et al. |
| 8,848,608 B1 | 9/2014 | Addepalli |
| 8,863,256 B1 | 10/2014 | Addepalli et al. |
| 8,903,593 B1 | 12/2014 | Addepalli et al. |
| 8,989,954 B1 | 3/2015 | Addepalli et al. |
| 9,036,509 B1 | 5/2015 | Addepalli et al. |
| 9,154,900 B1 | 10/2015 | Addepalli et al. |
| 9,225,782 B2 | 12/2015 | Addepalli et al. |
| 9,277,370 B2 | 3/2016 | Addepalli et al. |
| 2001/0033225 A1 | 10/2001 | Razavi et al. |
| 2002/0006139 A1 | 1/2002 | Kikkawa et al. |
| 2002/0072388 A1 | 6/2002 | Korneluk et al. |
| 2002/0097855 A1 | 7/2002 | Neudeck et al. |
| 2002/0103964 A1 | 8/2002 | Igari |
| 2002/0165008 A1 | 11/2002 | Sashimara et al. |
| 2002/0174360 A1 | 11/2002 | Ikeda |
| 2002/0198632 A1 | 12/2002 | Breed et al. |
| 2003/0005435 A1 | 1/2003 | Nelger et al. |
| 2003/0009271 A1 | 1/2003 | Akiyama |
| 2003/0028763 A1 | 2/2003 | Malinen et al. |
| 2003/0033435 A1 | 2/2003 | Hanner |
| 2003/0046228 A1 | 3/2003 | Berney |
| 2003/0051041 A1 | 3/2003 | Kalavade et al. |
| 2003/0083968 A1 | 5/2003 | Marsh et al. |
| 2003/0152038 A1 | 8/2003 | Oshima et al. |
| 2003/0191939 A1 | 10/2003 | Tsai et al. |
| 2004/0008677 A1 | 1/2004 | Cen |
| 2004/0022216 A1 | 2/2004 | Shi |
| 2004/0023689 A1 | 2/2004 | Ahonen |
| 2004/0024670 A1 | 2/2004 | Valenzuela et al. |
| 2004/0042604 A1 | 3/2004 | Hiltunen et al. |
| 2004/0073339 A1 | 4/2004 | Ruoppolo |
| 2004/0083043 A1 | 4/2004 | Akiyama et al. |
| 2004/0087305 A1 | 5/2004 | Jiang et al. |
| 2004/0137890 A1 | 7/2004 | Kalke |
| 2004/0143386 A1 | 7/2004 | Yoshihara et al. |
| 2004/0162653 A1 | 8/2004 | Ban et al. |
| 2004/0165656 A1 | 8/2004 | Shiue et al. |
| 2004/0171386 A1 | 9/2004 | Mitjana |
| 2004/0204087 A1 | 10/2004 | Carlsson |
| 2004/0229601 A1 | 11/2004 | Zabawskyj et al. |
| 2004/0230345 A1 | 11/2004 | Tzamaloukas |
| 2004/0246966 A1 | 12/2004 | Wu et al. |
| 2004/0249915 A1 | 12/2004 | Russell |
| 2004/0256451 A1 | 12/2004 | Goman et al. |
| 2005/0009563 A1 | 1/2005 | Stenmark |
| 2005/0018883 A1 | 1/2005 | Scott |
| 2005/0020250 A1 | 1/2005 | Chaddha et al. |
| 2005/0039027 A1 | 2/2005 | Shapiro |
| 2005/0041660 A1 | 2/2005 | Pennec et al. |
| 2005/0060070 A1 | 3/2005 | Kapolka et al. |
| 2005/0065678 A1 | 3/2005 | Smith et al. |
| 2005/0075137 A1 | 4/2005 | Reemtsma |
| 2005/0096836 A1 | 5/2005 | Minami et al. |
| 2005/0101323 A1 | 5/2005 | De Beer |
| 2005/0124288 A1 | 6/2005 | Karmi et al. |
| 2005/0131673 A1 | 6/2005 | Koizumi et al. |
| 2005/0162687 A1 | 7/2005 | Lee |
| 2005/0207408 A1 | 9/2005 | Elliott |
| 2005/0239504 A1 | 10/2005 | Ishii et al. |
| 2005/0266883 A1 | 12/2005 | Chatrath |
| 2005/0271037 A1 | 12/2005 | Habaguchi et al. |
| 2005/0282554 A1 | 12/2005 | Shyy et al. |
| 2006/0020783 A1 | 1/2006 | Fisher |
| 2006/0031590 A1 | 2/2006 | Monette et al. |
| 2006/0059340 A1 | 3/2006 | Eldenmalm et al. |
| 2006/0068786 A1 | 3/2006 | Florence |
| 2006/0075242 A1 | 4/2006 | Aissi et al. |
| 2006/0076420 A1 | 4/2006 | Prevost et al. |
| 2006/0079237 A1 | 4/2006 | Liu et al. |
| 2006/0079254 A1 | 4/2006 | Hogan |
| 2006/0089157 A1 | 4/2006 | Casey |
| 2006/0129311 A1 | 6/2006 | Bauman et al. |
| 2006/0129848 A1 | 6/2006 | Paksoy et al. |
| 2006/0160532 A1 | 7/2006 | Buckley et al. |
| 2006/0172772 A1 | 8/2006 | Bjorkner |
| 2006/0181521 A1 | 8/2006 | Perreault et al. |
| 2006/0183500 A1 | 8/2006 | Choi |
| 2006/0218337 A1 | 9/2006 | Hashimoto |
| 2006/0224887 A1 | 10/2006 | Vesikivi et al. |
| 2006/0234693 A1 | 10/2006 | Isidore et al. |
| 2006/0277589 A1 | 12/2006 | Margis et al. |
| 2006/0282554 A1 | 12/2006 | Jiang et al. |
| 2006/0285538 A1 | 12/2006 | Oommen |
| 2006/0291455 A1 | 12/2006 | Katz et al. |
| 2007/0004457 A1 | 1/2007 | Han |
| 2007/0021847 A1 | 1/2007 | Hyodo et al. |
| 2007/0027583 A1 | 2/2007 | Tamir et al. |
| 2007/0030119 A1 | 2/2007 | Ono et al. |
| 2007/0030136 A1 | 2/2007 | Teshima et al. |
| 2007/0038772 A1 | 2/2007 | Obata |
| 2007/0060200 A1 | 3/2007 | Boris et al. |
| 2007/0067085 A1 | 3/2007 | Lu et al. |
| 2007/0077966 A1 | 4/2007 | Huang |
| 2007/0094337 A1 | 4/2007 | Klassen et al. |
| 2007/0105531 A1 | 5/2007 | Schroeder, Jr. |
| 2007/0124490 A1 | 5/2007 | Kalavade et al. |
| 2007/0129072 A1 | 6/2007 | Yamato et al. |
| 2007/0130156 A1 | 6/2007 | Tenhunen et al. |
| 2007/0139216 A1 | 6/2007 | Breed |
| 2007/0149170 A1 | 6/2007 | Bloebaum et al. |
| 2007/0167161 A1 | 7/2007 | Cheng et al. |
| 2007/0177562 A1 | 8/2007 | Castrogiovanni et al. |
| 2007/0198144 A1 | 8/2007 | Norris et al. |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0225873 A1 | 9/2007 | Toya et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2007/0265735 A1 | 11/2007 | Chigusa |
| 2007/0266428 A1 | 11/2007 | Downes et al. |

(56) References Cited

U.S. PATENT DOCUMENTS

| | | |
|---|---|---|
| 2007/0271014 A1 | 11/2007 | Breed |
| 2007/0273492 A1 | 11/2007 | Hara et al. |
| 2008/0020755 A1 | 1/2008 | Liu et al. |
| 2008/0020773 A1 | 1/2008 | Black et al. |
| 2008/0027606 A1 | 1/2008 | Helm |
| 2008/0028230 A1 | 1/2008 | Shatford |
| 2008/0031207 A1 | 2/2008 | Martinez et al. |
| 2008/0040005 A1 | 2/2008 | Breed |
| 2008/0043759 A1 | 2/2008 | Poetker et al. |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0122597 A1 | 5/2008 | Englander |
| 2008/0147265 A1 | 6/2008 | Breed |
| 2008/0147271 A1 | 6/2008 | Breed |
| 2008/0169350 A1 | 7/2008 | Audebert et al. |
| 2008/0205416 A1 | 8/2008 | DeChiara |
| 2008/0209545 A1 | 8/2008 | Asano |
| 2008/0220743 A1 | 9/2008 | Mora et al. |
| 2008/0226074 A1 | 9/2008 | Sammour et al. |
| 2008/0227604 A1 | 9/2008 | Daniel |
| 2008/0238135 A1 | 10/2008 | Takeda et al. |
| 2008/0254766 A1 | 10/2008 | Craven |
| 2008/0261561 A1 | 10/2008 | Gehrmann |
| 2008/0265024 A1 | 10/2008 | Tracy et al. |
| 2008/0267186 A1* | 10/2008 | Boukis ............ H04L 29/12367 370/392 |
| 2008/0284575 A1 | 11/2008 | Breed |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0003283 A1 | 1/2009 | Meylan |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0043441 A1 | 2/2009 | Breed |
| 2009/0061839 A1 | 3/2009 | Zimmerman et al. |
| 2009/0077643 A1 | 3/2009 | Schmidt et al. |
| 2009/0138136 A1 | 5/2009 | Natsume |
| 2009/0154460 A1 | 6/2009 | Varela et al. |
| 2009/0163175 A1 | 6/2009 | Shi et al. |
| 2009/0215449 A1 | 8/2009 | Avner |
| 2009/0225736 A1 | 9/2009 | Patarkazishvili |
| 2009/0227230 A1 | 9/2009 | Camilleri et al. |
| 2009/0265633 A1 | 10/2009 | Lim et al. |
| 2009/0312850 A1 | 12/2009 | Higuchi et al. |
| 2010/0005313 A1 | 1/2010 | Dai |
| 2010/0037057 A1 | 2/2010 | Shim et al. |
| 2010/0049626 A1 | 2/2010 | Hong |
| 2010/0070171 A1 | 3/2010 | Barbeau et al. |
| 2010/0085868 A1 | 4/2010 | Guo et al. |
| 2010/0088401 A1 | 4/2010 | DeGraeve et al. |
| 2010/0112997 A1 | 5/2010 | Roundtree |
| 2010/0167702 A1 | 7/2010 | Madhavan |
| 2010/0167721 A1 | 7/2010 | Madhavan |
| 2010/0167724 A1 | 7/2010 | Haran et al. |
| 2010/0183016 A1 | 7/2010 | Bonk et al. |
| 2010/0195724 A1 | 8/2010 | Yoshida et al. |
| 2010/0202346 A1 | 8/2010 | Sitzes et al. |
| 2010/0208698 A1* | 8/2010 | Lu .................... H04W 36/0027 370/331 |
| 2010/0215043 A1 | 8/2010 | Hisada |
| 2010/0226291 A1 | 9/2010 | Gorbachov |
| 2010/0232404 A1 | 9/2010 | Chen et al. |
| 2010/0234009 A1 | 9/2010 | Antani et al. |
| 2010/0234071 A1 | 9/2010 | Shabtay et al. |
| 2010/0248690 A1 | 9/2010 | Biggs et al. |
| 2010/0279653 A1 | 11/2010 | Poltorak |
| 2010/0280956 A1 | 11/2010 | Chutorash et al. |
| 2010/0291924 A1 | 11/2010 | Antrim et al. |
| 2010/0294750 A1 | 11/2010 | Hogenmueller et al. |
| 2010/0311391 A1 | 12/2010 | Siu et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2011/0032952 A1 | 2/2011 | Rochon et al. |
| 2011/0034201 A1 | 2/2011 | Hamada et al. |
| 2011/0055292 A1 | 3/2011 | Madau et al. |
| 2011/0059738 A1 | 3/2011 | Waller |
| 2011/0071718 A1 | 3/2011 | Norris et al. |
| 2011/0106375 A1 | 5/2011 | Gurusamy Sundaram |
| 2011/0149982 A1 | 6/2011 | Hwang et al. |
| 2011/0153149 A1 | 6/2011 | Jeon et al. |
| 2012/0004933 A1 | 1/2012 | Foladare et al. |
| 2012/0089299 A1 | 4/2012 | Breed |
| 2012/0109418 A1 | 5/2012 | Lorber |
| 2012/0109446 A1 | 5/2012 | Yousefi et al. |
| 2012/0182935 A1 | 7/2012 | Addepalli et al. |
| 2013/0018575 A1 | 1/2013 | Birken et al. |
| 2013/0159466 A1 | 6/2013 | Mao |
| 2013/0301584 A1 | 11/2013 | Addepalli et al. |
| 2014/0049413 A1 | 2/2014 | Agarwal et al. |
| 2014/0303801 A1 | 10/2014 | Ahn et al. |
| 2014/0380442 A1 | 12/2014 | Addepalli et al. |
| 2015/0029987 A1 | 1/2015 | Addepalli et al. |
| 2015/0222708 A1 | 8/2015 | Addepalli et al. |

FOREIGN PATENT DOCUMENTS

| | | |
|---|---|---|
| EP | 1696357 | 8/2006 |
| EP | 1727383 | 11/2006 |
| EP | 1737160 | 12/2006 |
| EP | 1758335 | 2/2007 |
| GB | 2294787 | 5/1996 |
| GB | 2313257 A | 11/1997 |
| GB | 2386803 A | 9/2003 |
| GB | 2406925 | 4/2005 |
| JP | 2000194660 | 7/2000 |
| WO | WO 92/19078 | 10/1992 |
| WO | WO 99/24938 | 5/1999 |
| WO | WO 99/27730 | 6/1999 |
| WO | WO 99/46682 | 9/1999 |
| WO | WO 00/79368 | 12/2000 |
| WO | WO 0111577 | 2/2001 |
| WO | WO 02/067563 | 8/2002 |
| WO | WO 02/089449 | 11/2002 |
| WO | WO 03/007639 | 1/2003 |
| WO | WO 2004/021296 | 3/2004 |
| WO | WO 2005/029890 | 3/2005 |
| WO | WO 2006/094564 | 9/2006 |
| WO | WO 2007/143342 | 12/2007 |
| WO | WO 2008/040964 | 4/2008 |
| WO | WO 2009/082759 | 7/2009 |

OTHER PUBLICATIONS

"Cisco Mobile Network Solutions for Public Safety," Cisco.com, 2008 Cisco Systems, Inc., Mar. 2008, 7 pages http://www.cisco.com/en/US/prod/collateral/routers/ps272/prod_white_paper0900aecd806220af.html.

"TCG Mobile Trusted Module Specification." Trusted Computing Group, Specification version 1.0, Revision 6, Jun. 2008, 105 pages; [Retrieved and printed Apr. 8, 2011] http://www.trustedcomputinggroup.org/files/resource_files/87852F33-1D09-3519-AD0C0F141CC6B10D/Revision_6-tcg-mobile-trusted-module-1_0.pdf.

Alves, T., et al., "TrustZone: Integrated Hardware and Software Security," Information Quarterly, vol. 3, No. 4, 2004, pp. 18-24; [Retrieved and printed Apr. 8, 2011] http://www.iqmagazineonline.com/magazine/pdf/v_3_4_pdf/Pg18_24_custZone_Secur.pdf.

Arsenault, A., et al., "Securely Available Credentials—Requirements," IETF, Network Working Group, RFC 3157, Baltimore Technologies, Aug. 2001, 20 pages.

Autonet Mobile, "Autonet Mobile Features, Technology Specifications," autonetmobile.com, 1 page; [earliest known publication date: Apr. 8, 2011]http://www.autonetmobile.com/service/anmdev.html.

Autonet Mobile, "CARFI Features, Technology Specifications," autonetmobile.com, 1 page; [earliest known publication date: Apr. 8, 2011] http://autonetmobile.com/service/carfidev.html.

(56) References Cited

OTHER PUBLICATIONS

Autonet Mobile, "It's What Your Car has been Waiting for," autonetmobile.com, 2 pages; [retrieved and printed Apr. 8, 2011] http://www.autonetmobile.com/service/.

Bickhart, Ryan W., et al., "Transparent TCP-to-SCTP Translation Shim Layer," EuroBSDCon 2007, Copenhagen, Denmark, Sep. 17-18, 2007; 14 pages.

Bilstrup, "A Survey Regarding Wireless Communication Standards Intended for a High-Speed Vehicle Environment," Technical Report IDE0712, Feb. 2007, 51 pages.

Blazevic, Ljubica, et al., "A Location-Based Routing Method for Mobile Ad Hoc Networks," IEEE Transactions on Mobile Computing, vol. 4, No. 2, Mar./Apr. 2005 (Issue publication date: Feb. 7, 2005); 14 pages.

Boman, K., Niemi, V., et al. "UMTS Security," Electronics and Communication Engineerying Journal, Oct. 2002, 14 pages; http://www.it.iitb.ac.in/~kavita/GSM_Security_Papers/New%20papers/umts_security.pdf.

Dierks, T., et al., "The Transport Layer Security (TLS) Protocol," (Version 1.1), Network Working Group, RFC 4346, Apr. 2006, 87 pages; http://www.rfc-editor.org/rfc/pdfrfc/rfc4346.txt.pdf.

EPO May 22, 2012 European Search Report and Written Opinion from EP 12150208.2.

Farinacci, D. et al., "LISP Mobile Node," Network Working Group Internet Draft, Feb. 1, 2010, 22 pages; http://tools.ietf.org/id/draft-meyer-lisp-mn-01.txt.

Harkins, D., et al., "The Internet Key Exchange (IKE)," Network Working Group, RFC 2409, Nov. 1998, 41 pages; http://www.rfc-editor.org/rfc/pdfrfc/rfc2409.txt.pdf.

Hsu, WAVE/DSRC Development and Standardization, Industrial Technology Research Institute, Oct. 1, 2010, 84 pages.

Ibars, Christian et al., "Radio Resource Allocation for a High Capacity Vehicular Access Network," 4th International Symposium on Wireless Vehicular Communications: WIVEC2011, Sep. 5-6, 2011, San Francisco, CA; U.S., 5 pages, http://www.ieeevtc.org/wivec2011/.

Ibars, Christian et al., "Wireless Services in the Connected Vehicle Era," IEEE Communications Magazine, Dec. 23, 2010, 13 pages.

Kent, S., et al., "Security Architecture for the Internet Protocol," Network Working Group, RFC 2401, Nov. 1998, 66 pages; http://www.rfc-editor.org/rfc/pdfrfc/rfc2401.txt.pdf.

Lillian Lei Dai, *"Proactive Mobile Wireless Networks: an infrastructureless wireless network architecture for delay-sensitive applications,"* Massachusetts Institute of Technology, Jun. 2008 (two parts submitted: Part 1—105 pages; Part 2—97 pages).

PCT Apr. 22, 2009 International Search Report for PCT/US08/88320; 3 pages.

PCT Jun. 29, 2010 International Preliminary Report on Patentability and Written Opinion of the International Searching Authority for PCT/US08/88320; 10 pages.

Robert Bosch GmbH, *Automotive Electrics Automotive Electronics, Systems and Components, New: Networking Hybrid Drive*, 5th Edition, Nov. 2007, BentleyPublishers.com, 255 pages (two parts submitted: Part 1—121 pages; Part 2—131 pages) [Best copy available—Library of Congress Catalog Record included].

Scarfone, Karen et al., "Guide to Instrusion Detection and Prevention Systems (IDPS)," NIST (National Institute of Standards and Technology), Special Publication 800-94, Feb. 2007, 127 pages; http://csrc.ncsl.nist.gov/publications/nistpubs/800-94/SP900-94.pdf.

Shevade, Updendra et al., "Enabling High-Bandwidth Vehicular Content Distribution," ACM CoNEXT 2010, Philadelphia, PA, Nov. 2010, 12 pages http://www.cs.utexas.edu/~lili/papers/pub/conext10.pdf.

Weigle, Dr. Michele, "Standards: WAVE/DSCRC/802.11p, CS 795/895 Vehicular Networks," Old Dominion University, Spring 2008, 19 pages.

Zeldovich, Nickalai et al., "Making Information Flow Explicit in HiStar," OSDI '06: 7th USENIX Symposium on Operating Systems Design and Implementation, Nov. 2006, 16 pages.

Zeldovich, Nickolai et al., "Securing Distributed Systems with Information Flow Control," NSDI '08: 5th USENIX Symposium on Networked Systems Design and Implementation, Apr. 2008, 16 pages.

Freeman, Shanna, "How OnStar Works," HowStuffWorks.com, a Discovery Company; Feb. 8, 2006 http://auto.howstuffworks.com/onstar2.htm/printable.

Wahab, et al.,"Driving Profile Modeling and Recognition Based on Soft Computer Approach," IEEE Transactions on Neural Networks, vol. 20, No. 4, Apr. 2009.

Petrescu, et al., "Joint IP Networking and Radio Architecture for Vehicular Networks," 11th International Conference on ITS Telecommunications, Aug. 2011, St. Petersburg, Germany; 7 pages.

* cited by examiner

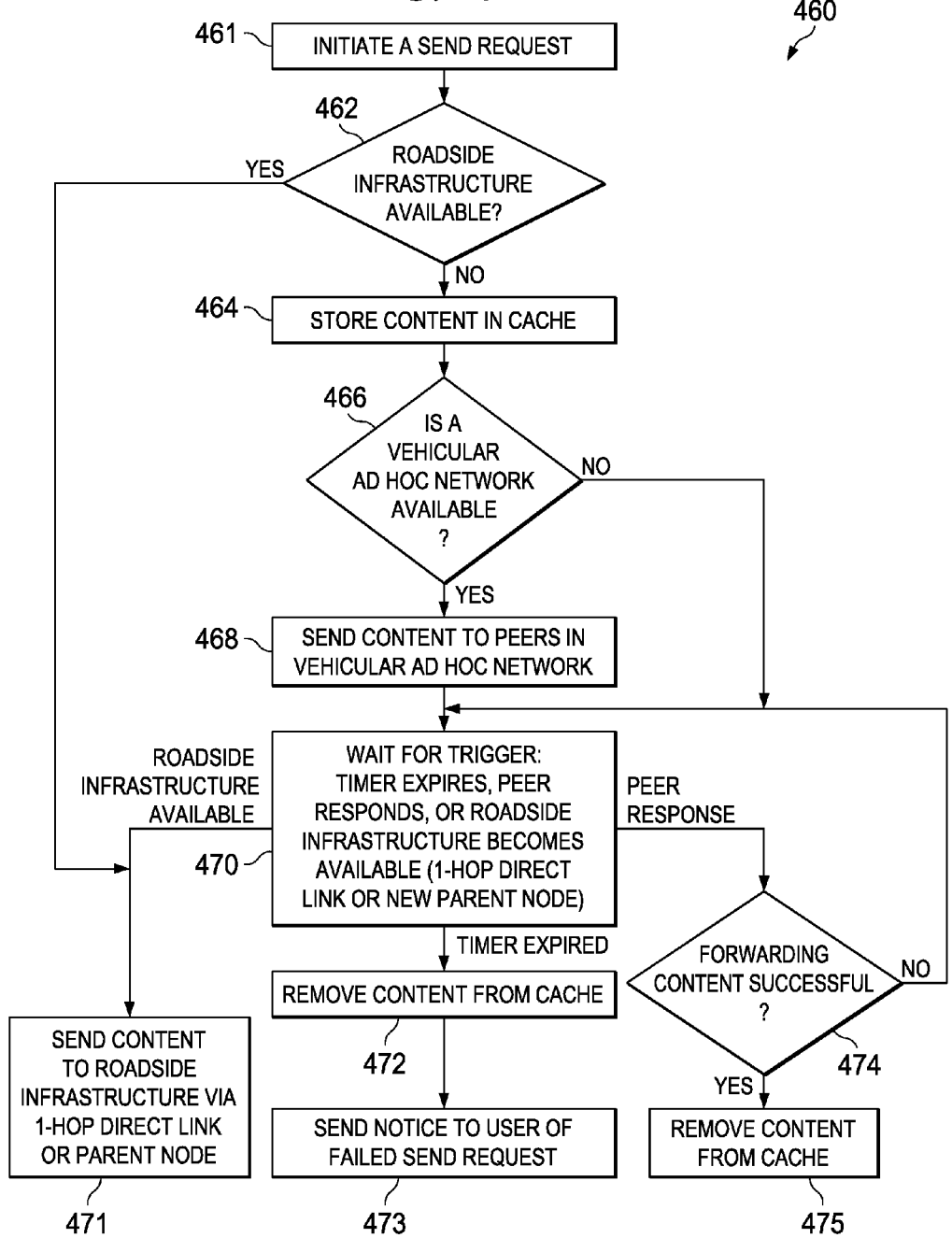

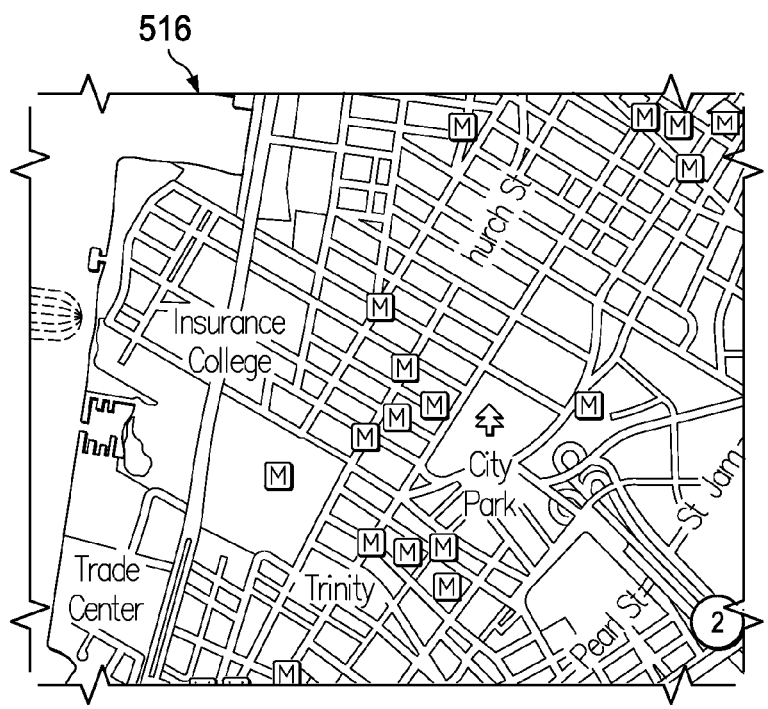
FIG. 22
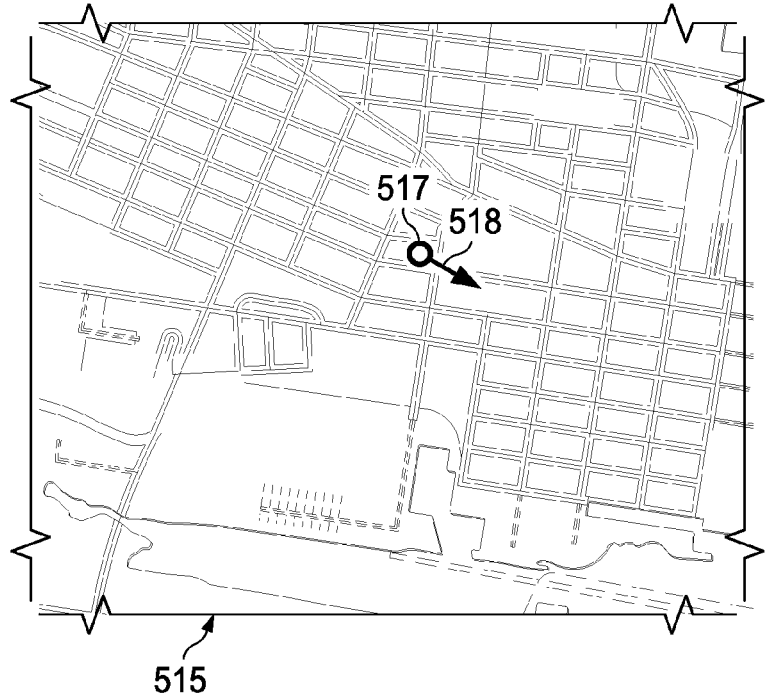

SYSTEM AND METHOD FOR ROUTING, MOBILITY, APPLICATION SERVICES, DISCOVERY, AND SENSING IN A VEHICULAR NETWORK ENVIRONMENT

CROSS-REFERENCE TO RELATED APPLICATION

This application is a divisional (and claims the benefit under 35 U.S.C. §120) of U.S. application Ser. No. 13/118,220, filed May 27, 2011, entitled "SYSTEM AND METHOD FOR ROUTING, MOBILITY, APPLICATION SERVICES, DISCOVERY, AND SENSING IN A VEHICULAR NETWORK ENVIRONMENT," Inventors Sateesh K. Addepalli, et al., which application claims the benefit of priority under 35 U.S.C. §119(e) of U.S. Provisional Application Ser. No. 61/433,138, filed Jan. 14, 2011, by Sateesh K. Addepalli, et al., entitled "SYSTEM, METHOD, AND PROCESSES ASSOCIATED WITH CONNECTED VEHICLES." The disclosures of both of the prior applications are considered part of (and are incorporated by reference in) the disclosure of this application in their entireties.

TECHNICAL FIELD

This disclosure relates in general to the field of electronic communications and, more particularly, to routing, mobility, application services, discovery, and sensing in a vehicular network environment.

BACKGROUND

Networking architectures have grown increasingly complex, where many architectures have been designed for use in a wide variety of communications environments. Demand continues to rise among the subscriber base of end users, who seek consistent network access across diverse network environments. In particular, configuring suitable network architectures for vehicular environments (e.g., automobiles, airplanes, trains, boats, etc.) presents unique difficulties. Vehicles can be mobile across a large and diverse geographical area, can travel at variable speeds, can have internal networks related to the vehicle itself, and can include more than one end user at a time. Providing the ability to conduct transactions, including data exchanges, in vehicular network environments in a disruption tolerant manner, providing mobility support to devices inside a vehicle, enabling collaborative use of data from sensing devices in a vehicle, and optimizing retrieval and display of navigational maps in a vehicle present significant challenges to system designers, vehicle manufacturers, service and data providers, and the like.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 20A is a simplified flowchart illustrating example operations that may be associated with operations related to sending content in a network environment in embodiments of the present disclosure;

FIG. 22 is a pictorial diagram of various forms of data used in example location based displays;

DETAILED DESCRIPTION OF EXAMPLE EMBODIMENTS

Overview

Figure 1:
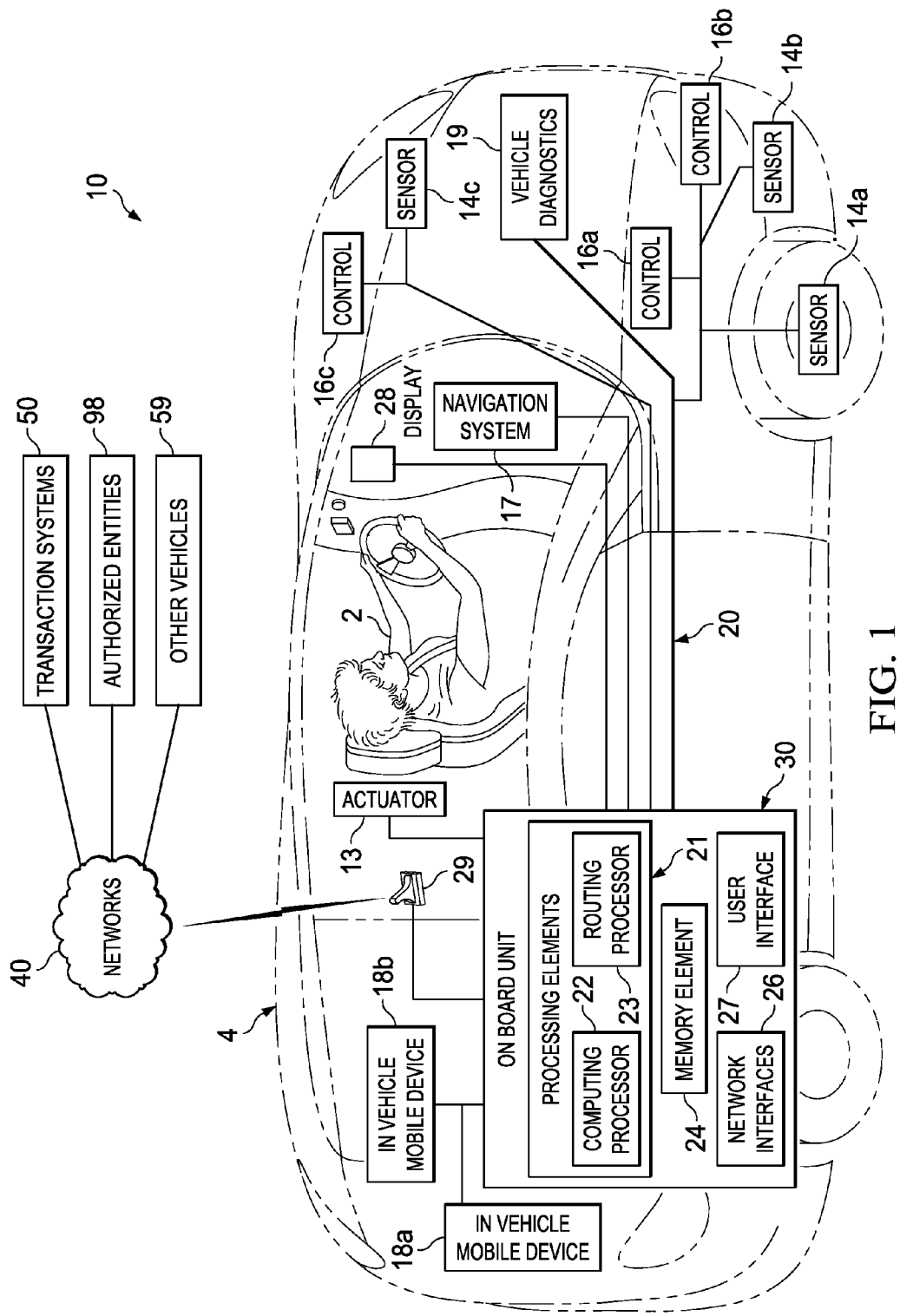
FIG. 1 is a simplified block diagram of one embodiment of a communication system in accordance with the present disclosure.

A method in one example embodiment includes selecting a path for routing a data packet from a source node to a destination node in a vehicular ad hoc network, storing the data packet if the selected path is identified as a dead end, and establishing a communication link with a first node. The method also includes forwarding the data packet to the first node if a first distance between the first node and the destination node is less than a second distance between the source node and the destination node. More specific embodiments include sending a query for location information of the destination node, receiving the location information including two or more available paths from the source node to the destination node, and determining the path for routing the data packet is an optimal path of the two or more available paths.

A method in another example embodiment includes establishing a communication link to one or more nodes in a vehicular ad hoc network, publishing directory information in a vehicle directory, discovering a community of two or more nodes in the vehicular ad hoc network having a same interest, and joining the community. In more specific embodiments, the vehicle directory is searched to identify other nodes in the vehicular ad hoc network having the same interest. A request to join the community is published in the vehicle directory.

A method in yet another example embodiment includes receiving in a vehicle a request for sensor data, obtaining the sensor data, generating a tag for the sensor data, encapsulating the sensor data with the tag, and sending the encapsulated sensor data to the data collector. The method also includes performing the obtaining, the generating, the encapsulating, and the sending in real time. In more specific embodiments, the method includes creating a tag with a plurality of data including a latitude, a longitude, a date, and a time related to capturing the sensor data.

A method in a further example embodiment includes receiving roadside infrastructure (RI) information for a geographic area, identifying a first RI device based on the RI information, and attempting to associate with the first RI device. The method further includes operating in RI mode over a wireless communication link to the first RI device if attempting to associate was successful. The method also includes determining if a link quality of the wireless communication link is acceptable based on a threshold, and identifying a second RI device from the RI information if the link quality is not acceptable.

A method in another example embodiment includes receiving network traffic from an endpoint device, inspecting the network traffic, determining the endpoint device has a mobility scheme based on the inspecting, and inferring a type of mobility scheme on the endpoint device. The method further includes adapting mobility services to accommodate the mobility scheme of the endpoint device. More specific embodiments include detecting a destination port of the network traffic to infer the type of mobility scheme of the endpoint device.

EXAMPLE EMBODIMENTS

Turning to FIG. 1, FIG. 1 is a simplified block diagram of a communication system 10 for enabling routing, mobility, application services, data exchange, discovery, or sensing, or any suitable combination thereof, in a vehicular network environment. The example architecture of FIG. 1 includes an end user (driver) 2 operating a vehicle 4 that includes an on-board unit (OBU) 30. In this particular example, OBU 30 includes processing elements 21, which may include a computing processor 22 and a routing processor 23. OBU 30 also includes a memory element 24, network interfaces 26, a user interface 27, and a display 28. OBU 30 may be adapted to communicate with one or more in-vehicle devices over wired or wireless networks. Generally, OBU 30 can be suitably coupled to numerous different nodes in communication system 10, where a node can be any device (e.g., a machine device or a mobile device), network element, client, server, peer, service, application, another OBU, or other object capable of sending, receiving, or forwarding information over a communications channel in a network.

As illustrated in FIG. 1, OBU 30 may be coupled to machine devices in communication system 10, such as a plurality of sensors 14a-c, a plurality of vehicle controls (e.g., electronic control units (ECUs)) 16a-c, and a plurality of actuators, such as actuator 13. In one example embodiment, sensors 14a-b and controls 16a-b may be part of an automotive diagnostic system, indicated by vehicle diagnostics 19, which may also be suitably integrated with OBU 30. OBU 30 may also be suitably coupled to various in-vehicle mobile devices 18a-b at any given time. OBU 30 may also include capabilities associated with navigation system 17 (e.g., a global positioning system (GPS), location-based service).

As used herein, the term 'machine device' is meant to encompass sensors, actuators, electronic control units (ECUs) or controls, instruments, embedded devices, media devices, infotainment systems, vehicle navigation systems, displays, other peripheral or auxiliary devices or components, etc. Machine devices may be physically distributed across the vehicle in a vehicle subsystem, consolidated in any way, provisioned in proprietary configurations, or otherwise configured based on particular networking, vehicle, and/or end user needs.

FIG. 1 also includes networks 40, representing various types of connectivity to vehicle 4 (e.g., via antenna 29). Each established network of networks 40 may have a logical coupling to one or more other nodes, including remote nodes of transaction systems 50, authorized entities 98, and other vehicles 59. A 'remote node' as used herein may be any node located externally to a particular vehicle, such as vehicle 4. Examples of possible remote nodes that could be located externally to the vehicle include user devices, mobile devices, network elements, electronic devices in networked systems (e.g., server in a datacenter, user device in a local area network (LAN), etc.), OBUs of other vehicles, roadside user devices, and roadside infrastructure devices.

Elements of FIG. 1 may be coupled to one another through one or more interfaces (e.g., network interfaces 26) employing any suitable connection (wired or wireless), which provides a viable pathway for electronic communications. Communication system 10 may include a configuration capable of transmission control protocol/Internet protocol (TCP/IP) communications for the electronic transmission or reception of packets in a network, or any other suitable protocol, where appropriate and based on particular needs. In addition, communication system 10 may also include a configuration capable of accommodating internal network subsystem 20 that may be employed to convey information across the myriad of machine devices (e.g., sensors 14a-c, vehicle controllers 16a-c, actuator 13) in vehicle 4.

Embodiments of communication system 10 enable a comprehensive vehicular routing architecture including selecting an optimal path between a source node and a destination node, maintaining session continuity when a routing path changes, supporting temporary connection disruptions, and providing scalability. Embodiments of communication system 10 may also provide an interoperability solution allowing OBU 30 to discover mobile devices with different mobility protocols and allowing the discovered mobile devices to use their own mobility protocols or to opt in and use a mobility protocol provided by OBU 30. With the comprehensive routing architecture and mobility services, embodiments of communication system 10 may also provide a pervasive middleware architecture to transparently provide users with an ability to form location and interest aware communities within a vehicular ad hoc network, facilitating sharing services and data without the need for Internet-based clouds. Additionally, embodiments of the middleware can enable opportunistic, store-carry-forward techniques in which vehicular mobile nodes (e.g., OBU 30), encounter each other, join one or more vehicle communities of interest, receive data, hold the data in storage, and proxy and wait for new opportunistic contact to exchange the stored data to other vehicular mobile nodes.

Embodiments of communication system 10 may also be configured to exploit and manage roadside network connectivity opportunities in a mobile vehicular environment. An OBU may be configured to communicate with an information repository, possibly available through the Internet, in order to receive information to improve discovery of local infrastructure devices. As used herein, the term 'local infrastructure devices' and 'shorter range roadside infrastructure device' refers to locally accessible wireless infrastructure devices enabling access to other networks including the Internet. Such locally accessible wireless infrastructure devices are inclusive of IEEE 802.11 access points, Micro and Pico base stations, Femto base stations, and any other similar device or architecture. Additionally, OBU 30 may be configured to switch from accessing a local infrastructure device (e.g., IEEE 802.11x wireless technologies) to accessing one or more peers in order to maintain network connectivity to the Internet or other networks. The determination to switch may be based on a threshold link quality of a communication link to the local infrastructure device.

Further embodiments of communication system 10 enable real-time collaborative vehicle sensing in which OBU 30 of vehicle 4 (and any number of other OBUs in other vehicles) can push dynamic, transient data gathered from sensors on the vehicle, or from other devices (e.g., mobile devices) connected to OBU 30, to an Internet-based cloud with potentially extremely low latency, where such data can be aggregated and processed. Thus, essentially any real-time scaled view of this sensor data (i.e., very small scale to very large scale) can be enabled. In addition, embodiments of communication system 10 can also provide intelligent caching of navigational map tiles from an Internet-based cloud and/or from peers (e.g., other OBUs) to enable a seamless user experience in which the user feels he/she has access to an entire map.

Certain terminologies are used with regard to the various embodiments of the present disclosure. The term 'roadside' as used herein is intended to mean outside of a vehicle and may or may not be physically located by a road. In addition, 'user device' as used herein is intended to include mobile devices, personal computers, electronic devices, and any other device, component, element, or object operable by a user and capable of initiating voice, audio, video, media, or data exchanges within communication system 10. The term 'roadside infrastructure device' as used herein includes a base station, access point, satellite, and any other wireless device capable of establishing a network connection for exchanging packets between a user device, mobile device, or OBU and other networks such as the Internet. References to 'infrastructure' are intended to include any roadside infrastructure device including local infrastructure devices, or any other device, component, element, or object capable of facilitating communication to nodes on other networks such as the Internet. The term 'in-vehicle device' as used herein, encompasses machine devices and user devices located inside a vehicle. Other terminologies are defined throughout the Specification.

For purposes of illustrating certain example techniques of communication system 10, it is important to understand the communications that may be traversing the network and the unique scenarios presented in vehicular network environments. The following foundational information may be viewed as a basis from which the present disclosure may be properly explained. Such information is offered earnestly for purposes of explanation only and, accordingly, should not be construed in any way to limit the broad scope of the present disclosure and its potential applications.

Many useful, but disparate, networks may exist in today's vehicles (e.g., automobiles, airplanes, trains, boats, etc.). For example, multiple internal network subsystems (e.g., bus subsystems, IP networks) may exist in the vehicle and may provide communication pathways to various machine devices distributed throughout the vehicle. A 'subsystem' as used herein is intended to encompass a network within a vehicle, where the network is a collection of nodes interconnected by communicative channels that facilitate electronic communications therebetween, in which the nodes are integrated with, located within, or otherwise linked to the vehicle.

The nodes in internal network subsystems can include machine devices such as, for example, sensors, actuators, electronic control units (ECUs), detectors, entertainment systems including speakers, a CD and/or DVD player, a radio, etc. In addition, an internal network subsystem may exist for IP machine devices such as certain vehicle navigation systems (e.g., GPS), in-vehicle mobile devices (e.g., mobile phones, smart mobile phones/devices, e-book readers, tablets, laptops/net books, portable navigation systems, multimedia devices, etc.) and any other machine devices configured for IP communications.

Typically, vehicles employ a number of different bus subsystems to convey information across the myriad of sensors and actuators that are disseminated throughout a vehicle. A CAN bus is a vehicle bus standard designed to allow microcontrollers, sensors, and other devices associated with a vehicle to communicate with each other within the vehicle (e.g., without a host computer). CAN is a message based protocol, designed for and typically used by automotive applications, such as, for example, soft real-time control of devices such as the antilock breaking system.

Other bus subsystems include LIN (Local Interconnect Network), Flexray, and MOST (Media Oriented System Transport). LIN is used to sense external conditions (light) or to control small mechanisms such as door-locking systems. Flexray can provide communications associated with hard real-time controllers used for drive-by-wire applications, for example. MOST enables transmission of audio, video, and voice on fiber optics. The need for exchange of data between these different bus subsystems requires the presence of gateways, deployed across two different bus subsystems, or supergateways deployed across multiple subsystems.

A separate network in the vehicle may exist for IP devices involved in the vehicle navigation system (e.g., GPS) and, possibly, another network associated with simple content delivery. Additionally, legacy IP bus subsystems may be replaced with IP networks such as Ethernet or a combination of Ethernet with the buses in the future. Other networks could be used for Internet access for end users through, for example, mobile devices. Hence, various levels of network usage and different purposes of network usage may be present. Network usage in each of the identified cases may have a different usage scope, different latency, different associated routing, different policy requirements, and the like.

The myriad of sensors provided in many of today's vehicles offer a rich source of sensory input. Mounted cameras, environmental sensors, temperature sensors, engine performance sensors, road condition sensors, and traffic condition sensors, may be just a few of the many sensors collecting real-time data from a vehicle. Such real-time sensory data, if aggregated, could provide numerous benefits.

Exterior facing mounted cameras on a vehicle, for example, could be used to provide real-time views of streets, road conditions, weather conditions, and traffic. In one example, currently available navigation maps offered through the Internet from various providers often have views and pictures collected of streets and terrain that are not up-to-date and do not accurately represent current conditions. A provider may send authorized crews out to collect maps in a geographic region by photographing streets, houses, buildings, landscapes, etc. Such crews may be deployed at particular time intervals (e.g., every 6 months, every year, etc.) as allowed by economies of the provider. Therefore, available maps can be months or years old, depending on the particular provider.

Once the maps are collected, by the deployed crews, they have to be uploaded or otherwise made available to the provider. After receiving the collected maps, they may be stitched together to provide a seamless view of the streets and landscape. Thus, considerable lag time may also exist between the conditions being captured and being made available to consumers. Accordingly, at any given time, an available navigation map may not accurately represent current conditions in a particular area and localized and/or transient data may not be captured at all.

In another example, aggregated sensor data from environmental sensors of vehicles could provide valuable information to scientists, government officials, and consumers alike. For example, a carbon footprint of each vehicle could be calculated based on data from environmental sensors of the vehicle. If aggregated, such information could allow scientists to more accurately assess and predict the effects of vehicle emissions.

Additionally, readings from a natural phenomenon such as an earthquake could be captured, in some cases for example, over hundreds of square miles by vehicles experiencing the earthquake. If aggregated, such information could give scientists data points possibly extending over an entire range of propagation of the earthquake. Such extensive sensor data is not currently available in an aggregatable form because deploying and maintaining individual sensors to collect such data would be prohibitively expensive. Thus, because of the high data collection cost and latency issues with collecting and reporting such data, real time data is generally unavailable for consumption by users, for example on end user devices or other mobile devices. Accordingly, solutions are needed to enable real time collaborative sensing and aggregation of the sensed data.

If sensor data from vehicles and other mobile devices could be aggregated to update navigation maps in Internet-based clouds, dynamic navigation map retrieval could offer a more real-time view of area streets and road conditions. Newer and more sophisticated maps, however, often need greater amounts of memory. One common method for storing map data in navigation systems and other mapping applications is through a concept of "tiles." These tiles break up a large map area into smaller chunks, similar to the way a tile floor breaks up the entire floor area into smaller pieces. Because of the vast amount of tiles required to represent the entire world, storing all high density and high fidelity maps on a mobile device is typically an impractical solution. Thus, solutions are needed to provide dynamic navigation map retrieval enabling a seamless user experience.

Currently, downloading and displaying certain types of navigation maps is often slow and choppy, which can leave a user feeling as if only a currently displayed segment of the map is available. In addition, if a user of a vehicle is relying on a dynamic navigation system or a mobile device for navigation purposes, losing connectivity to the Internet could render the application useless.

Another problem with dynamic navigation map retrieval can be expense. Certain maps requiring large files (e.g., high-density maps, street view maps, potentially 3D maps, etc.) may be very expensive to download through available communication channels (e.g., 3G, 4G, etc.). However, with navigation systems becoming more and more mainstream, numerous vehicles may be traveling in close proximity with the same or some of the same map tiles stored in their respective navigation systems within the vehicles. Thus, the ability to leverage the availability of this data could significantly reduce the costs and network congestion associated with dynamically updating navigation map displays in vehicles.

The ability of sensor data to be collected by a vehicle and uploaded to a network external to the vehicle (e.g., the Internet) and the ability to dynamically retrieve navigation maps from an external network may depend on available connectivity from the vehicle to such networks. Wireless technologies are continually evolving to better enable electronic devices with appropriate wireless interfaces to access various networks and other electronic devices. For example third generation (3G), fourth generation (4G), and 3GPP long term evolution (LTE) wireless telephone technologies, worldwide interoperability for microwave access (Wi-MAX), WiFi, and dedicated short-range communications (DSRC) are some of the numerous wireless technologies currently available if appropriate interfaces and network infrastructure are provided to support the technology.

Although numerous wireless technologies exist, the mobile nature of vehicles obfuscates continuous wireless connectivity from a vehicle to an external network. Vehicles travel at various speeds and their travel can span extensive geographical distances. Disturbances (e.g., topographical changes, physical structures, weather, geographical distance from a network access point or cellular tower, etc.) may cause interference and reception difficulties for a particular wireless technology being used. Consequently, an electronic device, such as a mobile device, in a moving vehicle often vacillates between having and not having wireless connectivity.

Some wireless communication links may be available, but not desirable for extended and/or frequent use in a mobile vehicle. For example, pricing contracts with mobile network operators typically provide cellular coverage through the particular operator for a certain fee based on defined criteria. Example criteria may include a maximum amount of allowed minutes at a set price and/or roaming charges. In a moving vehicle, roaming charges in particular may become very costly as the vehicle moves in and out of a network coverage area. Similarly, a cellular service having a maximum amount of allowed minutes may not be a desirable option for wireless connectivity during long commutes or trips in a vehicle.

On-board unit (OBU) 30, includes multiple wireless interfaces, enabling network connectivity with local infrastructure devices such as WiFi access points (APs), Femto, Pico, or Micro base stations, or other similar less expensive and/or shorter range roadside infrastructure devices. Such opportunistic connections may be attempted in order to avoid possibly more expensive 3G/4G/Satellite connections or to meet some bandwidth, QoS, and location requirements and/or policies.

Nevertheless, challenges may occur when performing scanning, detection and association procedures with certain local infrastructure devices (e.g., WiFi APs, Micro, Pico or Femto base stations, etc.) along a vehicular driving path. For example, although IEEE 802.11 standards include built-in mechanisms to hand over between access points to maintain connection, these mechanisms can be insufficient in highly mobile scenarios like an automobile driving along a road. The 802.11 handoff mechanism includes scanning to discover an adjacent access point when a signal of the currently associated access point is detected to be less than a predetermined threshold. The scanning and association with a new access point may take some time. In a drive-by scenario where the signal strength of access points is highly unpredictable, especially at the fringe of their coverage area, this approach can result in significant periods of wasted connectivity and bandwidth opportunities. Moreover, since the APs have shorter wireless ranges, any lost connectivity time can have a more significant proportionate impact on total connectivity time. Similar issues exist with roadside Micro/Pico/Femto base stations. Thus, faster and more efficient ways of connecting to such devices could improve the viability of utilizing these less expensive, shorter-range roadside infrastructure devices in vehicular networks.

Even with improved handoff mechanisms, additional challenges may occur if continuous wireless coverage is not available. For example, deployment of roadside infrastructure devices, in particular the least expensive options such as WiFi may not provide complete, uninterrupted coverage along every road. Thus, it may not be feasible to provide complete coverage at all points on a road and, therefore, gaps in coverage may exist. Even if continuous wireless coverage is available through other wireless technologies, a desire to use a particular type of wireless technology, for example, to minimize cost, may be difficult if devices providing the desired technology have gaps in coverage. Accordingly, a vehicle may need to find a path via other vehicles from the vehicle's current location to the nearest (or best) gateway (e.g., AP or base station) so that packets can be routed to and from the Internet.

Finding another path to a local infrastructure device may be possible through vehicle-to-vehicle communication that supports single and multihop scenarios. However, high vehicular mobility creates dynamic network environments as the topology and connectivity between vehicles continually changes. Specifically, fast moving vehicles may be associated with shorter-range roadside infrastructure devices (e.g., WiFi APs, Femto, Micro, or Pico base stations, etc.) for relatively short periods of time before leaving the wireless coverage area. Additionally, a rapidly changing configuration of vehicles relative to one another, coupled with high speed and mobility, offers a challenging environment for attempting to route packets through a selected path to the infrastructure because nodes in the selected path are apt to change. The challenges presented by high vehicular mobility may be exacerbated by a destination vehicle node of a packet also moving at the same time as a source vehicle node of the packet.

Vehicle-to-vehicle (also referred to herein as 'peer-to-peer') connectivity, vehicle-to-infrastructure connectivity, and vehicle-to-vehicle-to-infrastructure connectivity can create many opportunities for potential application services and data exchanges between vehicles and between vehicles and the Internet. Networks including two or more vehicles as peers are referred to herein as 'ad hoc' or 'mesh' networks. As used herein, the term 'peer' is intended to mean a mobile node such as an OBU with an established direct communication link to another mobile node such as an OBU. Numerous networking environments may be formed ranging from cellular networks, ad hoc vehicle-to-vehicle-cellular, ad hoc vehicle-to-vehicle-WiFi, to isolated ad hoc networks that are entirely disconnected from roadside infrastructure. Moreover, these networking environments manifest different forms of network connectivity.

Due to high vehicular mobility and the ability of OBU 30 to switch from broadband cellular connected environments to isolated ad hoc networks, vehicle users may experience disruptions in Internet-based cloud communications, peer-to-peer communications, data exchanges, and application services. Common Internet-based cloud applications and services may not be practical in a highly disruptive, vehicular environment. Moreover, standard models relying on end-to-end connectivity are less relevant in dynamically changing network environments with frequent connectivity disruptions. Furthermore, relying on Internet-based servers that are always available may be unrealistic in vehicular environments.

Thus, to enable a viable vehicular network with application services and data exchanges, opportunistic, store-carry-forward techniques may be needed to avoid data loss whenever a disruption occurs. Additionally, vehicles and their users may want to form location and interest aware communities using vehicle-to-vehicle ad hoc communities without the need for Internet-based clouds.

The plethora of wireless interfaces on OBU 30 can enable a rich set of connections and routing possibilities. Without sophisticated routing protocols that can work at high speeds, however, packets traversing a dynamically changing vehicular network can be lost or may never reach their intended destination due to various inherent disruptions. Disruptions in a mesh or ad hoc vehicular network can occur at any point in time due to any number of vehicles having connectivity changes including, for example, moving out of range of a roadside infrastructure device and/or moving out of range of a vehicular mesh (or ad hoc) network.

A dynamically changing vehicular network can also result in dynamically changing paths from a source node to a destination node. Specifically, a path between a source node and a destination node in a vehicular ad hoc network environment can disappear or change or a new path can be created at any point in time. Support for temporary disruptions and dynamically changing routing paths in a vehicular network could provide a more viable network environment to provide application services and data exchanges.

Generally mobile access points such as mobile routers and network mobility devices may offer mobility services to connected endpoint devices such as those using Internet Protocol (IP). One common example mobility scheme is Mobile IP, which is an Internet Engineering Task Force (IETF) standard communications protocol that is designed to allow mobile device users to move from one network to another while maintaining a permanent IP address. Accordingly, such solutions can enable users to have uninterrupted connectivity as they move within and across networks.

Because typical mobile access points are usually limited to a specific mobility solution or protocol, mobility capabilities of a connected endpoint device are typically ignored by these mobile access points. While this approach could be sufficient for devices and networks operating under a single or shared administration domain, or for endpoint devices without a mobility scheme, this approach may be limiting in more heterogeneous environments such as, for example, buses, ships, trains, and even automobiles. For instance, if a Mobile IP (MIP) node connects to a mobile router, the mobile router operates independently of the mobile node's mobility capabilities, and may create two MIP tunnels. This can result in added latency. Additionally, as other mobility schemes become more dominant, a solution is needed that can provide services for common mobility schemes and adapt services accordingly.

With respect to an on-board unit such as OBU 30 proposed herein, endpoint devices (e.g., in-vehicle mobile devices 18*a*-*b*) may connect to OBU 30, which can function as a mobile access point, to exploit significant features provided by OBU 30 such as power consumption, optimized network stack, improved connectivity, and greater connectivity possibilities. On the other hand, mobile connected endpoint devices may prefer to maintain their own mobility scheme. Therefore, interoperability of various mobility schemes is desirable. Accordingly, a solution is needed to enable OBU 30 to automatically discover mobility capabilities of a connected endpoint device and adjust mobility services according to protocol properties of the endpoint device's mobility capabilities. Such solutions could offer a variety of options and cover at least the more dominant and widely adopted protocols, rather than being limited to one mobility scheme.

In accordance with one example implementation, communication system 10 can resolve the aforementioned issues relating to sensor data and navigational map rendering. Specifically, communication system 10 can utilize a fully integrated, richly connected on-board unit (OBU) 30 to collect sensor data from machine devices and other sensor-enabled devices connected to OBU 30, and push the sensor data to a sensor data collection system in an Internet-based cloud. Thus, an aggregated database of sensor data can be processed holistically and, if desirable, certain information may be provided to consumers (e.g., map tiles pushed to navigational systems in vehicle clients or other mobile or user devices requesting such information). Additionally, OBU 30 can provide storing, prefetching, and sharing subsets of map tiles to enable a seamless user experience in which the user feels they have access to the entire map.

In further example implementations, communication system 10 can enable a disruption tolerant vehicular network environment with middleware of OBU 30 configured to provide pervasive application services and data exchanges. OBU 30 can provide techniques in which vehicles are able to host, proxy, cache, and discover location and interest aware disruption tolerant data, applications, and services. In addition, mechanisms provided in communication system 10 can enable OBUs and their users to discover each other and join communities of interest based on, for example, location, and respective interests. Hierarchical or tiered vehicle directories can facilitate discovery, creation of communities of interest, and location of application services and data.

To enable pervasive application services and data exchanges, a comprehensive routing architecture and interoperability of mobility schemes may also be provided. The routing architecture can allow optimal selection of one of several possible paths between a vehicle source node and a destination node accessible through a roadside infrastructure device and between a vehicle source node and a vehicle destination node. In addition, other features include maintaining session continuity when a routing path changes, supporting temporary connection disruptions (e.g., approximately several minutes), and scalability. Finally, communication system 10 may also allow interoperability of mobility schemes. In an example implementation, OBU 30 can automatically discover mobility capabilities of a connected endpoint device and adjust mobility services according to protocol properties of the endpoint device's mobility capabilities.

In accordance with additional embodiments, communication system 10 can address the challenges relating to maintaining wireless connectivity from a vehicle to a roadside infrastructure device. In particular, OBU 30 can be configured to optimize access to roadside infrastructure devices, and in particular, to shorter-range roadside infrastructure devices (e.g., IEEE 801.11 APs, Micro/Pico/Femto base stations, etc.) along a driving path and direction. Such roadside connectivity opportunities can be managed by utilizing the relatively low-bandwidth macro cellular connection of the vehicle along with the computing platform of OBU 30 and a global positioning system (GPS), which may be coupled to or fully integrated with OBU 30. Communication system 10 may also enable bridging gaps in wireless coverage from roadside infrastructure devices by changing to a vehicle-to-vehicle-to-infrastructure routing path from a vehicle-to-infrastructure routing path. A variation in signal strength, in addition to other factors (e.g., loss rate, throughput, etc.), as a vehicle moves along a road may be used to select a roadside infrastructure device, such as a WiFi access point, and/or to switch from being directly connected to a roadside infrastructure device to routing through an ad hoc network of vehicles to a suitable roadside infrastructure device, for example, a next available WiFi access point along the path and direction of the vehicle.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "additional embodiments", "alternative embodiment", and the like are intended to mean that any such features are included in one or more embodiments of the present disclosure, but may or may not necessarily be combined in the same embodiments. Furthermore, the words "optimize," "optimization," "optimal," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Turning to the infrastructure of FIG. 1, end user 2 can be associated with a human agent (e.g., a driver or passenger). End user 2 may initiate communication in communication system 10 via some network, and such communication may be initiated through any suitable device, inclusive of an in-vehicle mobile device 18*a* or 18*b*, display 28, and a navigation system 17, which could be integrated with OBU 30 and/or an infotainment system (not shown). In one embodiment, additional displays may be provided for one or more passengers in vehicle 4. Mobile devices, such as in-vehicle mobile devices 18*a-b*, are inclusive of mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within communication system 10. Data, as used herein in this specification, refers to any type of numeric, voice, video, or script data, or any type of source or object code, or any other suitable information in any appropriate format that may be communicated from one point to another in electronic devices and/or networks.

In-vehicle mobile devices 18*a-b*, and mobile devices external to vehicle 4, may communicate with OBU 30 of communication system 10 through any suitable wireless or wired communication link and may be configured as a personal area network (PAN) or a wireless personal area network (WPAN) or any other appropriate networking architecture or system that facilitates communications in a network environment. Wired and wireless communication links may be inclusive of any electronic link such as Bluetooth, wireless technologies (e.g., IEEE 802.11x), a USB cable, an HDMI cable, etc. Connection between mobile devices and OBU 30 may be configured based on particular needs and logistics. In one example, an external mobile device may be connected to OBU 30 through a USB cable or wireless network when, for example, the external mobile device is a diagnostic tool used by a mechanic for servicing vehicle 4.

Networks 40 represent external networks, which can be a series of points or nodes of interconnected communication paths for receiving, sending, and/or forwarding packets of information that propagate through communication system 10. Networks 40 offer communicative interfaces between any of the components of FIG. 1 and remote nodes and other electronic devices of transaction systems 50, authorized entities 98, and other vehicles 59. Networks 40 could include any local area network (LAN), wireless local area network (WLAN), wide area network (WAN), wireless wide area network (WWAN), metropolitan area network (MAN), wireless metropolitan area network (WMAN), wireless single hop or multi-hop vehicle-to-vehicle network, vehicle-to-vehicle-to-infrastructure network, virtual private network (VPN), Intranet, Extranet, or any other appropriate architecture or system that facilitates communications in a network environment. Networks 40 may include any suitable communication link to OBU 30 such as wireless technologies (e.g., IEEE 802.11x, 802.16, WiFi, near field communication (NFC), DSRC, etc.), satellite, cellular technologies (e.g., 3G, 4G, WiMAX/LTE, GSM/WCDMA/HSPA, CDMA1x/EVDO, etc.), etc., or any suitable combination thereof. Networks 40 may also include configurations capable of transmission control protocol/Internet protocol (TCP/IP) communications, user datagram protocol/IP (UDP/IP), or any other suitable protocol, where appropriate and based on particular needs.

Embodiments of OBU 30 may include one or more distinct interfaces, represented by network interfaces 26, to facilitate communication via the various networks (including both internal and external networks) described herein. Such network interfaces 26 may be inclusive of multiple wireless interfaces (e.g., WiFi, WiMAX, 3G, 4G, white space, 802.11x, satellite, Bluetooth, near field communication (NFC), LTE, GSM/WCDMA/HSPA, CDMA1x/EVDO, DSRC, GPS, etc.). Other interfaces represented by network interfaces 26, may include physical ports (e.g., Ethernet, USB, HDMI, etc.), interfaces for wired and wireless internal bus subsystems, and the like. Similarly, each of the nodes of communication system 10, described herein, can also include suitable interfaces for receiving, transmitting, and/or otherwise communicating data or information in a network environment.

Regarding a physical implementation of OBU 30 and its associated components, any suitable permutation may be applied based on particular needs and requirements, including the design of the particular vehicle in which OBU 30 is implemented. In example implementations, various components of OBU 30 may be installed in different physical areas of the vehicle or may be installed as single unit, with display 28 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

Communication system 10 may be configured to facilitate communication with machine devices (e.g., vehicle sensors, instruments, electronic control units (ECUs), embedded devices, actuators, displays, etc.). OBU 30 may be implemented to provide one or more suitable communication interfaces (e.g., network interfaces 26) to legacy bus subsystems in vehicles such as, for example, a controller area network (CAN) a low speed network (LIN), a flexray communications protocol network, media oriented systems transport (MOST), and the like.

Typically, numerous ECUs, with different embedded software, may be found in a single automobile and may communicate via one or more internal network subsystems 20. Such subsystems 20 generally include legacy bus subsystems such as Controller Area Network (CAN), LIN, Flexray, and MOST. For example, vehicle controls 16*a-b* may be inclusive of any embedded system or ECU that controls one or more of the electrical subsystems in vehicle 4. Sensors 14*a-b* may represent wheel and headlight sensors respectively. Actuator 13 may represent a vehicle-setting device such as a seat-positioning device for adjusting various seat positions (e.g., longitudinal position relative to the brake and gas pedals, tilt position, lumbar support, etc.). Actuator 13 and other similar vehicle setting devices (e.g., temperature controls, sunroof, door locks, power windows, etc.) may be configured for communication via internal network subsystem 20. Sensor 14*c* represents a type of sensor or device that may be configured for communications via flexray communications protocol (e.g., a radar collision sensor). Vehicle control 16*c*, representing one or more ECUs, may be suitably integrated for controlling the flexray network and sensors and other associated components.

Subsystems 20 may have alternative configurations in other embodiments, and may be suitably coupled to or integrated with OBU 30. For example, subsystems 20 may include a central hub that interconnects sensors, actuators, and controls and controls communications to and from OBU 30. In yet other embodiments, subsystems 20 could be partially or fully configured using Ethernet networking technology, or other suitable technologies enabling Internet Protocol (IP) communications, user datagram protocol (UDP) communications, or other suitable communication protocols for relaying packets across a network. OBU 30 may be configured to provide one or more suitable communication interfaces (e.g., network interfaces 26) to accommodate the possible implementations of subsystems 20, including interfaces for an IP network, UDP network, or any other suitable protocol or communication architecture provided to enable network communication with machine devices in vehicle 4.

In the particular example shown in FIG. 1, vehicle 4 includes capabilities associated with navigation system 17 and vehicle diagnostics 19. Navigation system 17 may be provided in various embodiments including, for example, a portable navigation system or, alternatively, a fixed navigation system, each of which may be configured for wireless or wired communications to OBU 30. In other embodiments, navigation system 17 may be integrated with OBU 30, and navigation information such as maps and points of interest could be displayed for users on display 28. Other more specific machine devices, not shown in FIG. 1, may include display panel instruments, climate controls, interior lights, door locks, trunk open/shut actuator, hood open/shut actuator, seat heater and/or cooler, sunroof open/shut actuator, window heater/defroster/defogger, info/entertainment systems (e.g., speakers, radio, DVD, CD, etc.), and the like.

Figure 2:
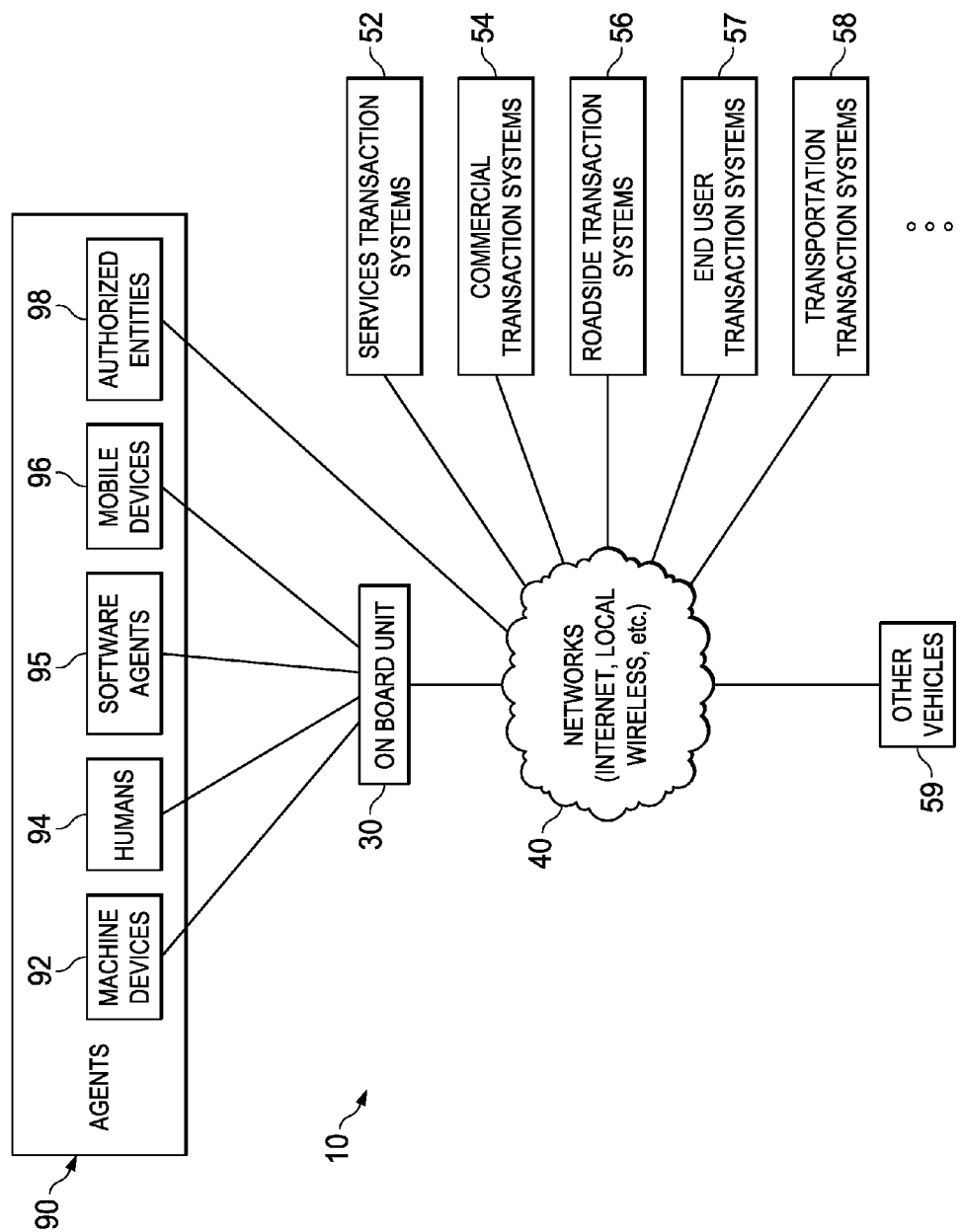
FIG. 2 is a simplified block diagram illustrating additional details of the communication system in exemplary network environments associated with embodiments of the present disclosure.

Turning to FIG. 2, communication system 10 is illustrated with OBU 30 shown coupled to agents 90 and networks 40. In one embodiment, agents 90 can include machine devices 92, humans 94, and mobile devices 96. In addition, agents can also include software agents 95 and authorized entities 98. Software agents 95 can include any application provisioned in a memory element accessible to OBU 30 (e.g., memory element 24), and which may be initiated automatically in response to a particular set of criteria or conditions (e.g., every time network connectivity is detected on OBU 30, whenever OBU 30 is powered on and a particular time interval has passed, in response to another software agent, etc.). Note that an 'application' as used herein this Specification, can be inclusive of an executable file comprising instructions that can be understood and processed on a computer, and may further include library modules loaded during execution, object files, system files, hardware logic, software logic, or any other executable modules.

Authorized entities 98 may include various entities having authorization to access a vehicle 4 such as, for example, a dealer of the vehicle, a manufacturer of the vehicle, OEMs associated with the vehicle, and public entities having an interest in the vehicle (e.g., State Departments of Transportation, local police departments, etc.). A node associated with authorized entities may typically be remotely located from OBU 30 and, therefore, accessible from OBU 30 through networks 40 such as the Internet or other WANs including any available communication link (e.g., 3G, 4G, WiFi, WiMAX/LTE, etc.) providing network access from OBU 30 to the Internet or other WAN. In some scenarios, however, OBU 30 may be locally accessible to an authorized entity such that Internet access is unnecessary. For example, when vehicle 4 is being manufactured and is located at one of the manufacturer's facilities, OBU 30 may be capable of accessing the manufacturer's network through a LAN or WLAN. Similarly, when a vehicle 4 is taken to a dealer for maintenance, OBU 30 may connect to the dealer network through a communication link that does not include the Internet or any other wide area network.

Networks 40 can also facilitate communication between certain agents 90 (i.e., machine devices 92, humans 94, software agents 95, mobile devices 96) and transaction systems 50. By way of example, transaction systems 50 may include services transaction systems 52, commercial transaction systems 54, roadside transaction systems 56, end user transaction systems 57, and transportation transaction systems 58 on nodes or other electronic devices. Each of the transaction systems can be associated with many different types of entities and many different transaction scenarios. Services transaction systems 52 can encompass numerous entities providing services such as identity service providers, mobile wireless service providers, banks and other financial institutions, location-based services (LBS), travel agencies, vehicle rental and leasing agencies, Internet websites, etc.

Commercial transaction systems 54 may include entities facilitating commercial transactions through the Internet (e.g., video and music download sites, online retailers, etc.), etc. Roadside transaction systems 56 may include various entities providing roadside services such as gas and electric charging stations, kiosks (both roadside and drive-through), etc. End user transaction systems 57 may include user devices (e.g., mobile devices, laptops, personal computers, cellular telephones, etc.) for communication with OBU 30 through networks 40. Transportation transaction systems 58 may include entities or devices facilitating vehicle charging transactions related to toll payments, ferry charges, bridge toll payments, parking, Vehicle Miles Traveled (VMT), and any other transportation costs incurred as a result of moving vehicle 4 from one location to another. All of transaction systems 50 (e.g., transaction systems 52, 54, 56, 57, 58) as categorized, are provided for purposes of illustration and ease of understanding, and it will be appreciated that certain entities may logically be included in multiple transaction systems (e.g., a bank could be described as both a services transaction system and a commercial transaction system) and that numerous types of transaction systems and entities other than those enumerated herein may also be possible.

Other commercial transactions may occur through OBU 30 by accessing other vehicles 59 (vehicle-to-vehicle commerce). An available network represented by networks 40, may provide a communicative pathway between vehicle 4 and other vehicles 59, where vehicle 4 includes OBU 30 and other vehicles 59 include a suitable communication device (e.g., mobile device, OBU). The communicative pathway between vehicle 4 and other vehicles 59 could be established as a single hop or multi-hop vehicle-to-vehicle network through WiFi, WiMAX, DSRC, or any other suitable wireless technologies enabling a communication link between vehicle 4 and other vehicles 59.

Commercial transactions could occur between a mobile device in one vehicle (connected to an OBU) and an OBU in another vehicle, between mobile devices in separate vehicles with OBUs, or between OBUs of separate vehicles. Commercial transactions may also be conducted between OBU 30 and mobile devices 96 (vehicle-to-mobile device commerce), such as when a mobile device purchases content from OBU 30 of the same vehicle. Another type of commercial transaction can include in-vehicle commerce in which a user of a mobile device pays for the use of resources through OBU 30 (e.g., in the case of a passenger in a commercial vehicle such as a taxi cab) or when mobile devices within a vehicle use the network available through OBU 30 to conduct commercial transactions with each other. In addition to commercial transactions, these communicative pathways involving vehicles and mobile devices may also be established for any other suitable services or transactions, providing proper authentication and network credentials are obtained, if needed.

Applications installed on OBU 30 can be considered transaction applications and can include a plethora of user-level and system-level applications. With proper authentication to OBU 30 and authorization, numerous types of transactions using the transaction applications may be performed through OBU 30. Generally, types of transactions are inclusive of 1) accessing one or more wireless/mobile/cellular networks and using network bandwidth and services, 2) gaining access to various resources of the vehicle, 3) gaining access to applications in the vehicle, and 4) engaging in commercial activities (e.g., paying for receiving goods or services, or receiving payment for selling goods or services).

Figure 3:
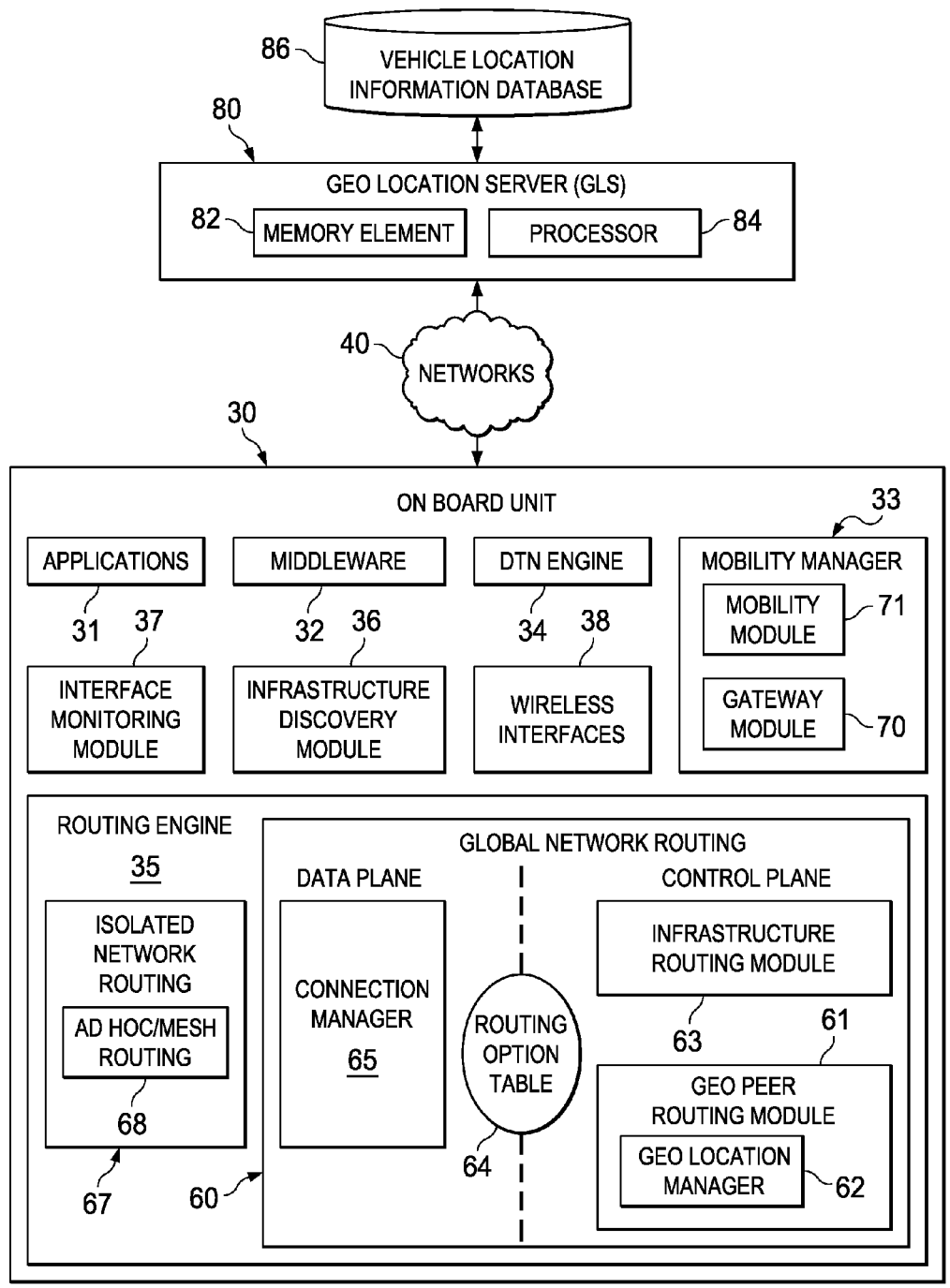
FIG. 3 is a simplified block diagram illustrating additional details that may be associated with an on board unit (OBU) of a connected vehicle and a geo location server in the communication system in accordance with embodiments of the present disclosure.
Figure 38:
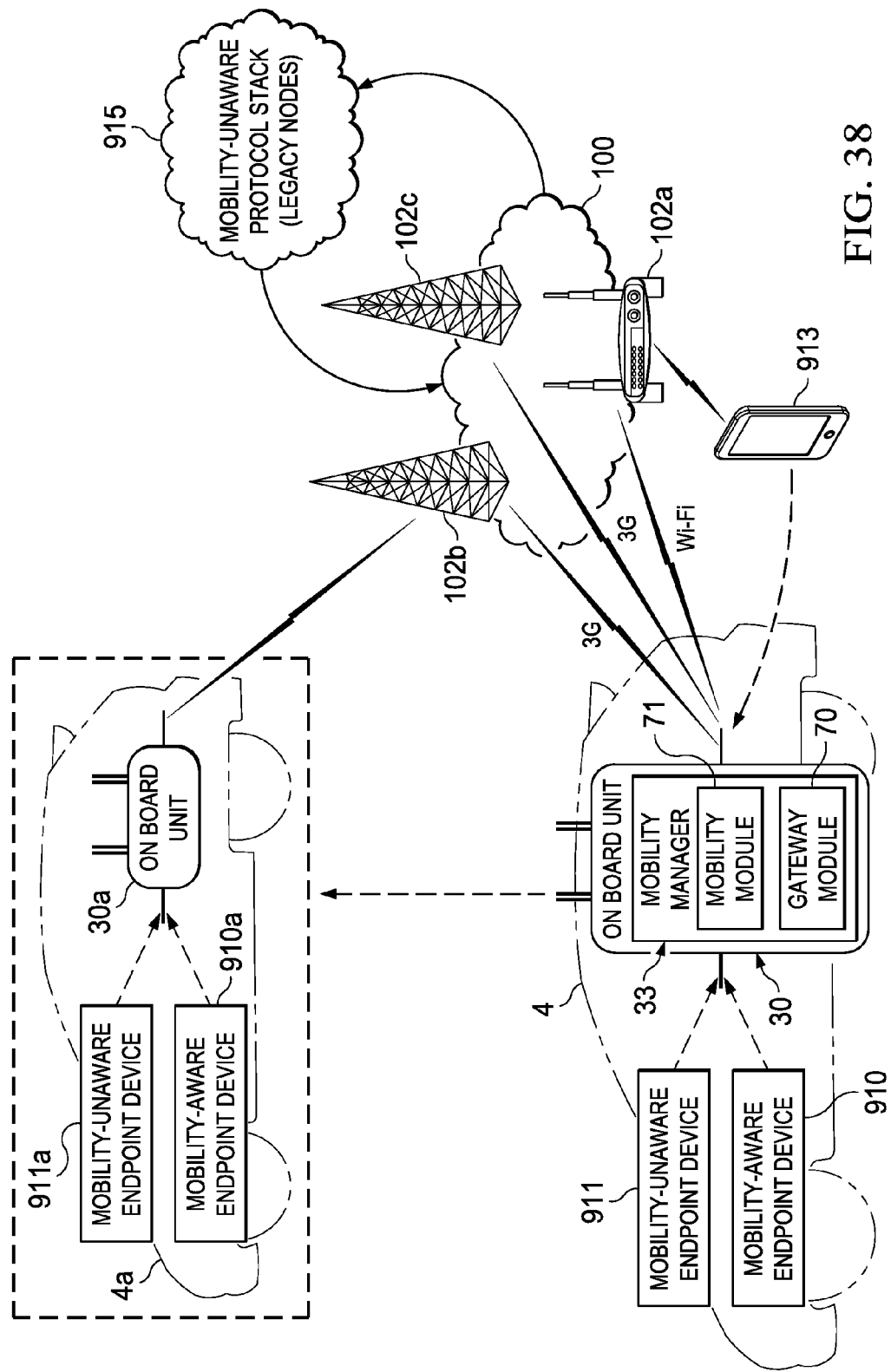
FIG. 38 is a simplified schematic diagram of an exemplary network environment illustrating possible mobility scenarios in the communication system that may be associated with embodiments of the present disclosure.
Figure 39:
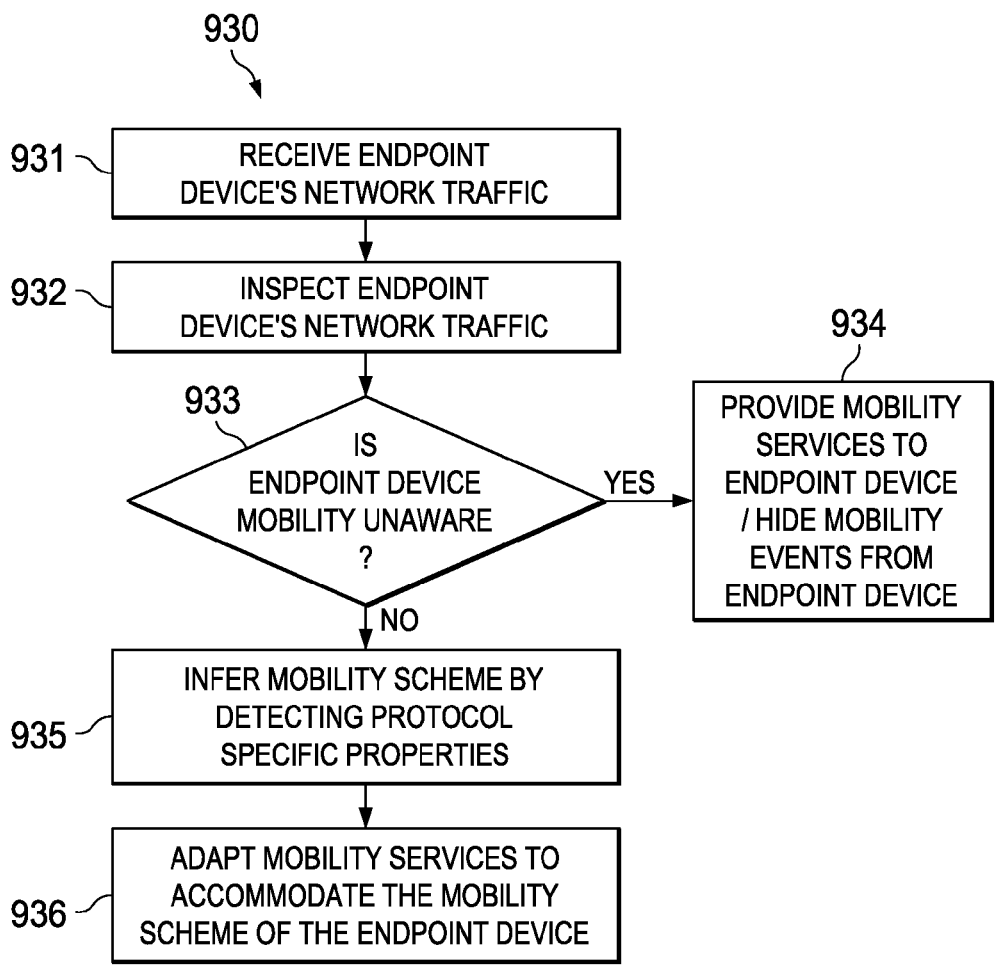
FIG. 39 is a simplified flowchart illustrating example operations that may be associated with mobility scenarios in certain embodiments of the communication system in accordance with the present disclosure.
Figure 40:
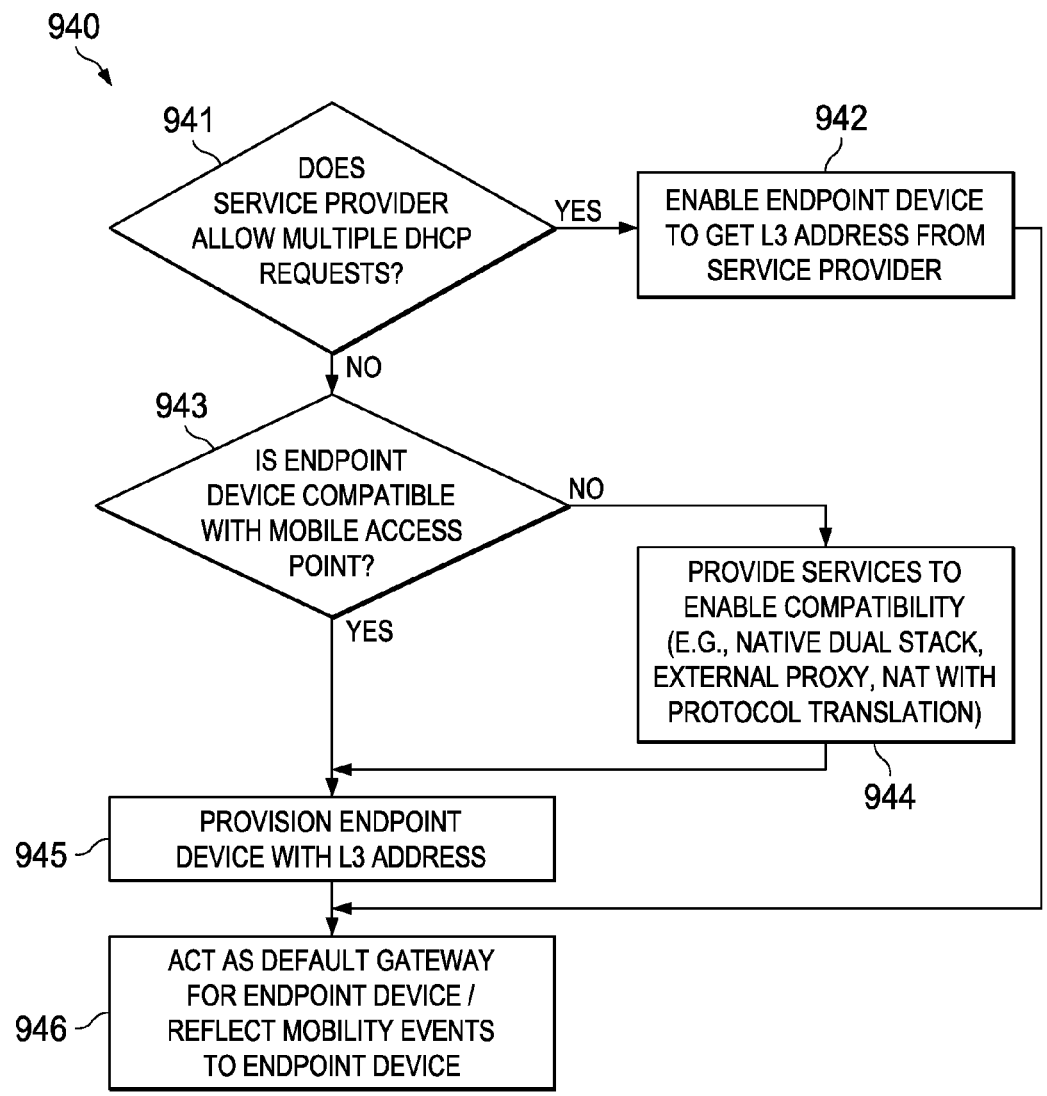
FIG. 40 is a simplified flowchart illustrating additional example operations that may be associated with mobility scenarios in certain embodiments of the communication system in accordance with the present disclosure.

Turning to FIG. 3, FIG. 3 is a simplified block diagram illustrating additional details that may be associated with OBU 30 and a geo location server (GLS) 86 in an embodiment of communication system 10 providing disruption-tolerant routing and application services and data exchanges in a vehicular network environment, in addition to discovery and selection of mobility schemes. OBU 30 may include applications 31 and middleware 32, which will be further described with reference to disruption-tolerant application services and data exchanges (FIGS. 13-20). OBU 30 may include a mobility manager 33 with a DHCP-NAT/Mobility Module 71 and a DHCP-NAT/Gateway module 72, which will be further described with reference to discovery and selection of mobility schemes (FIGS. 38-40).

OBU 30 may also include a disruption-tolerant engine (DTN engine) 34, a routing engine 35, an infrastructure discovery module 36, an interface monitoring module 37, and wireless interfaces 38 (as previously described with reference to network interfaces 26), which can enable disruption-tolerant routing in embodiments of communication system 10 described herein. Routing engine 35 may include a global network routing component 60 and an isolated network routing component 67. Isolated network routing 67 supports peer-to-peer routing and, therefore, any standard ad hoc routing protocols 68 may be used such as, for example, ad hoc on demand distance vector routing (AODV), optimized link state routing (OLSR), and distributed geographical routing. Global network routing component 60 includes a data plane and a control plane. The data plane includes a connection manager 65 and the control plane includes an infrastructure routing module 63 and a geo peer routing module 61, which may include a geo location manager 62. Finally, a routing option table 64 is accessible by both the data plane and the control plane.

OBU 30 may be configured to access a geo location server (GLS) 80 through networks 40, including for example, 3G, 4G, WiFi, or other suitable wireless connection to the Internet. Geo location server 80 may include a memory element 82 and a processor 84, and may also include or have suitable access to a vehicle location information database 86. Additionally GLS 80 may have any appropriate modules for enabling and managing requests for information from and access to vehicle location information database 86. GLS 80 is a vehicle location provider and may be configured as a network element such as a server or any other suitable device, component, element, or object operable to exchange information in a network environment.

Different types of communication links with external nodes may be available through wireless interfaces 38 of OBU 30. An infrastructure link is a communication link connecting OBU 30 to a roadside infrastructure device (e.g., 3G, 4G, WiFi, WiMAX, etc.). A peer link is a communication link connecting one OBU (also referred to interchangeably as 'peer' or 'vehicle' or 'neighbor' or 'node') directly to another OBU. Wireless interfaces 38 of OBU 30 may include multiple physical and/or virtual wireless interfaces, which can be associated with multiple roadside infrastructure devices, neighboring OBUs, in-vehicle devices, and any other device within a wireless range of OBU 30 that can associate with and connect to OBU 30. An interface of an OBU may attempt to associate with a roadside infrastructure device, another OBU, an in-vehicle device, or a mobile device to establish a communication link. Interface association includes discovery, authentication if necessary, and IP address assignment if any.

A vehicle having an established direct connection or infrastructure link to a roadside infrastructure device is referred to herein as operating in a 'roadside infrastructure mode' or 'station mode'. A vehicle having a direct connection or peer link to another vehicle is referred to herein as operating in a 'mesh mode', 'peer mode', or 'ad hoc mode'. Finally, a vehicle having a direct connection to a mobile device (in-vehicle or external) or a road side user device is referred to herein as operating in 'hub mode'.

Interface monitoring module 37 is responsible for link status and quality monitoring as well as neighbor discovery. Upon initiation, interface monitoring module 37 obtains a list of interfaces from a kernel of OBU 30. If an infrastructure link is available, interface monitoring module 37 may send a PING to a controller to determine whether or not a connection can be established through the infrastructure link. The controller may be a network element, also described in co-pending U.S. Provisional Application Ser. No. 61/433,138, filed Jan. 14, 2011, by Addepalli et al., entitled "SYSTEM, METHOD, AND PROCESSES ASSOCIATED WITH CONNECTED VEHICLES," (Provisional Application No. '138), which was previously incorporated herein by reference in its entirety. In one example embodiment, the controller could be integrated with geo location server (GLS) 80 shown in FIG. 3. If a peer-to-peer link is available, Hello messages may be broadcast periodically containing the following information, for example:

| Number List | Infrastructure Connectivity | Link Metric | Geo Location | Tree Information |
|---|---|---|---|---|
| List of IP neighbors with persistence value | 0-7 (Based on connection quality) | Bandwidth, Delay, SNR, etc. | XY-coordinates, Velocity, Direction, Turn prediction based on maps | Parent, Connectivity |

The Hello message format described above can comprise information an OBU 30 can use to advertise to its neighbors in order to enable routing engine 60 to make optimized routing decisions to transmit packets across the vehicular ad hoc network. For example, the infrastructure connectivity field can indicate the quality of connectivity from an OBU to a roadside infrastructure device. Because OBUs can be multiply connected at any given time, this field could contain a corresponding connectivity parameter for each infrastructure link of the corresponding OBU.

In certain embodiments, it may not be necessary to transmit all fields in the Hello message each time. Based on the change in the parameters and importance of these changes, only certain fields may need to be transmitted in the Hello message. This could help reduce overhead by eliminating redundant information in the Hello messages.

In one embodiment, the Hello messages contain information about the particular OBU initiating the messages and are broadcast to 1-hop neighbors (e.g., other OBUs that are 1 peer link away). Different implementations may allow Hello messages to be sent to neighbors that are more than 1-hop away. In such a design, the Hello messages could have embedded information about 1-hop neighbors and/or other neighbors that are more than 1-hop away from the OBU receiving the Hello messages.

In one example embodiment, infrastructure routing information can be embedded in Hello messages. In this embodiment, a tree information field provides information about parent nodes to build a routing tree. A routing tree may be built using a tree-based protocol such as, for example, RPL (Routing Protocol for Low Power and Lossy Networks) or an adaptation of RPL. In one implementation, a root of the tree can be a roadside infrastructure device, for example, a WiFi access point. In another implementation, an OBU with an infrastructure link can be the root. For example, an OBU that is directly connected to a 3G base station or a WiFi access point can be the root of the tree.

An OBU can potentially be a 'parent node' or 'parent OBU' if the OBU has either a 1-hop or a multi-hop connection to one or more roadside infrastructure devices. The connected OBU can be a parent node of one or more selected 1-hop neighbors in the routing tree, which are 'children nodes' accessing infrastructure through the parent node. Moreover, depending on the routing tree, any node can be a parent and/or a child. For example, consider an ad hoc vehicular network of four cars A, B, C and D with a 4-hop path from node D to the infrastructure: A has a direct link to a roadside infrastructure device, B has peer links (1-hop) to A and C, and C has a peer link (1-hop) to D. C can be a parent node of D, which is a child node of C. B can be a parent node of C, which is a child node of B. A can be a parent node of B, which is a child node of A.

Hello messages from a node (OBU) in a vehicular ad hoc network can contain information about the node's level in the routing tree. This information helps each node that receives a Hello message to build a routing option table (e.g., routing option table 64) with information about its neighbors and their connectivity to other nodes in the ad hoc network and to the infrastructure. By default, a node that is not directly connected to infrastructure has a very high level or rank and a node that is directly connected to infrastructure can update its own level or rank to +1. When a receiving node receives a hello message from a neighbor node with a lower level or rank than the receiving node, then the receiving node can set the neighbor node as its parent node and update its own level to the parent node level plus 1.

Routing option table 64 may be used to determine which physical or virtual interface of an OBU should be selected to send a packet. Routing option table 64 may be populated by infrastructure routing module 63 and geo peer routing module 61, which form the control plane of routing engine 35. Connection manager 65 can use routing option table 64 as input to help populate an actual Internet Protocol (IP) routing table to route packets. The following illustrates one example embodiment of the structure of routing option table 64:

| Subnet/Host | Interface Type/Cost | Next Hop | Persistence Index |
|---|---|---|---|
| IPv6 | WiFi, 3G, Ad hoc | IP | 0-7 based on link existence time |
| IPv4 | Cost - 0-7 (configurable) | | |

With reference to the above example routing option table structure, the Subnet/Host field describes the network or host that is accessible through the interface described by the Interface Type field. The Interface Type/Cost field can also provide the cost of transmitting packets via the particular interface. The cost may be used by connection manager 65 to make routing decisions, such as selecting a cost-optimized interface. The Next Hop field provides an IP address of a device (e.g., another OBU) to which packets can be forwarded. If multiple Next Hops are available for an interface, then each Next Hop can have an entry in the routing option table. The Persistence Index field provides additional information on the lifetime of the link. Values between 0 and 7, for example, may be used to describe the length of time for which the particular route has been active. The connection manager 65 may choose a route that has been active for a longer duration to ensure higher reliability. In other example scenarios, when reliability is not the primary goal other routes can be used. The Persistence Index may also allow Quality of Service (QoS) provisioning based on reliability.

After interface monitoring module 37 begins periodically broadcasting Hello messages, it may be configured to wait for notification from the kernel of OBU 30 regarding any ad hoc network changes, for example, discovery of new peer links, discovery of new infrastructure links, and termination of existing links. Interface monitoring module 37 may also collect link and/or path statistics such as bandwidth, delay, signal-to-noise ratio (SNR), and the like.

Infrastructure discovery module 36 may be configured to determine whether or not a vehicle belongs to a global network or to an isolated network at any time. A node such as an OBU belongs in a global network at a particular time if it has communication access to at least one roadside infrastructure device either directly or via multi-hops through other nodes. The global network in this case includes all such nodes. A node such as an OBU belongs in an isolated network at a particular time if the node does not have communication access to any roadside infrastructure device by any means. However, a node in an isolated network may be connected to other isolated nodes directly or via multi-hops through other nodes.

In one embodiment, infrastructure discovery module 36 can determine an OBU belongs in a global network if the OBU has at least one infrastructure link (i.e., directly to a roadside infrastructure device) or peer link to a parent node. Infrastructure discovery module 36 can identify an established peer link to a parent node based on exchanged Hello messages and therefore, can determine the OBU has access to a roadside infrastructure device via multiple hops. An OBU may be assumed to be in an isolated network until a determination is made that the OBU has either direct or multi-hop connectivity to the infrastructure.

Routing engine 35 may have different routing algorithms depending on whether a vehicle belongs to a global network or an isolated network. A vehicle belonging to a global network has access to roadside infrastructure and hence, access to GLS 80 and possibly a controller (not shown, but which may be integrated with GLS 80). Thus, the vehicle can support direct access to infrastructure routing, multi-hop to infrastructure routing, and vehicle-to-vehicle routing.

In one embodiment of global network routing 60, infrastructure routing module 63 may use a tree-based protocol (e.g., RPL or an adaptation of RPL previously discussed herein) to establish a multi-hop path to infrastructure, to obtain vehicle location updates to be forwarded to GLS 80, and to update routing option table 64 for network traffic destined for infrastructure. Geo peer routing module 61 can update routing option table 64 for network traffic destined for peers. A final routing path for network traffic may be selected by connection manager 65. In one example embodiment, connection manager 65 may be configured to apply a user-driven cost-optimized interface selection algorithm to select an optimal path between a source and a destination. Connection manager 65 may also interface with the controller (or GLS 80) to ensure session continuity as a routing path changes. These functions of connection manager 65 are further described in co-pending Provisional Application No. '138.

Nodes in the vehicular ad hoc network may periodically broadcast advertisement messages that can help form the tree. When a new node that is not part of the tree hears these advertisement messages, the new node can choose a parent from the advertisement messages, where the chosen parent may have a shortest path to the infrastructure. In one implementation, a parent may be chosen based on the smallest number of hops to the infrastructure in order to minimize the depth of the tree so that nodes can access the infrastructure using the shortest number of hops possible. The method may be used successively to grow the tree. In another implementation, the information in the advertisement messages could be embedded in Hello messages, as previously described herein.

In the tree-based protocol, child nodes of an ad hoc network may also broadcast information associated with their own connectivity to their parents. This allows discovery of reverse routes, for example, to send packets from a root node (e.g., roadside infrastructure device) to the nodes in the tree (e.g., OBUs).

To update routing option table 64 for network traffic destined for nodes in an ad hoc network, geo peer routing module 61 may contain GPS Location Manager (GLM) 62 that interfaces with GLS 80 through networks 40. GLM 62 can update GLS 80 with the vehicle's location and velocity, can send queries to GLS 80 to determine a destination node's location, and can pass location information to interface monitoring module 37 to be included in Hello messages. Vehicle location information database 86 may be updated by GLS 80 with the information in GLS update messages. GLS 80 and vehicle location information database 86 may be centralized or distributed and may collect updated location information of all vehicles in a global network. An exemplary GLS update message format is shown below:

| IP Address | Velocity | GPS Location | Neighbor IP Addresses |
|---|---|---|---|
| Node's IP address | Node's speed | Node's XY coordinates | IP addresses of node's neighbors |

In one example implementation, when OBU 30 wants to send a message to another node in an ad hoc network, OBU 30 can query GLS 80 (e.g., via direct or multi-hop links to roadside infrastructure such as a 3G base station or WiFi access point) to find a path to a desired destination. In one embodiment, a query message can contain an IP address of a desired destination node. The IP address may be available from a directory service such as domain name service (DNS). A DNS server can provide a correct IP address for a web address or a uniform resource locator (URL). For example, a DNS server can take a query for www.xyz.com, and send back an appropriate IP address corresponding to the XYZ server. The DNS or a similar directory could be available on the Internet or on a local network. An IP address of the DNS server or of a node hosting a similar directory may be configured or set as a default value during a network setup or configuration of OBU 30.

Upon receiving the query for a particular destination node, GLS 80 can determine a path between OBU 30 and the destination node and send a query reply message to OBU 30. In one example embodiment, the GLS query reply message can contain the speed of the destination node to enable predicting whether the destination node has moved to a different road segment such that a new query is needed. The query reply message may also include a list of anchors. The list of anchors could include IP addresses of each node between OBU 30 and the destination node. Alternatively, or if a complete path of nodes is not available, the list of anchors could include waypoints, represented as geographical coordinate locations indicating a direction of a routing path from OBU 30 to the destination node. An example GLS query reply message format is shown below:

| GPS Location | Velocity | Path |
|---|---|---|
| Destination node's GPS location | Destination node's speed | List of anchors from source node to destination node |

Figure 4:
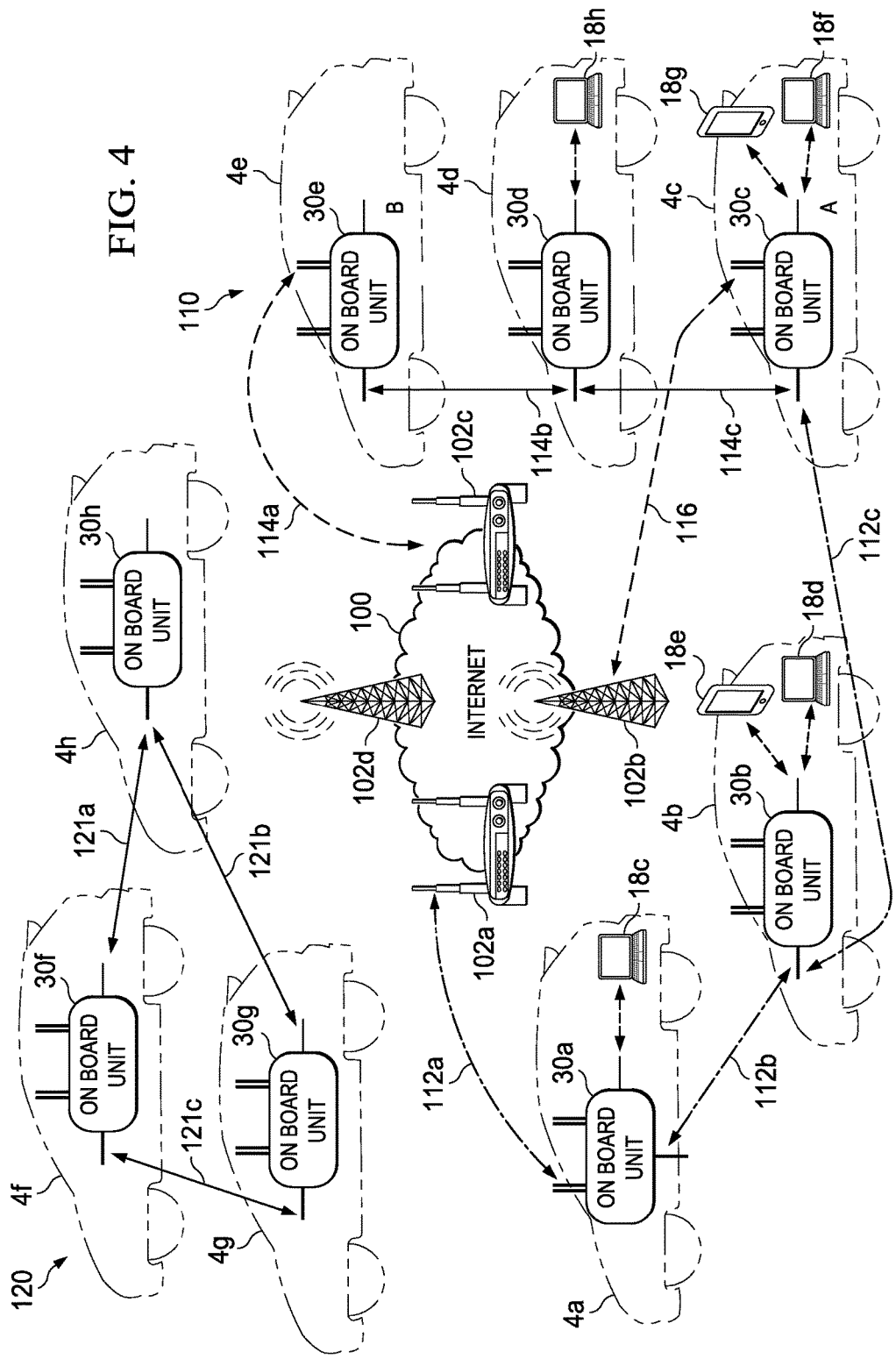
FIG. 4 is a simplified schematic diagram of an exemplary network environment illustrating possible routing scenarios that may be associated with embodiments of the present disclosure.

Turning to FIG. 4, an illustrative example of global and isolated vehicular ad hoc networks, with multiple routing paths is shown. In FIG. 4, multiple roadside infrastructure devices 102a-d provide connectivity to Internet 100. In this example scenario, roadside infrastructure devices 102a and 102c are WiFi access points and roadside infrastructure devices 102b and 102d are 3G or 4B base stations. A global vehicular ad hoc network 110 includes multiple OBUs 30a through 30e in corresponding vehicles 4a through 4e, respectively. Global ad hoc network 110 is connected to Internet 100 via an infrastructure link 112a between roadside infrastructure device 102a and OBU 30a, an infrastructure link 114a between roadside infrastructure device 102c and OBU 30e, and an infrastructure link 116 between roadside infrastructure device 102b and OBU 30c. Various in-vehicle devices 18c-18h are shown having communication links to OBUs 30a-30d, which enable the in-vehicle devices 18a-18h to use services available through the OBUs and to communicate with other nodes in ad hoc network 110 and nodes accessible through Internet 100.

OBUs 30a-e in global ad hoc network 110 also have various connectivity or peer links to neighbors. A peer link 112b connects OBU 30a to OBU 30b, a peer link 112c connects OBU 30b to OBU 30c, a peer link 114c connects OBU 30c to OBU 30d, and a peer link 114b connects OBU 30d to OBU 30e. The communication links in global ad hoc network 110, both between peer OBUs and between OBUs 30a, 30c, and 30d and roadside infrastructure devices 102a-c provide communication channels for data packets to travel between OBUs within global ad hoc network 110 and between OBUs 30a-e and remote nodes connected to Internet 100.

An isolated ad hoc network 120 is also illustrated in FIG. 4 with OBUs 30f through 30h in corresponding vehicles 4f through 4h, respectively. A peer link 121a connects OBU 30f to OBU 30h, a peer link 121b connects OBU 30g to OBU 30h, and a peer link 121c connects OBU 30g to OBU 30f. The peer links 121a through 121c in isolated ad hoc network 120 provide communication channels for data packets to travel between OBUs 30f-g, which are within the same isolated ad hoc network 120. Communication between OBUs 30f-g to Internet 100 and global ad hoc network 110, however, is not possible unless suitable communication links are established. Suitable communication links could include, for example, a communication link established between at least one of OBUs 30f-h and a roadside infrastructure device such as devices 102a-d, or between at least one of OBUs 30f-h and another OBU in a global ad hoc network. As nodes in an ad hoc network move, the nodes may change between connecting to a global network and an isolated network as new communication links are established and/or existing communication links are terminated.

In a global ad hoc network, several possible paths between a source node and a destination node are possible: vehicle-to-infrastructure, multi-hop between vehicles to infrastructure, and vehicle-to-vehicle. Example routing paths are shown in global ad hoc network 110 of FIG. 4. For illustration purposes, three routing paths are identified between node A (OBU 30c) and node B (OBU 30e). A first routing path between node A and node B is a vehicle-to-infrastructure path over infrastructure links 116 and 114a. A second routing path is a multi-hop-to-infrastructure path over peer links 112c and 112b and infrastructure links 112a and 114a. A third routing path between node A and node B is a vehicle-to-vehicle path over peer links 114c and 114b. In embodiments disclosed herein, OBU 30c is able to select the best or optimal path from the available options.

Figure 5:
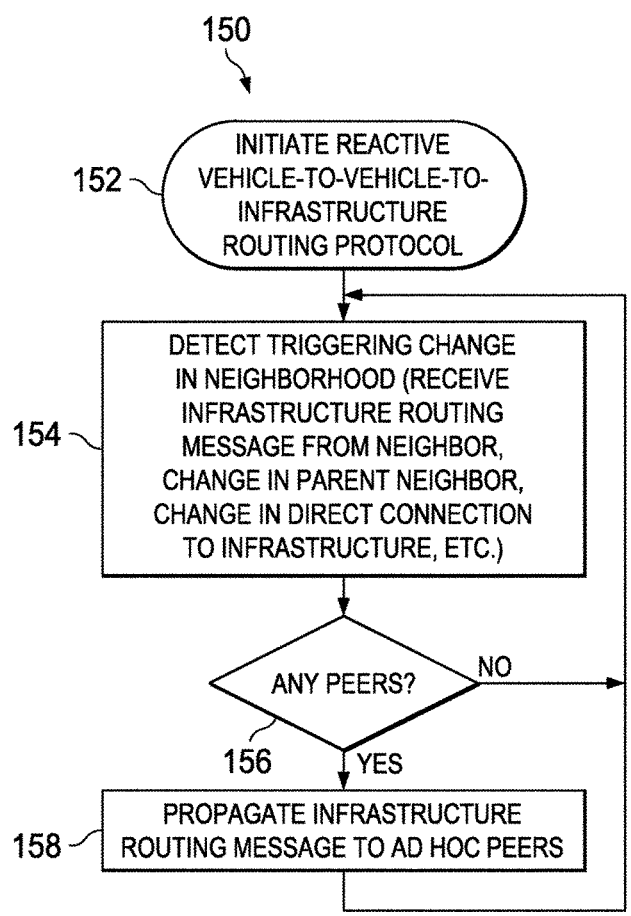
FIG. 5 is a simplified flowchart illustrating example operations that may be associated with a routing protocol in certain embodiments of the communication system in accordance with the present disclosure.
Figure 6:
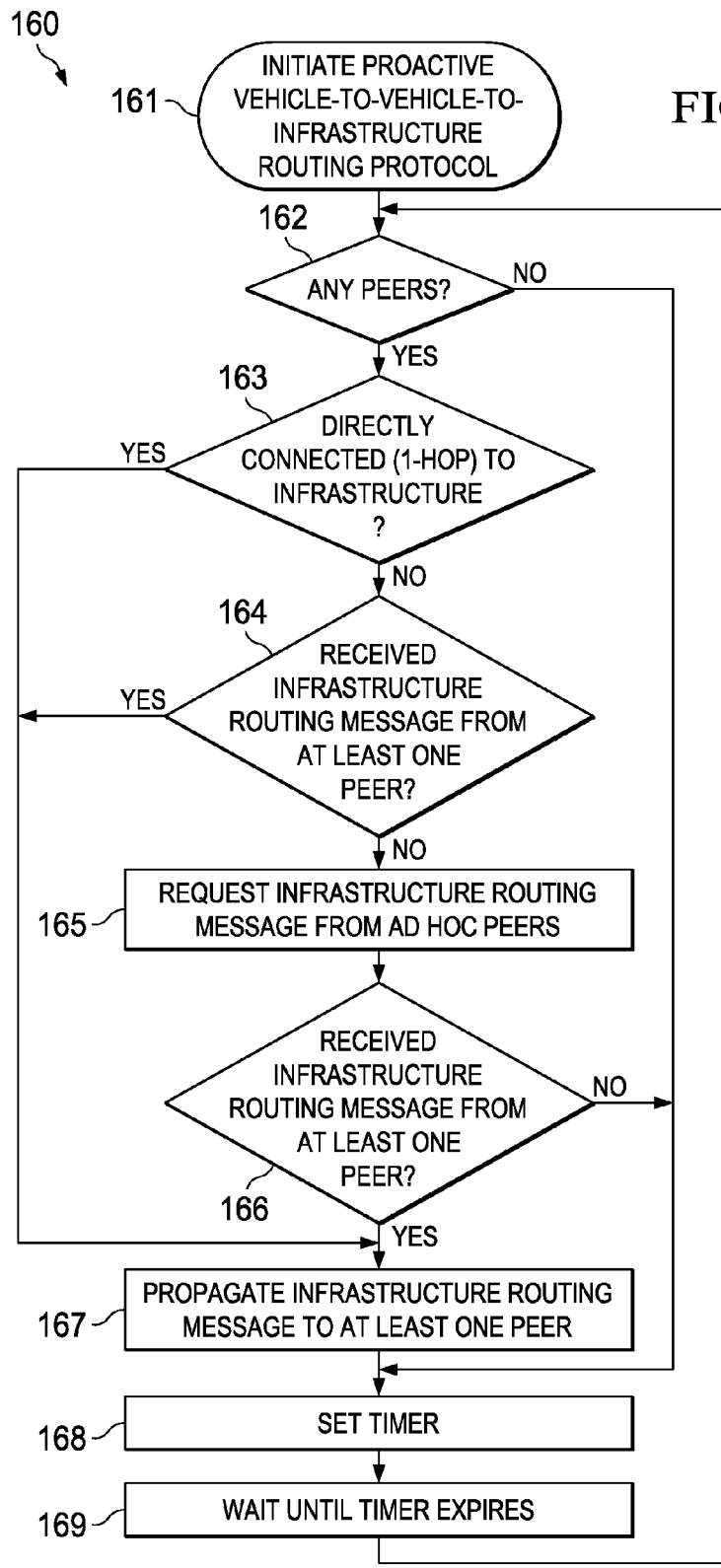
FIG. 6 is a simplified flowchart illustrating other example operations that may be associated with a routing protocol in certain embodiments of the communication system in accordance with the present disclosure.
Figure 7:
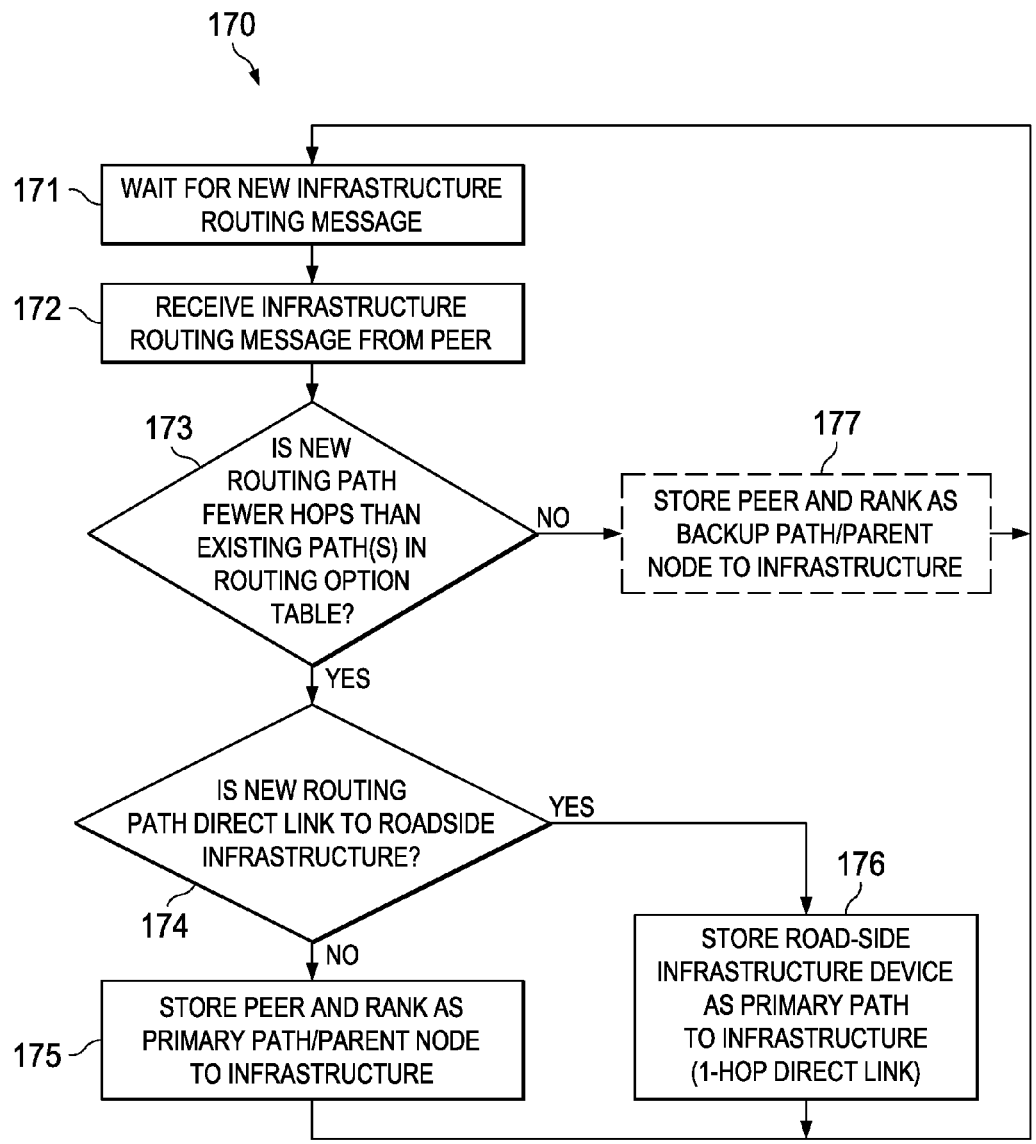
FIG. 7 is a simplified flowchart illustrating further example operations that may be associated with a routing option table in certain embodiments of the communication system in accordance with the present disclosure.

In FIGS. 5 through 7, simplified flowcharts illustrate example operations that may be associated with infrastructure routing module 63 and peer routing module 61 in certain embodiments of communication system 10 in accordance with the present disclosure. FIG. 5 illustrates an example reactive multi-hop-to-infrastructure routing protocol flow 150, which can be initiated at 152 on OBU 30. In a reactive approach, routing messages may be propagated to peers whenever a change in the neighborhood is detected. OBU 30 can wait at 154 until a triggering change in the neighborhood (i.e., 1-hop neighbors such as peers or roadside infrastructure) is detected. A triggering change in the neighborhood could include any change affecting a path to the infrastructure. For example, a change could include receiving an infrastructure routing message from a neighbor, adding or removing a parent, or adding or removing an infrastructure link to a roadside infrastructure device. Once a change is detected, a determination is made at 156 as to whether any peers are connected to OBU 30. If one or more peers are connected, then an infrastructure routing message is propagated to the one or more peers at 158. After the message has been propagated, or if it is determined at 156 that OBU 30 has no peers, then flow returns to 154, to continue waiting for a change in the neighborhood.

In FIG. 6, an example proactive multi-hop-to-infrastructure routing protocol flow 160 is illustrated, which can be initiated at 161 on OBU 30. In a proactive approach, routing messages may be propagated to neighbors on a periodic basis. A determination is made at 162 as to whether OBU 30 is connected to any peers. If OBU 30 is connected to one or more peers, then a determination may be made at 163 as to whether OBU 30 is directly connected (i.e., 1-hop) to a roadside infrastructure device. If not, then a determination is made at 164 as to whether OBU 30 received an infrastructure routing message from at least one peer. If not, then OBU 30 may request at 168 an infrastructure routing message from peers. At 166, a determination is made as to whether OBU 30 received an infrastructure routing message from at least one peer.

If it is determined at 164 or 166 that OBU 30 received an infrastructure routing message from at least one peer (indicating that OBU 30 has a parent node in routing option table 64), or if it is determined at 163 that OBU 30 is directly connected to a roadside infrastructure device, then flow passes to 167 where OBU 30 propagates infrastructure routing messages to peers. Thus, OBU 30 can be added to its peers' routing option tables as a parent node. After infrastructure routing messages are propagated at 167, or if it is determined at 166 that OBU 30 did not receive any infrastructure routing messages from at least one peer (indicating that OBU 30 does not have a parent node in routing option table 64), or if it is determined at 162 that OBU 30 is not connected to any peers, then a timer is set at 168. When the timer expires as indicated at 169, flow passes back to 162 to begin the flow again. Thus, a timer may be repeatedly set to trigger periodic determinations of whether OBU 30 is either directly connected to roadside infrastructure or connected via multi-hop to roadside infrastructure routing and, therefore, whether infrastructure routing messages should be propagated to any peers.

In FIG. 7, an example tree forming flow 170 is illustrated, in which OBU 30 waits at 171 for new incoming infrastructure routing messages. At 172, OBU 30 may receive an infrastructure routing message from a peer or possibly from a roadside infrastructure device. At 173, a determination is made as to whether the message identifies a new routing path to a roadside infrastructure device with fewer hops than existing infrastructure paths in routing option table 64. If the new routing path in the message has fewer hops, then a determination is made at 174 as to whether the new routing path is a direct link (i.e., 1-hop, infrastructure link) to a roadside infrastructure device. If the new path is a direct link to a roadside infrastructure device, then at 176 the roadside infrastructure device is stored as a primary path infrastructure link. Otherwise, at 175 the peer and its rank (i.e., number of hops from the peer to a roadside infrastructure device) are stored as a primary path or parent node. With reference again to 173, if the new routing path has more hops than an existing path in routing option table 64, then optionally, at 177 the peer and its rank may be stored as a backup parent node.

Figure 8:
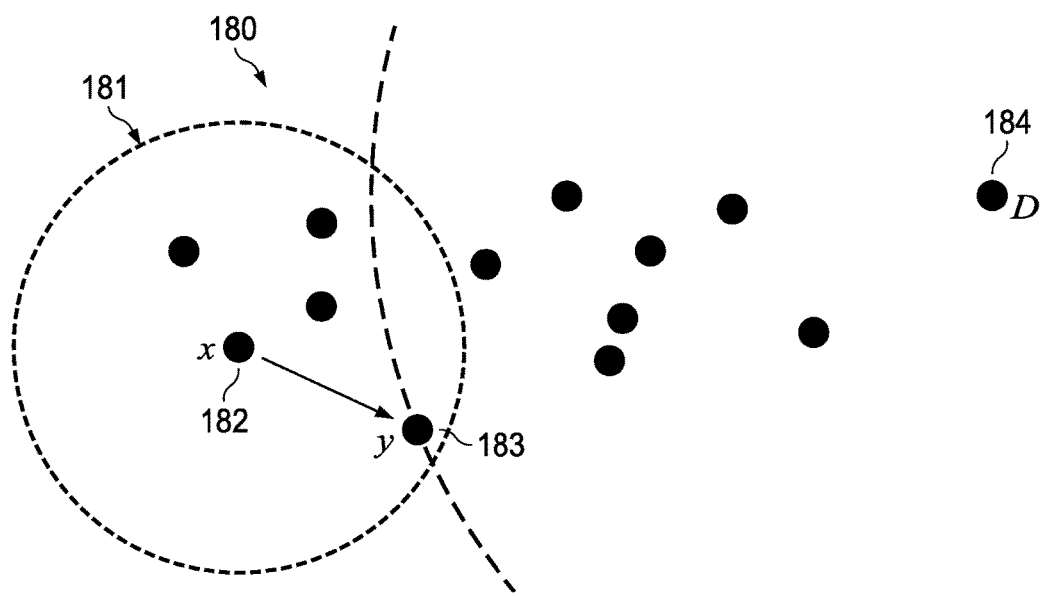
FIG. 8 is a diagram illustrating a greedy algorithm applied to an exemplary ad hoc network that may be associated with embodiments of the present disclosure.

Turning to FIG. 8, a diagram representing an example scenario of nodes in an ad hoc network 180, and shows how a greedy algorithm may be applied by geo peer routing module 61. Nodes, which may be OBUs such as OBU 30, are represented in FIG. 8 as solid black circles. In a greedy algorithm, each node could learn their 1-hop neighbor's location through, for example, periodic beaconing. A node X has 1-hop neighbors within a neighbor border 181. If node X 182 wants to send packets to destination node D 184, a greedy mode algorithm may be used in which node X 182 picks a closest node, of its 1-hop neighbors, to destination node D 84. The closest node in this example diagram is node Y 183. Thus, node X 182 may send its packets to node Y 183, which becomes the next forwarding node. Node Y 183 then picks a next closest node, of its 1-hop neighbors, to destination node D 184. This process may continue until a forwarding node cannot find a forwarding neighbor, which is a neighbor closer in distance to the destination than itself. The point where the forwarding node cannot find a forwarding neighbor can be called the local maximum or a dead end.

Figure 9:
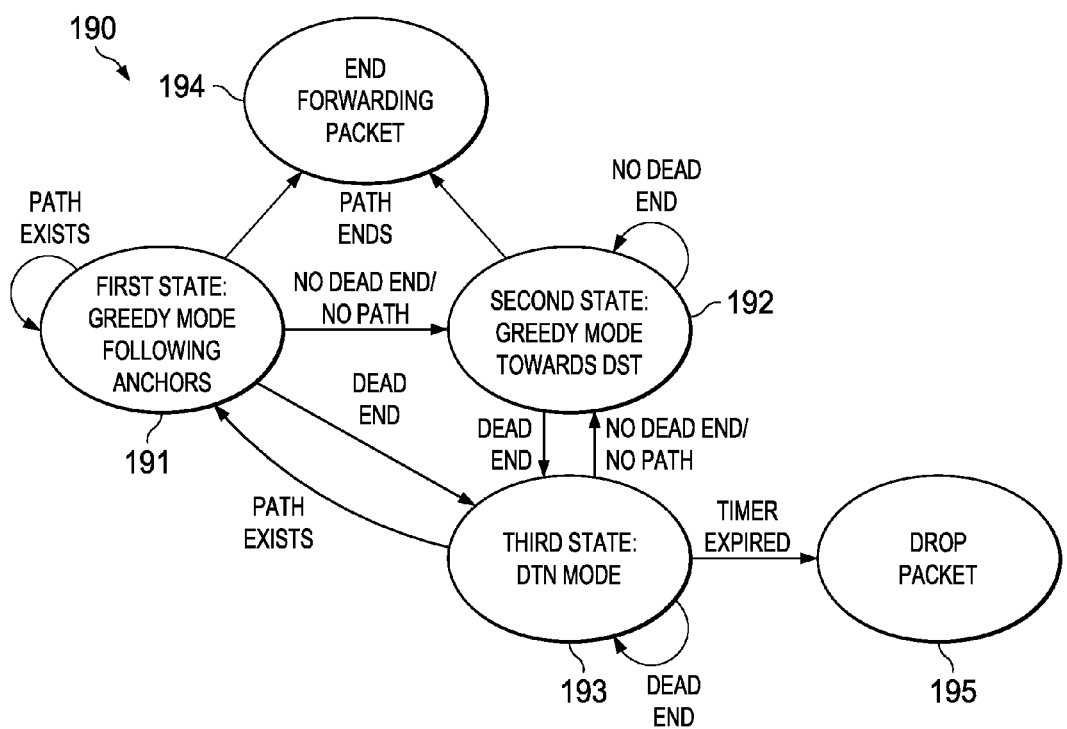
FIG. 9 is a simplified state diagram illustrating various states that may be associated with routing packets in one embodiment of the communication system according to embodiments of the present disclosure.

Turning to FIG. 9, FIG. 9 provides an example state diagram of routing packets by geo peer routing module 61 in accordance with one embodiment of the present disclosure. When a current node such as OBU 30 has a packet with a routing path to a destination node, the current node determines whether the path still exists. If the path exists, the current node forwards the packets in greedy mode following the anchors in the first state 191. Anchors may be waypoints or actual IP node addresses encapsulated within a GLS query reply message. Waypoints may be used to determine nodes to guide packets in greedy mode routing. Specifically, a packet could continue to be forwarded greedily toward a next anchor on the path until the packet arrived at a last anchor where the destination node's road intersects. Anchors could also be actual IP node addresses for each node in the path.

If the path does not exist but a dead end has not been reached (i.e., the path is not available but the current node has neighbors that are closer to the destination node than itself), then the current node operates in a second state 192 and forwards packets in greedy mode towards the destination node, without being guided by anchors. If a dead end occurs during the first state 191 or the second state 192, the current node could switch to a third state 193, which is a disruption tolerant (DTN) mode. As long as the path continues to be a dead end, the current node may stay in the DTN mode in the third state 193. However, if the current node finds a new node that is closer in distance to the destination node than the current node is to the destination node, then the current node could return to the second state 192 and forward the packet to the new node that is closest to the destination node (i.e., simple greedy mode towards destination). If the current node queries GLS 80 and receives new path information, then the current node could operate in the first state 191 (i.e., greedy mode guided by anchors).

If the path ends when the current node is operating in the first state 191 or the second state 192, then the current node is the destination node and the current node can stop forwarding the packet at 194. When operating in the third state 193 (DTN mode) a timer may be used to limit the amount of time a node continues to operate in DTN mode trying to route a packet. Accordingly, if the timer expires, then the packet may be dropped at 195.

Figure 10A:
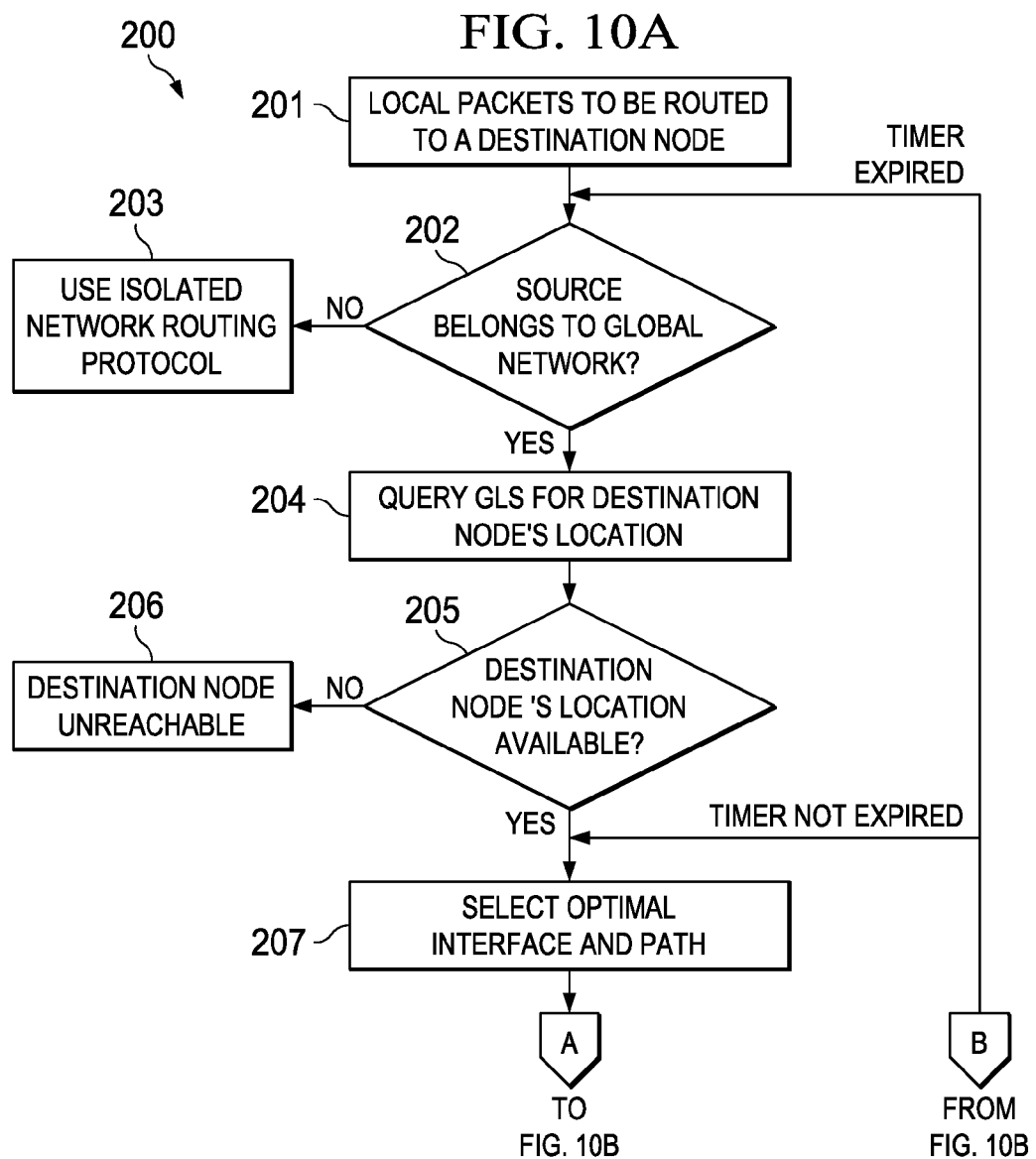
FIGS. 10A and 10B are simplified flowcharts illustrating example operations that may be associated with routing packets in an exemplary ad hoc network in certain embodiments of the communication system in accordance with the present disclosure.
Figure 10B:
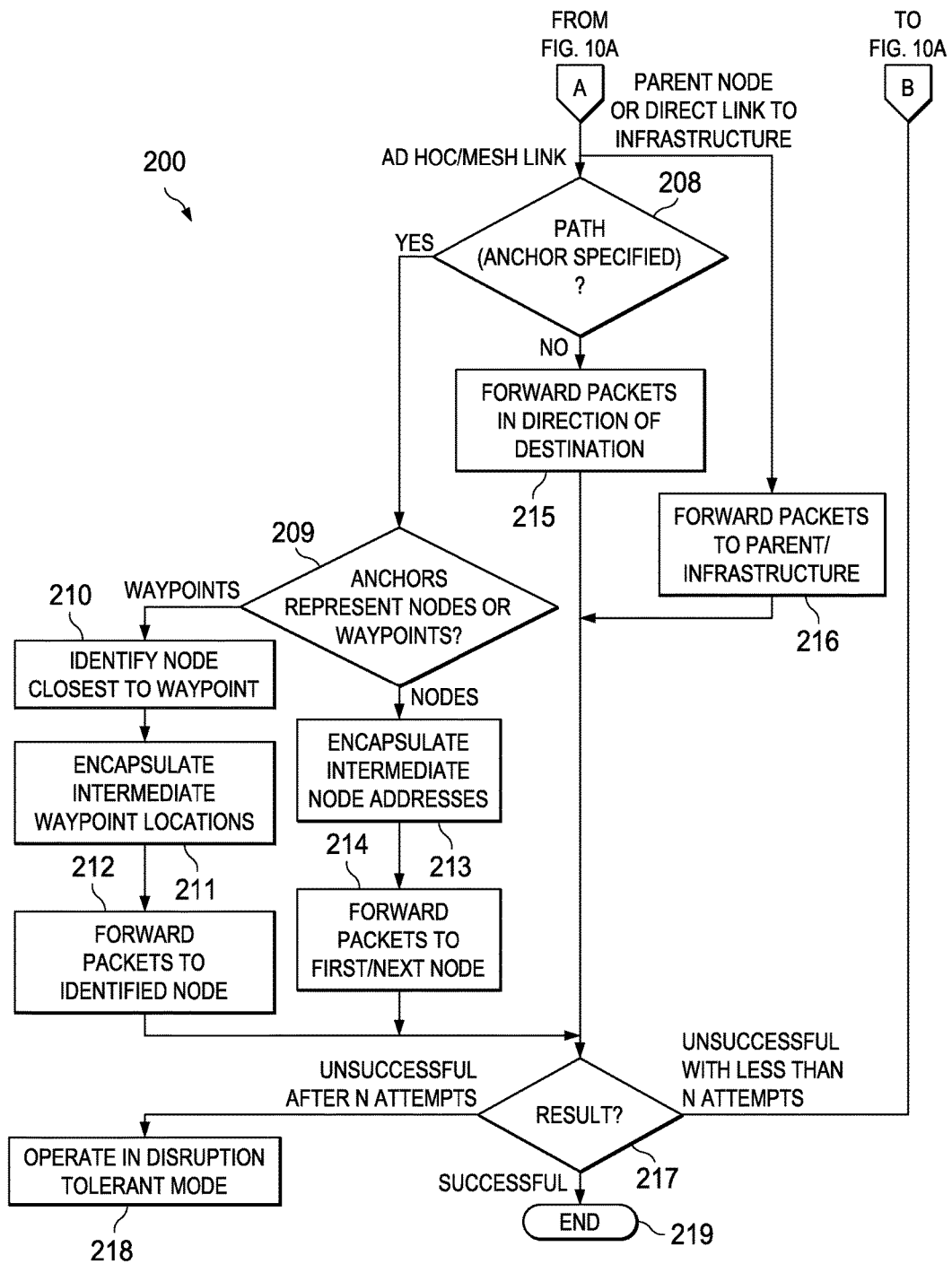

In FIGS. 10A and 10B, a flow 200 illustrates example operations of a flow 200 that may be associated with routing engine 60 routing local packets from OBU 30 to a destination node. The destination node could be any node in a vehicular ad hoc network or accessible through roadside infrastructure devices. For example, the destination node could be another OBU, mobile device, or other electronic device in a vehicular ad hoc network to which OBU 30 is connected. In another example, the destination node could be a node connected to the Internet and accessible through a roadside infrastructure device.

Flow 200 begins at 201 with a request to route local packets to a destination node. Local packets could include packets created from an application on OBU 30, packets from an in-vehicle device connected to OBU 30, etc. A determination is made at 202 as to whether the source, which is OBU 30 in this case, belongs to a global network. If the source does not belong to a global network, then the source belongs to an isolated ad hoc network and an isolated network routing protocol may be used at 203 to route the packets.

If the source belongs to a global network, however, then at 204 geolocation server (GLS) 80 may be queried for the destination node's location and possibly a path to the destination node. Once the GLS sends a response, a determination may be made at 205 as to whether the destination node's location is available. If the destination node's location is available, the response could include path information for one or more paths between the source and the destination node, and each path could include one or more anchors (i.e., nodes and/or waypoints). If the destination node's location is not available, then the destination node is determined to be not reachable at 206 and attempts to route the local packets may stop. In one embodiment, another attempt to route the packets may be made automatically based on, for example, a timer.

If the destination node's location is determined to be available, however, then an optimal wireless interface and an optimal path of the available interfaces and paths to the destination node may be selected at 207. If, for example, the destination node is in the ad hoc network, then the path could be selected from one or more paths within the ad hoc network or through Internet 100, as described with reference to FIG. 4. If the destination node is not in the ad hoc network, then the path could be selected from one or more available paths to the infrastructure (e.g., a path to a WiFi access point, a path to a 3G/4G base station, etc.).

Various factors may be considered when choosing an optimal path. For example, factors could include a number of hops in the path (e.g., fewer hops may be preferred), connectivity quality, monetary cost, type of application (e.g., user preferences may dictate the type of infrastructure connection to use), link metrics of intermediate nodes in the path, and the like. In one embodiment, connection manager 65 may select an optimal wireless interface as described in co-pending Provisional Application No. '138.

When selecting an optimal path, in one embodiment, user preferences may result in no path being selected. For example, if the user preferences indicate that the packets should only be sent on a free WiFi connection (e.g., for packets carrying a non-critical video download), but a 3G connection is the only currently available path to the infrastructure, then connection manager 65 may not select the 3G path and choose instead to store the packets and wait until a WiFi connection is available.

If an optimal path is selected at 207, the path can be through an ad hoc network or through a roadside infrastructure device. Thus, if the selected path is through a roadside infrastructure device, then at 216 the packets may be forwarded to the roadside infrastructure device (either through a direct link or through a parent node).

If the optimal selected path is through an ad hoc network (e.g., the destination node is somewhere in the ad hoc network) then a determination may be made at 208 as to whether the selected path to the destination node has specified anchors. A path of specified anchors is a sequence of one or more anchors between the source and destination node. If the selected path has no specified anchors, then at 215 the packets may be forwarded in the direction of the destination node using, for example, a greedy mode towards destination algorithm as previously described herein.

If the optimal selected path is through an ad hoc network (e.g., the destination node is somewhere in the ad hoc network) and the path has specified anchors, then a greedy mode guided by anchors algorithm may be followed. A determination may be made at 209 as to whether the anchors represent nodes or waypoints. If the anchors represent nodes, then the first node may be used for routing and the remaining intermediate nodes may be encapsulated in the packets at 213. The packets may then be forwarded to the first node in the path at 214.

In the greedy mode guided by anchors algorithm, if the anchors represent waypoints, then a node is identified at 210 that is the closest node in the mesh network to the first waypoint in the path. The identified node is used for routing and the remaining intermediate waypoints may be encapsulated in the packets at 211. The packets may then be forwarded to the identified node at 212.

After the packets have been forwarded (e.g., at 216 to a parent node or directly to infrastructure, at 215 in the direction of the destination node, at 214 to the first or next node in the path, at 212 to the identified node closest to the waypoint), then a determination regarding the result of forwarding the packets may be made at 217. If packet reception was successful, then flow ends at 219. However, if packet reception was unsuccessful after less than a predetermined number (N) of attempts, then if a timer has not expired, flow may pass back to 207 to select an optimal path again. This may occur because paths through a vehicular ad hoc network may be constantly changing. On the other hand, if a timer has expired, then flow may pass back to 202 to determine whether the source belongs to a global network. This may also be necessary because connectivity to the global network may also change in a vehicular environment.

With reference again to 217, if the number of attempts to send a packet reaches the predetermined number N, and the packet reception has not been successful, then the routing protocol may operate in the disruption tolerant mode at 218, which has been previously described herein and will be further described with reference to FIG. 12.

Figure 11:
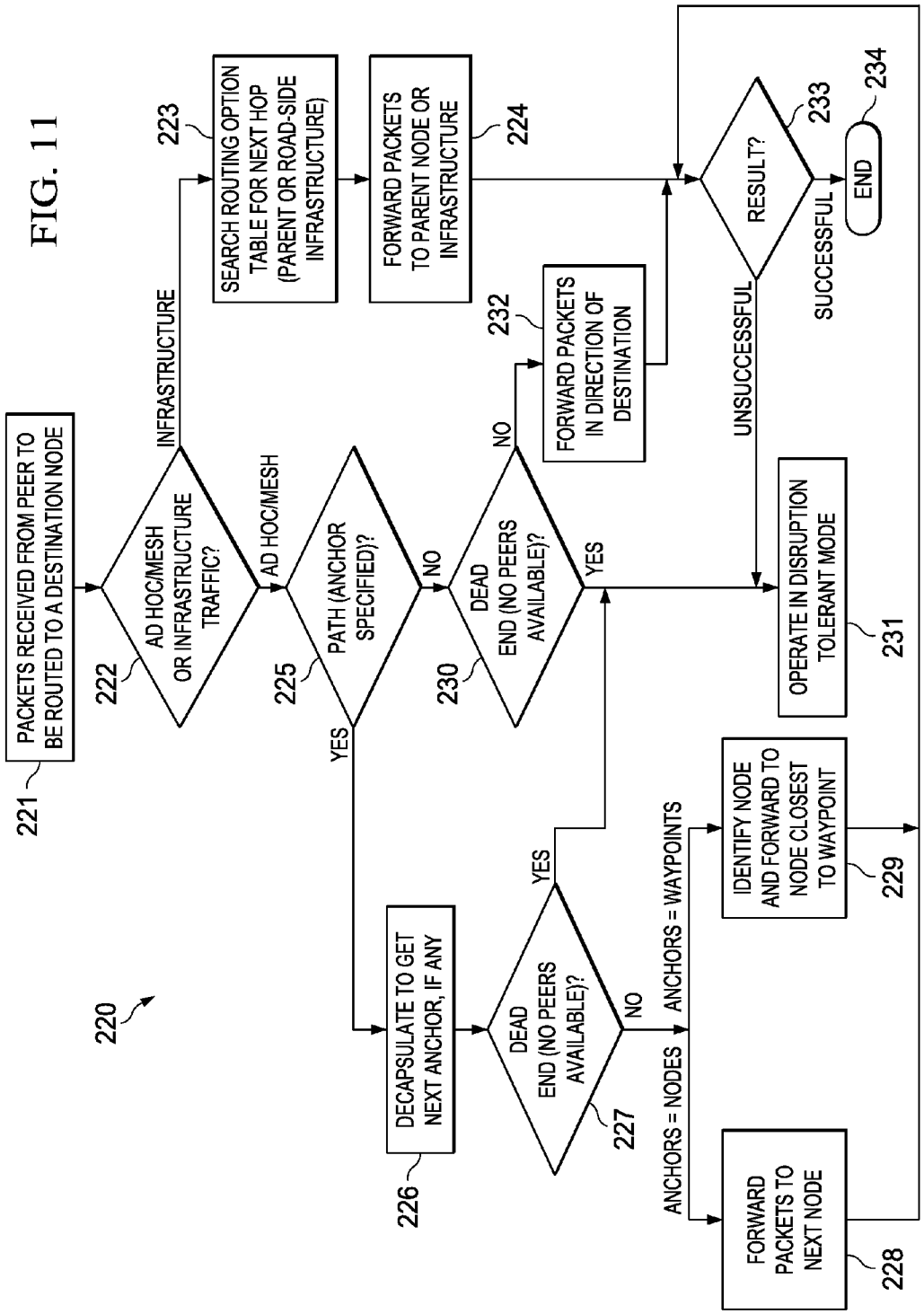
FIG. 11 is a simplified flowchart illustrating further example operations that may be associated with routing packets in an exemplary ad hoc network in certain embodiments of the communication system in accordance with the present disclosure.

In FIG. 11, example operations are illustrated of a flow 220 that may be associated with routing engine 60 for routing or forwarding packets that are received by OBU 30 from a peer (e.g., another OBU) in an ad hoc network to which OBU 30 is connected. The destination node could be any of the same destination nodes as discussed with reference to routing local packets.

Flow 220 begins at 221 where packets are received by OBU 30 from a peer to be routed to a destination node. A determination may be made at 222 as to whether packets are to be routed through an ad hoc network or through a roadside infrastructure device. If the packets are routed through the infrastructure, then at 223 routing option table 64 may be searched to identify the next hop (i.e., a parent node or a roadside infrastructure device). At 224, the packets may be forwarded to the identified next hop.

If the packets are to be routed through the ad hoc network, however, a determination may be made at 225 as to whether a path to the destination node has specified anchors. If the path does not have specified anchors, then a greedy mode toward destination algorithm may be followed. A determination may be made at 230 as to whether the packets have reached a dead end. A dead end occurs if no peers are available for ad hoc network communication to OBU 30. A dead end can also occur when there is a shorter distance between OBU 30 and the destination node than between any available peers of OBU 30 and the destination node. If the packets have not reached a dead end, then the packets may be forwarded at 232 in the direction of the destination node, using the greedy mode towards destination algorithm. However, if the packets have reached a dead end (e.g., OBU 30 has lost connectivity with the ad hoc network, OBU 30 is closer to the destination node than any peers of OBU 30 are), then the routing protocol may operate in disruption tolerant mode at 231, which has been previously described herein and will be further described with reference to FIG. 12.

If the path has specified anchors as determined at 225, then a greedy mode guided by anchors algorithm may be followed. The anchors may be encapsulated in the packets and, therefore, at 226 the packets are decapsulated to identify a next anchor in the path. A determination may be made at 227 as to whether a dead end has been reached. If the packets are determined to have reached a dead end, then the routing protocol may operate in the disruption tolerant mode at 231.

If it is determined at 227 that peers are available (i.e., no dead end), then a determination may be made as to whether the anchors are nodes or waypoints. If the anchors are nodes then the packets are forwarded at 228 to the next node and the next node address may be obtained by decapsulating the packet. If the anchors are waypoints, however, then at 229 a node may be identified that is the closest node to the decapsulated next anchor (i.e., waypoint). The packets may then be forwarded to the identified node.

After the packets have been forwarded (e.g., at 224 to a parent node or directly to infrastructure, at 232 in the direction of the destination node, at 228 to the next node in the path, at 229 to the identified node closest to the first waypoint), then a determination regarding the result of forwarding the packets may be made at 233. If packet reception was successful, then flow ends at 234. If packet reception was unsuccessful, however, then the routing protocol may operate in the disruption tolerant mode at 231, which has been previously described herein and will be further described with reference to FIG. 12.

It will be apparent that a predetermined number of attempts to forward packets may also be incorporated in the flow, in a similar manner as previously described with reference to FIGS. 10A and 10B. A predetermined number (N) of attempts could allow the forwarding node to make N attempts to forward the packets and once the predetermined number is reached without success, then flow could pass to 231 where the routing protocol operates in disruption tolerant mode. Additionally, after each unsuccessful attempt, but before N number of attempts have been made, the forwarding node potentially could select an optimal interface (e.g., if a timer has not expired) or could determine whether a connection to a global network exists (e.g., if a timer has expired).

Figure 12:
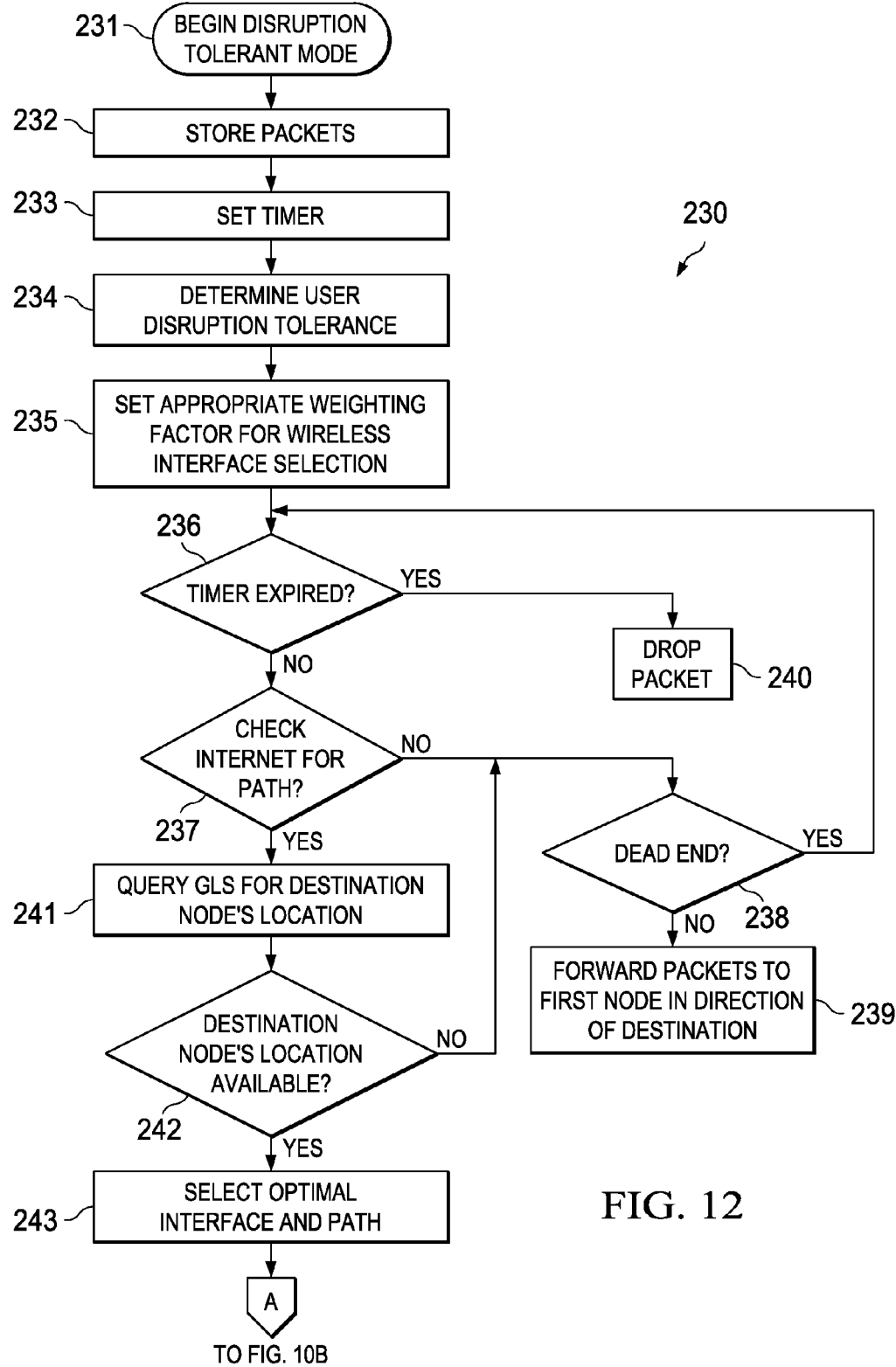
FIG. 12 is a simplified flowchart illustrating yet further example operations that may be associated with routing packets in an exemplary ad hoc network in certain embodiments of the communication system in accordance with the present disclosure.

Turning to FIG. 12, a flow 230 illustrates example operations that may be associated with operating in a disruption tolerant (DTN) mode in accordance with embodiments in this disclosure. DTN mode can begin at 231 when a routing path of packets being routed encounters a dead end (e.g., packets are not successfully routed after a predetermined number of attempts, an OBU needing to route the packet is not connected to any peers, etc.). Disruption tolerant mode may also be used to bridge traffic between a global network and an isolated network. Depending on a user's tolerance for application delay, a node may transmit data in a store and forward fashion. For example, suppose node A is connected to node B in a global network at time t1. At some later time t2, node A is disconnected from the global network and thus from node B. At this point, node A may keep the session alive depending on the application and store remaining data in its local cache for a period of time determined by a timer. As long as the timer has not expired, node A will try to reconnect to node B if possible. If a connection is reestablished between node A and node B before the timer expires, then the session can resume. Otherwise, the session may be terminated.

When disruption tolerant mode begins, the packets may be stored at 232 by OBU 30 and a timer may be set at 233. At 234, a user's disruption tolerance may be determined. For example, a user may prefer to use a less expensive connection in exchange for a longer transfer delay if the transaction involves a non-critical file transfer. In this case, DTN engine 34 can set an appropriate cost-weighting factor at 235 to reflect a user's preference for a multi-hop path and direct WiFi connections rather than a path using 3G links. The timer may be checked at 236 and if expired, then the packets may be dropped at 230.

If the timer has not expired, then a determination may be made at 237 as to whether another GLS query should be made. In one embodiment, GLS queries subsequent to the initial GLS query for a particular communication may not be made again unless certain criteria are met. For example, if the information provided by the previous GLS query response indicates a particular velocity and location of the destination node that allows a prediction to made that the vehicle has left the original road, then another GLS query may be warranted.

If another GLS query is warranted, then at 241 geolocation server (GLS) 80 may be queried for the destination node's location and possibly a path to the destination node. Once GLS 80 sends a response, a determination may be made at 242 as to whether the destination node's location is available. If the destination node's location is available, the response could include path information for one or more paths between the source node and the destination node, and each path could include one or more anchors (i.e., nodes and/or waypoints). If the destination node's location is available, then an optimal wireless interface and an optimal path of the available interfaces and paths to the destination node may be selected at 243, as previously described with reference to FIGS. 10A and 10B.

If it is determined at 242 that the destination node's location is not available from GLS 80, or if it is determined at 237 that a GLS 80 query is not warranted, then the routing path may be checked again at 238 to determine whether a dead end still exists. If a dead end still exists, then flow returns back to 236. However, if the dead end no longer exists, then the packets may be forwarded at 239 using a greedy mode towards destination algorithm, for example, to a node in the direction of the destination node.

Figure 13:
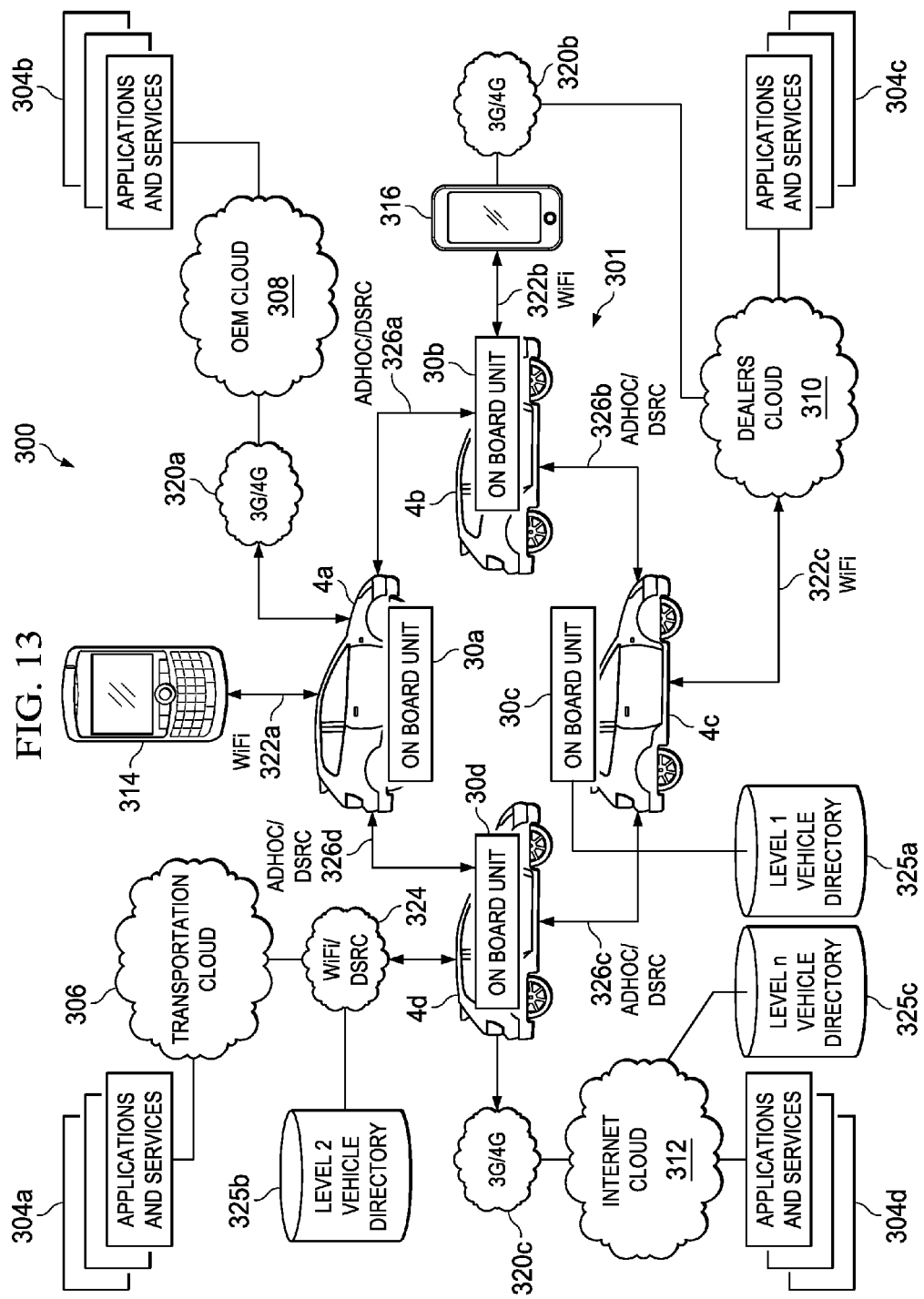
FIG. 13 is a simplified block diagram illustrating an example embodiment of a network environment including an exemplary ad hoc network in accordance with this specification.

Turning to FIG. 13, FIG. 13 is a simplified block diagram illustrating an example embodiment of a network environment 300 in which a communication system 10 may be implemented in accordance with this specification. The example embodiment of FIG. 13 includes connected vehicles 4a-4d in communication with applications and services 304a-d through various communication networks, including transportation cloud 306, OEM cloud 308, dealer cloud 310, and Internet cloud 312. Each of connected vehicles 4a-d may also be in communication with various mobile devices, such as in-vehicle mobile devices 314 and 316. In general, each connected vehicle 4a-d may include an on-board unit (OBU) 30a-d that can establish and manage communications over any viable pathway, such as 3G/4G networks 320a-c, WiFi networks 322a-c, WiFi dedicated short-range communication (DSRC) 324, and ad hoc DSRC 326a-d. Connected vehicles 4a-d with established peer links via, for example, ad hoc DSRC 326a-d, form a vehicular ad hoc network 301. Any one or more established communication links from any of OBUs 30a-d to a roadside infrastructure device (e.g., devices enabling connection to 3G/4G networks 320a-c, to WiFi/DSRC networks 324, etc.) may connect vehicular ad hoc network 301 to the global network.

In one embodiment, hierarchical vehicle directories may also be implemented in communication system 10, with 'level 1' represented herein as the lowest hierarchical level. For example, level 1 vehicle directory 325a may be included in or locally accessible to OBU 30c, level 2 vehicle directory 325b may be included in or accessible to a roadside infrastructure device such as a WiFi access point in WiFi/DSRC network 324, and level n vehicle directory 325c may be included in or accessible to some node of Internet cloud 312. In one embodiment, level 2 vehicle directory 325b could include information from level 1 vehicle directory 325a and information from other level 1 vehicle directories in the same or different vehicular ad hoc networks. Level n vehicle directory 325c could include information from level 2 vehicle directory 325b and from other level 2 vehicle directories associated with the same or different roadside infrastructure devices. Any number of hierarchical levels is possible, and some implementations may have the vehicle directories located in the Internet and/or roadside infrastructure, but not in OBUs of vehicles. Moreover, each vehicle directory could be implemented in a distributed or centralized manner.

Figure 14:
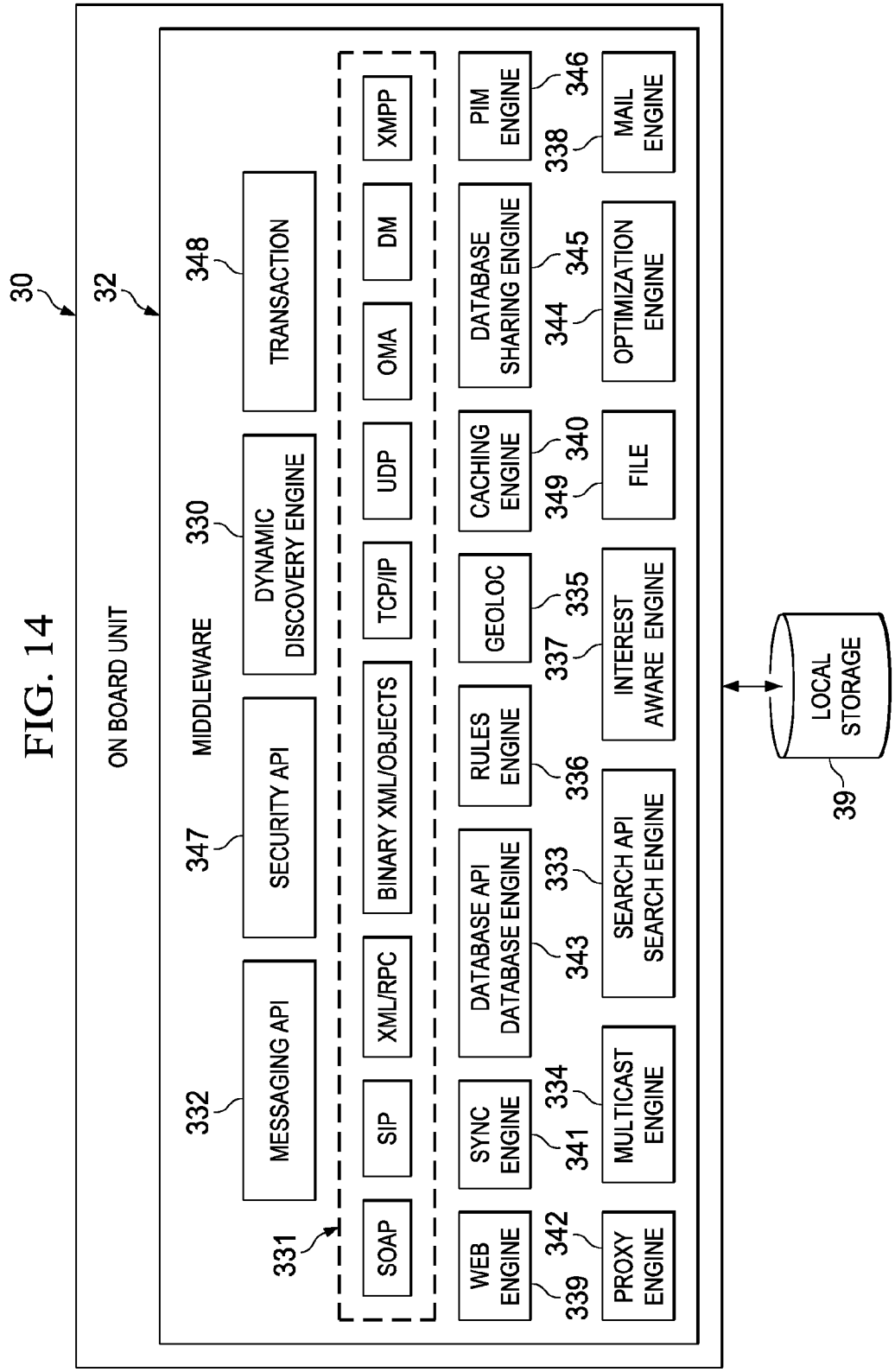
FIG. 14 is a simplified block diagram illustrating additional details that may be associated with an on board unit (OBU) of vehicle in accordance with embodiments of the present disclosure.

With reference to FIG. 14, a simplified block diagram illustrates additional details that may be associated with OBU 30 of vehicle 4 (not shown in this Figure). Certain embodiments of communication system 10 include a pervasive platform in OBU 30 enabling peer-to-peer, peer-to-group, and peer-to-cloud community formation, application services, and data exchange over a disruption tolerant vehicle environment. As shown in FIG. 14, certain embodiments of OBU 30 may provide a pervasive platform with core building blocks enabling OBU 30 to communicate in a store-forward manner for application data as well as providing a receive-proxy-respond based application service. The pervasive platform may allow seamless expansion of future services and applications using universal application programming interfaces (APIs), which could be available, for example, in Internet cloud 312, OEM cloud 308, dealer cloud 310, transportation cloud 306, vehicular ad hoc network 301, or any mobile devices connected to vehicular ad hoc network 301.

In FIG. 14, additional details of middleware 32 of OBU 30 are illustrated. Additionally, other components, previously shown and described herein, may also be included in this embodiment of OBU 30. For example, disruption-tolerant engine (DTN engine) 34, routing engine 35, infrastructure discovery module 36, interface monitoring module 37, and wireless interfaces 38 may help enable middleware 32 to achieve its intended functionalities. As previously described herein, DTN engine 34 hides various disruptions (e.g., disrupted connectivity to peers and/or roadside infrastructure), and connection manager 65 of routing engine 60 enables various connectivity scenarios including vehicle-to-infrastructure, vehicle-to-vehicle, vehicle-to-vehicle ad hoc, and vehicle-to-vehicle-to-infrastructure.

Middleware 32 includes several components that enable communication peer-to-peer, peer-to-group, and peer-to-cloud community formation, application services, and data exchange over the previously described disruption tolerant vehicle ad hoc network environment. Dynamic discovery engine 330 can enable spontaneous discovery of nodes, including OBUs, in-vehicle devices, external mobile devices, applications and services, and dynamic communities in the disruption vehicular environment. Dynamic discovery engine 330 may also include a publish/subscription component (not shown). In one embodiment, the discovery engine could be configured as shown and described in co-pending Provisional Application No. '138.

Middleware application programming interfaces (APIs) 331 can be provided to enable remote access and execution of applications and services across a global or isolated vehicular ad hoc network. Examples of middleware APIs include Simple Object Access Protocol (SOAP), Session Initiation Protocol (SIP), Extensible Messaging and Presence Protocol (XMPP), Extensible Markup Language Remote Procedure Call (XML-RPC), Binary XML/Objects, Transmission Control Protocol/Internet Protocol (TCP/IP), User Datagram Protocol (UDP), open mobile alliance (OMA), and device management (DM).

Messaging API 332 may enable peer-to-peer (P2P), peer-to-group (P2Group), peer-to-cloud (P2Cloud), and cloud-to-group, and cloud-to-cloud messaging across vehicular networks for collaboration using the same API and for machine-to-machine collaboration between any device such as an OBU, a sensor, a mobile device, etc. Transaction API 348 may handle application transactions and database API 343 may be configured to store local and hosting data. Security API 347 may enable access to the OBU, authentication of users, and functions related to allowing or disallowing access to content and/or communities.

Search engine 333 can issue queries across the vehicular p2p, p2group, p2cloud environments. Multicast Engine 334 may be used to push location and interest based content, alerts, and other information. Geo location engine 335 may be used to locate vehicles, devices, and users. This component may be the same as geo location manager 62.

Rules engine 336 and interest aware engine 337 may be configured to filter devices, content, and users in a vehicular network environment. Mail engine 338 may allow a hop-by-hop mail forwarding scheme, where mail can be stored if a path is not available and then forwarded after a path becomes available. Proxy engine 342 may enable access to proxy data. File 349 represents a general data store for configuration files and databases. Web engine 339, caching engine 340, sync engine 341, and optimization engine 344 may enable content and services in a vehicular network environment. Data sharing 345 and personal information manager (PIM) engine 346 enable users to share content, contacts, and calendars across a vehicular network environment.

In one embodiment, a vehicle directory such as vehicle directory 325*a* may be provided in local storage on OBU 30. Vehicle directories 325*a*, 325*b*, and/or 325*c* may be configured to advertise services, content, OBUs, and devices with each having one or more of the following pieces of information: location, capabilities, policies, and interest. Location may be GPS coordinates, capabilities may be available services and features (including content), interest may be services and features a user wants to access, and policies may be access conditions placed on capabilities and any specified interest.

Generally, four main types of OBU-based dynamic and disruption tolerant peer-to-peer, peer-to-cloud, peer-to-group, and proxied/hosted data and application services may be possible in embodiments of OBU 30 having pervasive middleware as described herein: 1) vehicle-to-cloud, 2) cloud-to-vehicle, 3) vehicle-to-vehicle, and 4) vehicle as a host or proxy for content or services. Many types of vehicle-to-cloud application services could be possible including, for example, OEM applications such as logging vehicle diagnostic data, Internet-based applications such as an email application, and dealer applications for receiving vehicle information for scheduling maintenance and/or repairs. Thus, for example, in FIG. 13, OBU 30*c* is connected to dealer cloud 310 via WiFi connection and may access applications and services 304*c* of the dealer. OBU 30*c* may send the dealer information such as mechanical problems, warning or safety lights, sensor readings from vehicle 4*c*, etc. In addition, with appropriate credentials, the dealer may run a system health check or diagnostics of vehicle 4*c* remotely. In a further example, PIM engine 346 of the messaging layer could enable sharing calendar information between a vehicle owner of vehicle 4*c* and a dealership to facilitate appointment scheduling, in which location is taken into account when discovering each other through peer-to-peer or peer-to-group messaging.

Cloud-to-vehicle application services could include many types of communications in which information is pushed from a cloud to a vehicle. Such communications could be enabled with appropriate permissions from a user of the vehicle. Example cloud-to-vehicle services could include 1) connecting to a dealer hotspot to receive alerts, advertisements, or offers, 2) receiving distributed information such as customized location and interest-based web content from information distribution applications, and 3) receiving customized location and interest-based information such as commerce, advertising, and offers from a hot spot or Internet cloud.

Vehicle-to-vehicle application services may include a wide range of types of services. For example, such application services could include 1) querying a specific OBU for a service and/or content, 2) sharing files (e.g., audio/video file sync), 3) receiving alerts regarding, for example, road conditions, weather conditions, traffic and safety conditions, etc., 4) locating vehicles, 5) instant messaging (e.g., one-to-one or group based), 6) interest and location aware unicast or group multicast streaming of media, and 7) interest and location aware unicast or group multicast of content.

Vehicles acting as a host or proxy with one or more vehicle directories can facilitate various application services. Examples of such services may include, providing a bulletin board, streaming media content, serving cached web content, serving as a proxy to reach other vehicles, in-vehicle mobile devices, and users, serving as a proxy to cloud for vehicles or devices with no Internet connection, and providing vehicle directory service to allow other vehicles and connected devices to discover other OBUs, in-vehicle mobile devices, and users.

The disruption tolerant protocol of DTN engine 34, as previously described herein, can facilitate a successful deployment of applications and services in vehicular environments. DTN engine 34 can withstand frequent connectivity loss caused by vehicular mobility, dead spots, and very low node density by exploiting a vehicular store-forward application message routing strategy. Using DTN engine 34 with pervasive middleware 32 as described herein, vehicles can receive application messages, consume the application messages if desired by the in-vehicle entities (e.g., users, applications on OBU, in-vehicle devices, etc.), hold the application messages in storage, and wait for new opportunistic connectivity to exchange the application messages of interest to the other OBUs.

Multicast engine 334 may provide a vehicular application multicast message scheme using a multicast communication model to enable a group of vehicles to receive interest and location aware information using peer-to-group messaging. With cooperation from connection manager 65 and ad-hoc routing layers (e.g., geo peer routing module 61, ad hoc routing 68), the proposed vehicular application multicast message scheme may incorporate a routing algorithm that takes into consideration the location and popular interest of given data/content. This enables routing messages towards a vehicular community of interest through the disruption tolerant vehicular environment.

The store-and-carry-forward message scheme, exploits predictable vehicular mobility patterns to bring messages closer to vehicles' communities of interest by exchanging them with other vehicles when possible. Hence, the proposed multicast message scheme may use GPS, assisted GPS (AGPS), vehicular navigation information, identities and relationships of encountered vehicles with respect to the intended vehicles/cloud, and historical information mobility patterns as a key element in the messaging routing scheme in the above environment.

OBU 30 may act as a host/proxy of data/content, so that other OBUs can in some instances request and receive desired content locally within a vehicular ad hoc network rather than accessing the Internet. OBU 30 may be equipped with local storage 39, which can be used to store content (e.g., videos, music, etc.). Using this stored information and interest vectors of entities associated with other vehicles, messages containing this content can be routed to other vehicles in the dynamically formed disruption tolerant vehicular ad hoc networks.

In one embodiment, information in a vehicular network environment can be distributed in different ways (e.g., broadcasting or multicast routing algorithm) according to the type of information being distributed. General information that may be of interest to users in most vehicles present in a given region such as, for example, weather conditions, traffic congestion, emergency notifications, or severe weather alerts, can be propagated using broadcasting. Specific messages and/or content that may be of interest to particular users of vehicles, however, may be distributed via an interest and location aware multicast routing algorithm, which can identify the interest and location of vehicles, drivers, and passengers to determine where to forward the message or content. In this scheme, vehicles may register with a vehicle directory system, hosted either by one or more vehicles in a vehicular ad hoc network (e.g., vehicular ad hoc network 301), by some cloud (e.g., applications and services 304*d* of Internet cloud 312, etc.), and/or by roadside infrastructure devices (e.g. WiFi/DSRC 324, 3G/4G base stations 320*a-c*). One or more vehicle directories 325*a-c* may be populated by OBUs expressing their location, capabilities, interest, and policies, for example. As a result, vehicles in proximity of a given geographic area may automatically exchange messages or content of interest.

In vehicle directories 325*a-c*, information can be organized and similarity interest can be matched, in some cases automatically, using content bloom filters, eigenvector and singular value decomposition clustering, latent semantic analysis techniques, and popularity index techniques, in order to locate the content source or sink OBU. For example, multimedia content can be searched and then a bit torrent technique can be used with disruption tolerant routing described herein, to download multimedia files from vehicles automatically without any user intervention.

Figure 15:
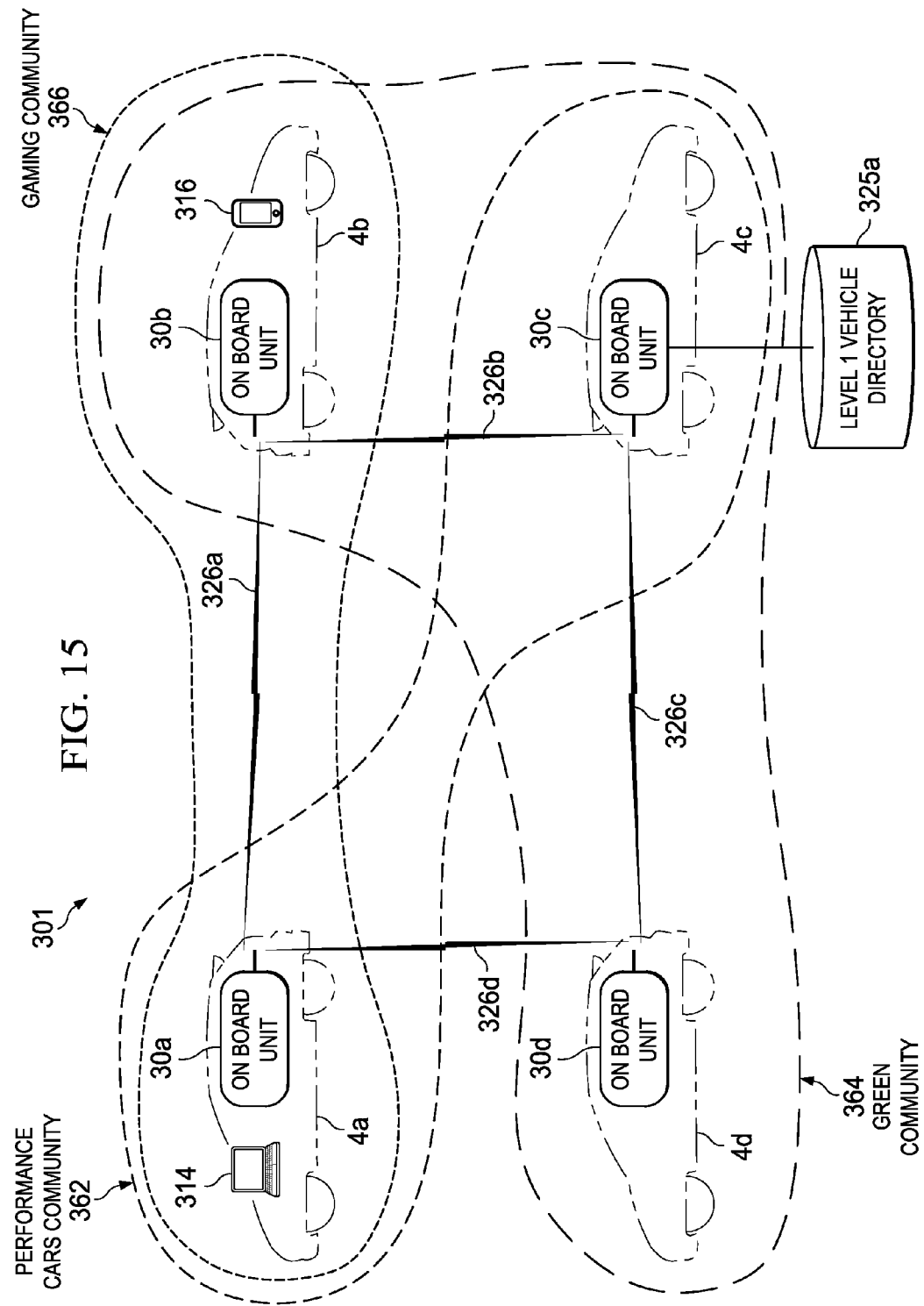
FIG. 15 is a block diagram illustrating additional details that may be associated with forming communities in an ad hoc network in accordance with embodiments of the present disclosure.

FIG. 15 is a block diagram illustrating the example vehicular ad hoc network 301 of FIG. 13 with example communities of interest formed between vehicles 4*a*-4*d*. In the example communities of FIG. 15, a performance car community 362 is formed between OBUs 30*a* and 30*c*, which could be, for example, cars of a certain make or model interested in sharing media content among the same type of vehicles. A green community 364 is formed between OBU 30*b*, OBU 30*c*, and OBU 30*d*. Green community members could include users (e.g., driver and/or passengers in vehicles) who are interested in sharing environmental related information. A gaming community 366 could be formed between in-vehicle devices 314 and 316, which are connected to vehicular ad hoc network 301 through OBUs 30*a* and 30*b*, respectively. Gaming community 364 members may be interested in sharing gaming content among other vehicles interested gaming.

As shown in FIG. 15, multiple dynamic interest aware communities can be formed in a disruption tolerant vehicular environment. The communities shown in FIG. 15 may be formed when vehicular mobile devices (e.g., OBUs) are connected to a vehicular ad hoc network. OBUs can discover each other's presence using at least one vehicle directory, such as level 1 vehicle directory 325*a*. Applications 31 running on top can automatically exchange/download information using peer-to-peer and peer-to-group messaging schemes.

Each OBU 30, with dynamic and disruption tolerant pervasive middleware 32 can host and proxy application services and data in a vehicular ad hoc network. For example, in the absence of direct connection to the Internet, an HTTP request and response from a requester OBU for different webpages can traverse from vehicle to vehicle present in a given geographical vehicular ad hoc network to continue information flow between the Internet, the requester OBU, and any connected in-vehicle devices. Moreover, vehicle users can query other OBUs in their geographical vehicular ad hoc network for different web objects of interest until one of the queried OBUs in the ad hoc network indicates it has cached content or indicates the query is being forward to the Internet (e.g., if the queried OBU has an infrastructure link to a roadside infrastructure device).

Some remote procedure call messages, for example Binary XML, SOAP, XML-RPC, Restful API, may be exchanged among peers and the Internet in a disruption tolerant manner using proxying and forwarding techniques. In the event a given vehicular ad hoc network is completely disconnected from the Internet, an OBU acting as a host in the isolated vehicular ad hoc network can satisfy an application query request if the OBU possesses the requested information in cached or any other real-time format. Therefore, OBUs acting as hosts with caching engine 340 may respond to a query in the absence of connectivity to the Internet.

Additional examples of vehicle-to-cloud communication that may be handled in the disruption tolerant vehicular network environment include electronic mail (email) applications and other non-time-sensitive content. OBU 30 can host mail engine 338 in pervasive middleware 32 to allow emails or other non-time-sensitive content to be received and forwarded to other participating mail engines 338 with forwarding mechanisms using, for example, XML format until it makes its way to the internet. In the case of an email, when a receiver OBU receives an email and has an infrastructure link to a roadside infrastructure device and, therefore, connectivity to the Internet, the receiver OBU can convert the email to Simple Mail Transfer Protocol (SMTP) server format before delivering the email to the SMTP server, which can then forward the email to its destination. This process can be similarly applied when receiving emails in the vehicular ad hoc network.

Turning to FIGS. 16-20, simplified flowcharts illustrate example operational steps that may be associated with providing dynamic disruption tolerant peer-to-cloud, peer-to-peer, peer-to-group, and proxied/hosted data and application services in a vehicular ad hoc network. For clarity and illustrative purposes, the description of FIGS. 16-20 may reference various components shown in previous FIGS. 1-15.

Figure 16:
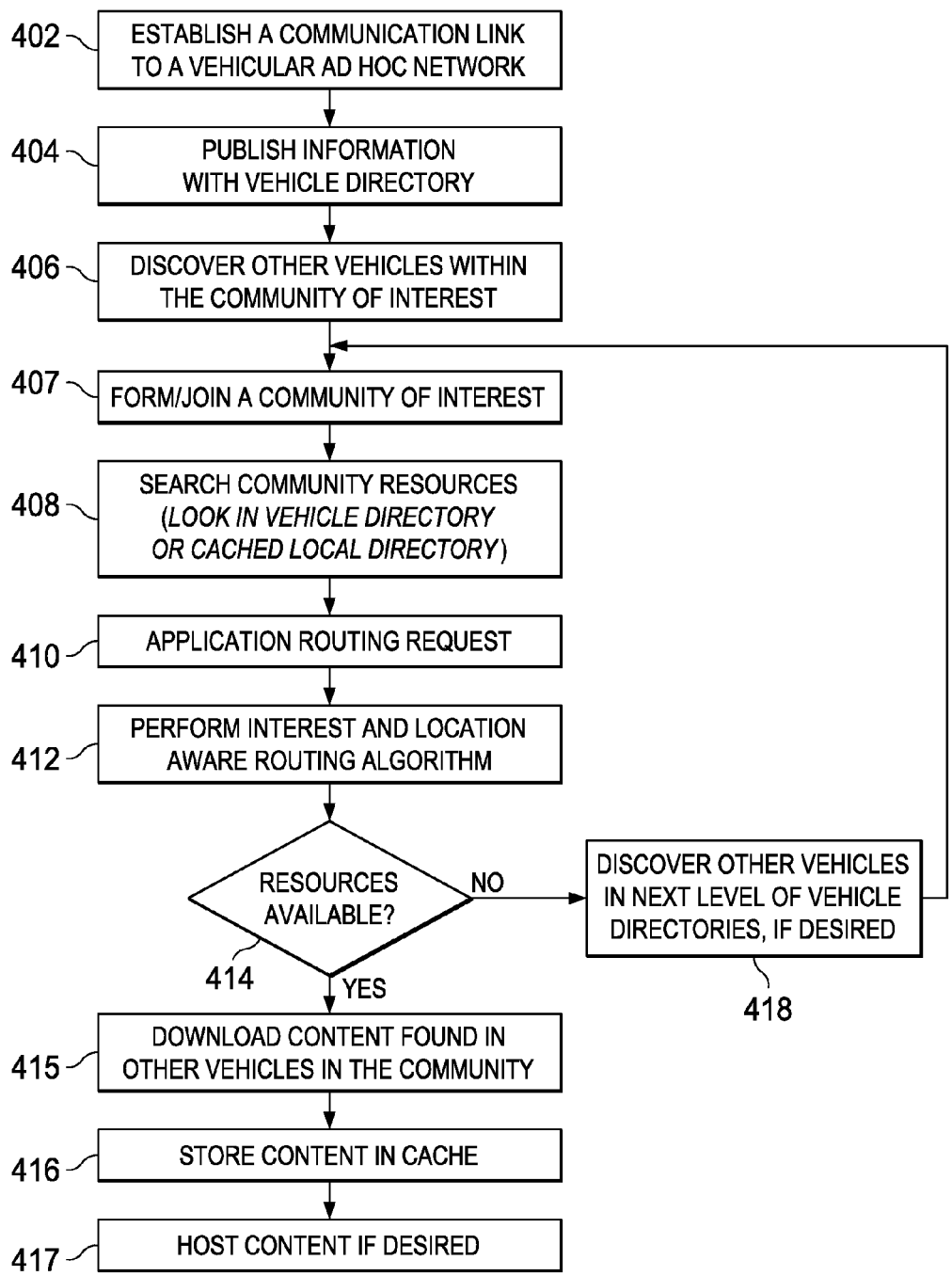
FIG. 16 is a simplified flowchart illustrating example operations that may be associated with resource discovery in a network environment in embodiments of the present disclosure.

FIG. 16 illustrates example operational steps of a flow 400 that may be associated with resource discovery in a vehicular community of interest. Resources could include, for example, application services, content, or any other capabilities or data associated with an OBU and its connected in-vehicle devices (or potentially external devices). Flow 400 may begin at step 402 where a communication link is established between OBU 30 and vehicular ad hoc network 301. At 404, OBU 30 may publish information in vehicle directories 325*a*, 325*b*, and/or 325*c*. Such information could include location, capabilities, policies, and interests corresponding to any users in the vehicle, in-vehicle-devices connected to OBU, external devices connected to OBU (e.g., roadside user device), and/or applications available on OBU 30. In addition, whenever a change in available services occurs (e.g., new in-vehicle device connects to OBU, new sensor added to vehicle, etc.), OBU 30 may update appropriate vehicle directories.

Depending on the implementation, OBU 30 may search for an appropriate vehicle directory in which to publish information. For example, OBU 30 may be associated with a subscription service to a vehicle directory service, which could be available in a cloud, such as Internet cloud 312. If a direct or multi-hop connection is available to roadside infrastructure, OBU 30 may access the vehicle directory service and publish any available information. In another example, one or more vehicle directories may be available in vehicular ad hoc network 301, such as level 1 vehicle directory 325*a*. Vehicle directories may be distributed across vehicular ad hoc network 301 and, in one embodiment, OBU 30 could search for one or more vehicle directories, publish information in one or more of the distributed vehicle directories, and store a copy of the vehicle directories locally in cache. In another scenario, if OBU 30 cannot find a vehicle directory in vehicular ad hoc network 301, then OBU 30 may continue to search for a higher-level vehicle directory (e.g., level 2 vehicle directory in roadside infrastructure, level n directory in Internet cloud 312, etc.).

After OBU 30 finds a vehicle directory, such as a level 1 vehicle directory 325a, OBU 30 can discover other vehicles that belong to one or more communities of similar interests. OBU 30 can also discover other vehicles that do not currently belong to a formed community, but have similar interests to OBU 30. Once these vehicles are discovered, OBU 30 can attempt to form and/or join one or more communities at 407. If OBU 30 is able to join and/or form one or more communities, then OBU 30 may have broader access to the vehicle directory to determine what resources are available through the communities. Thus, at 408, OBU 30 can search level 1 vehicle directory 325a and/or a local cached copy on OBU 30 for available community resources.

If desired resources (i.e., content and/or services) are available in a community in which OBU 30 is a member, then at 410 OBU 30 may provide an application routing request for the content and/or services. At 412, an interest and location aware routing algorithm 412 may be performed to determine an optimal path for sending the request. After the request is sent, a determination may be made at 414 as to whether the requested resources are available. If the requested resources are not available, then at 418, OBU 30 may attempt to discover other vehicles in the next level of vehicle directories, such as level 2 vehicle directory 325b, if desired, and flow may pass back to 407 to form and/or join other communities of interest, which can be discovered at the next level and may include other vehicles in other vehicular ad hoc networks.

If, however, it is determined at 414 that resources are available, then at 415, content or data that is found in other vehicles within the community may be downloaded. Additionally, any requested services may be provided. At 416, the downloaded content or data may be stored locally in cache on OBU 30. At 417, OBU 30 may begin hosting the downloaded data if desired. If OBU 30 hosts the downloaded data, then it may be stored in local storage 39 of OBU 30.

In an example scenario, with reference to FIG. 15, as vehicle 4b approaches vehicles 4a and 4c, OBU 30a establishes peer links 326a and 326b with OBUs 30a and 30c, respectively. OBU 30b finds level 1 vehicle directory 325a in vehicle 4c and publishes information regarding location, capabilities, policies, and interests of OBU 30b. By searching vehicle directory 325a, OBU 30b may discover that OBUs 30c and 30d of vehicles 4c and 4d, respectively, have formed a green community. OBU 30b may also discover that OBU 30a of vehicle 4a has a connected in-vehicle device with an interest in gaming. Accordingly, OBU 30b can send requests to join the green community and the gaming community by publishing in level 1 vehicle directory 325a a request to join/form the green and gaming communities. Depending on how a community is configured, one, all, or some members of the community periodically scan the relevant vehicle directory to discover "requests to join/form" the community. When a request to join/form a community is received, an authorized agent for the community may allow or deny the request.

After OBU 30b publishes its request, either OBU 30c or OBU 30d may allow OBU 30b to join green community 364. OBU 30a may accept OBU 30b's request to form gaming community 366. After OBU 30b is accepted to the green and gaming communities, OBU 30b may have access to more detailed information in level 1 vehicle directory 325a regarding the capabilities, content, and services of vehicles in the communities. Additionally, OBU 30b may store a copy of vehicle directory 325a, or portions thereof, in its local cache or other suitable storage. OBU 30b may search vehicle directory 325a, or its locally cached copy, and identify content in, for example, OBU 30c related to environmental issues. OBU 30b may initiate an application routing request, perform the interest and location aware routing algorithm, and send a request to appropriate vehicles in the green community.

Figure 17:
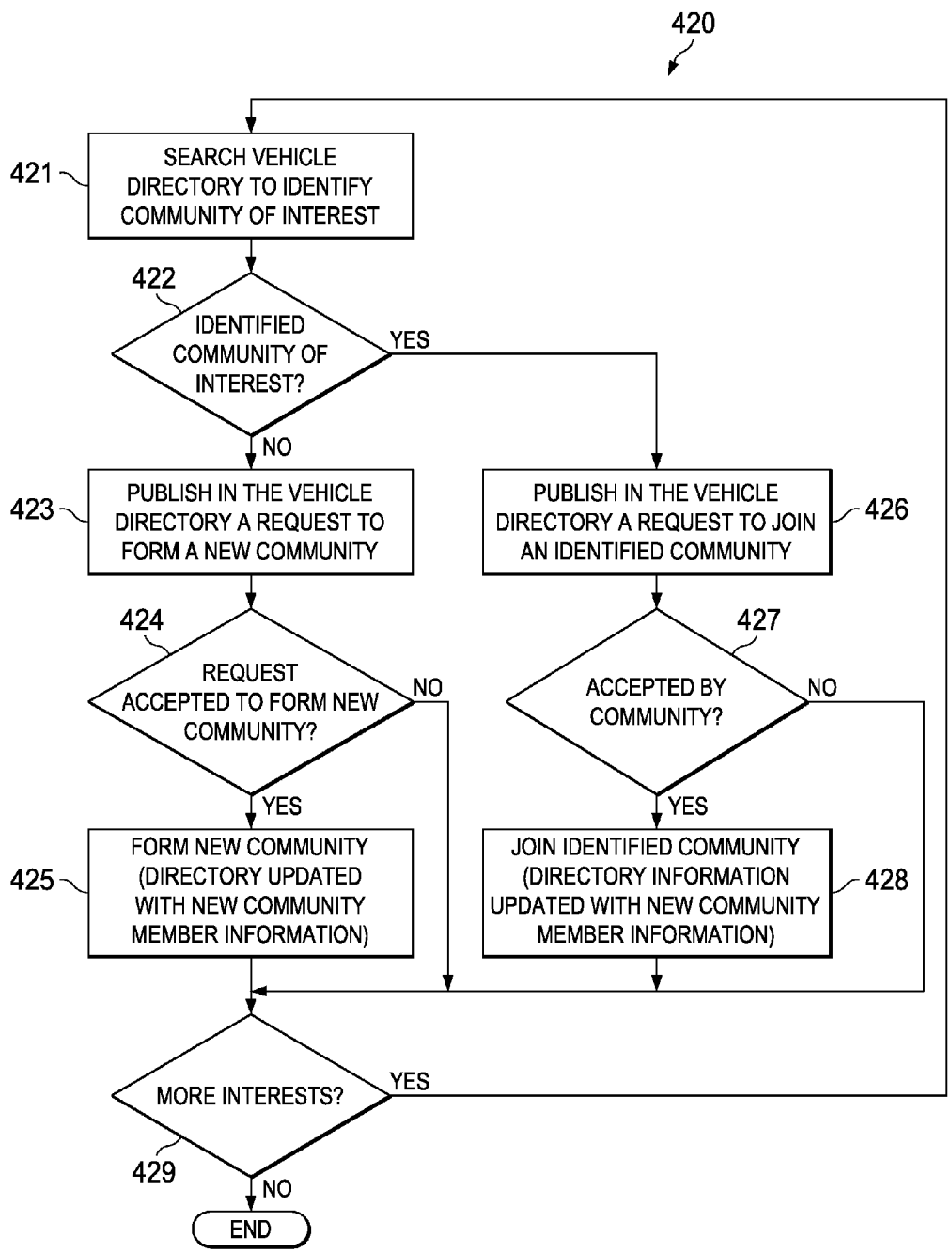
FIG. 17 is a simplified flowchart illustrating example operations that may be associated with joining and/or forming communities of interest in a network environment in embodiments of the present disclosure.

FIG. 17 illustrates a flow 420 of example operations that may be associated with a vehicle forming or joining a community in accordance with embodiments of this disclosure. Flow 420 may begin at 421 where OBU 30 searches a vehicle directory to identify a community of interest. A determination is made at 422 as to whether any communities of interest were identified in the search. If no communities of interest were identified in the vehicle directory, then at 423, OBU 30 may publish a request in the vehicle directory to form a new community. At 424, a determination is made as to whether any requests were accepted to form a new community. If a request was accepted, then at 425 a new community is formed between OBU 30 and other vehicles who responded to the published request to form a new community. Additionally, vehicle directory information may be updated with information on the new community and its members. After a new community is formed, or if no other vehicles respond to form a new community, a determination may be made as to whether OBU 30 has other interests, and if so, flow may return to 421 where the vehicle directory is searched to identify another community of interest.

If a community of interest is identified in the vehicle directory, as determined at 422, then OBU 30 can publish at 426 a request to join the identified community of interest. A determination is made at 427 as to whether OBU 30 was accepted to the identified community. If the request to join from OBU 30 was accepted, for example, by an authorized agent of the community, then at 428 OBU 30 can join the community and vehicle directory information may be updated with information on the new community member, OBU 30. After joining the community at 428, or if OBU 30 was not accepted to the identified community, a determination may be made as to whether OBU 30 has other interests, and if so, flow may return to 421 where the vehicle directory is searched to identify another community of interest. OBU 30 may join and/or form multiple communities of interest, depending on the availability of other vehicles having similar interests to OBU 30.

Figure 18:
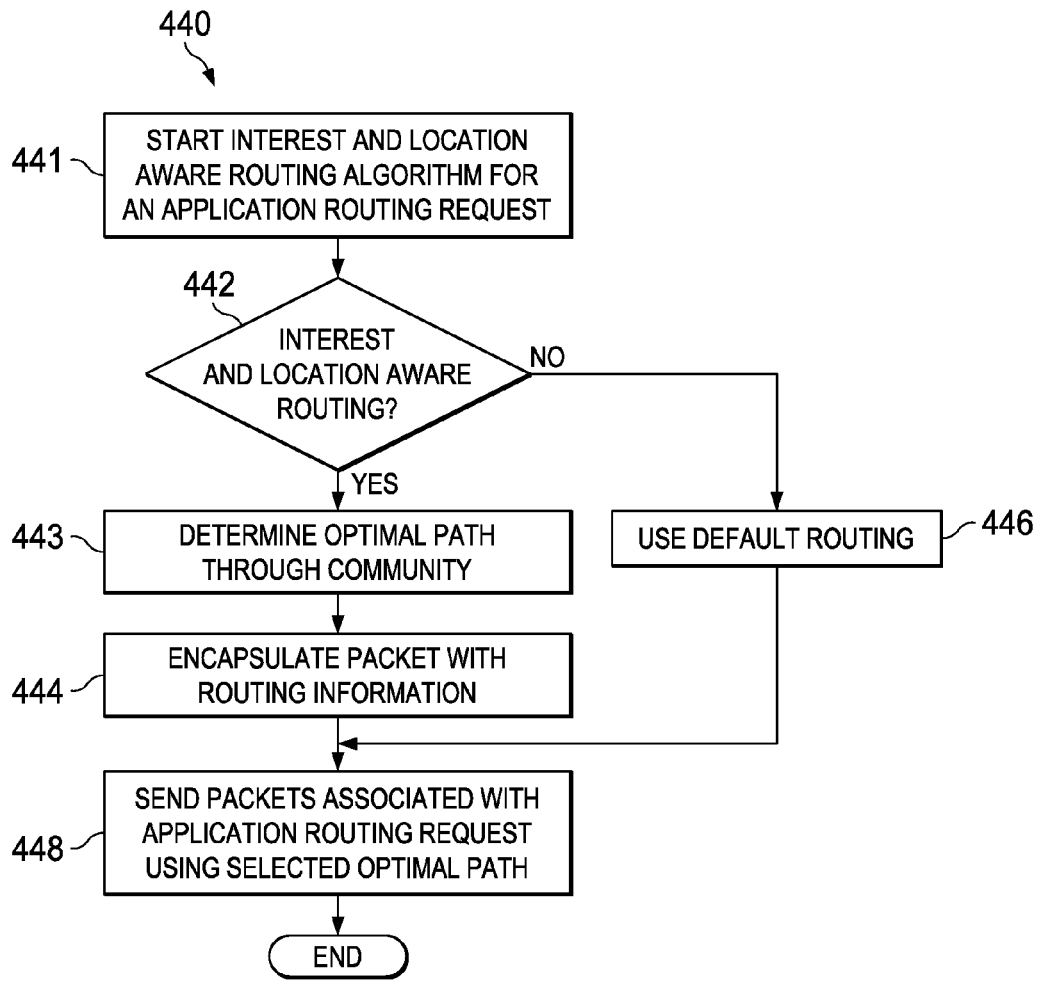
FIG. 18 is a simplified flowchart illustrating example operations that may be associated with interest and location aware routing in a network environment in embodiments of the present disclosure.

FIG. 18 illustrates a flow 440 of example operations that may be associated with an interest and location aware routing algorithm in accordance with embodiments in this disclosure. Interest and location aware routing may be performed if OBU 30 is a member of one or more communities, whenever an application routing request is presented (e.g., routing request to another node in vehicular ad hoc network, routing request to a node available through the Internet). Flow 440 may begin at 441 where OBU 30 has a routing request to a destination node within vehicular ad hoc network (e.g., another OBU) or outside of vehicular ad hoc network (e.g., in the Internet). A determination may be made at 442 as to whether interest and location aware routing should be performed. If OBU 30 is not a member of any vehicular communities of interest, then default routing may be used at 446 to determine an optimal path to the destination node.

If OBU 30 is a member of one or more communities as determined at 442, however, then an optimal path through one or more of the communities may be determined at 443. For example, if multiple paths are available from OBU 30 to the destination node, and one of the paths includes one or more intermediate nodes (OBUs) that are members of a community of which OBU 30 is also a member, then the path with the most community members may be selected instead of the other path. Thus, the community member information may be used to advantageously select a path to a destination node.

In one example scenario, assume that a carbon dioxide ($CO_2$) community has been formed in a vehicular ad hoc network and the vehicle members have $CO_2$ sensors for sensing $CO_2$ levels and providing that information to an appropriate cloud in the Internet. Sensor data from vehicle sensors may likely be the same or very similar when the vehicles are in close proximity to each other and, therefore, it could be advantageous to use data fusion to eliminate redundant data. Accordingly, OBU 30 may compress its $CO_2$ sensor data, and forward to the next node in the $CO_2$ community. The next node may also compress the sensor data, eliminating any redundancies. This can be repeated at other nodes in the $CO_2$ community, thereby reducing bandwidth, traffic congestion, and potentially network access costs (e.g., sending fewer data packets over 3G, if free WiFi is not available).

In another example scenario, an in-vehicle gaming device may be connected to OBU 30, which is a member of a gaming community in a vehicular ad hoc network. The location and interest aware routing algorithm could be used for peer-to-peer gaming communications in order to route messages to destination nodes within the gaming community using other nodes within the gaming community as intermediate nodes, so that all members have access to the distributed gaming content.

In yet another example scenario, OBU 30 may belong to a community with specialized information. OBU 30 may want to send its cached information to a destination node and knows that other nodes (or members) within the community have similar information that could be of interest to the destination node. Accordingly, location and interest aware routing algorithm could be used to route the message from OBU 30 through the other intermediate nodes in the community so that each node could add its new information before reaching the destination node. Generally, any application involving changing information (e.g., editing, modifying, appending, deleting, updating, etc.) before it reaches a destination node can be routed using location and interest aware routing algorithm. In another example, routing along nodes of a community may allow the intermediate nodes to update the information with new, more relevant data. For example, information about the length of a queue at a gas or charging station may be routed through intermediate community nodes that could have newer information.

With reference again to FIG. 18, once an optimal path has been determined at 443, a packet can be encapsulated at 444 with routing information (e.g., nodes or waypoints of the selected optimal path). After the packet has been encapsulated at 444, or if default routing was used at 446, the packet associated with the application routing request may be sent to the destination node using the selected optimal path.

Figure 19:
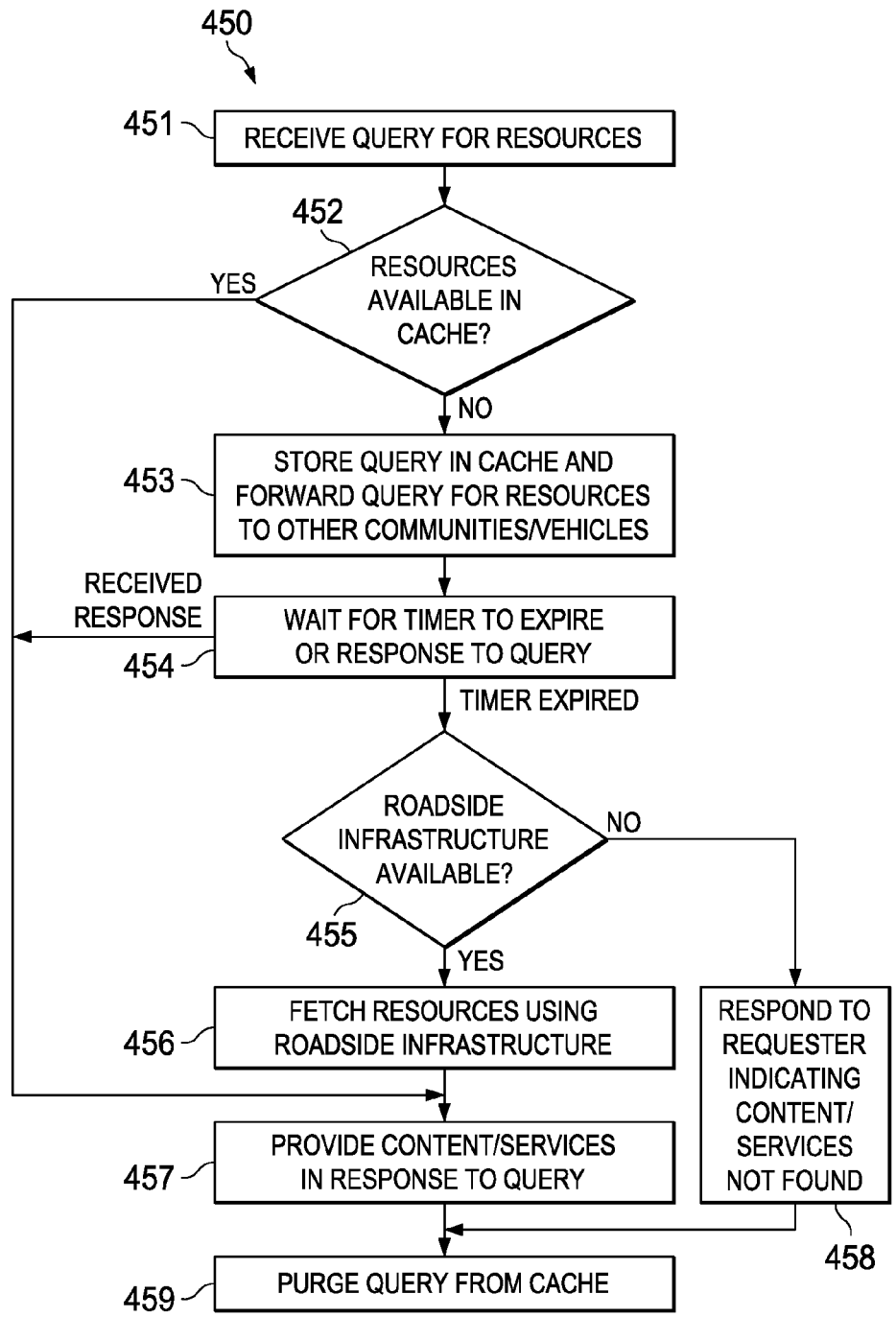
FIG. 19 is a simplified flowchart illustrating example operations that may be associated with hosting/proxying content in embodiments of the present disclosure.

FIG. 19 illustrates a flow 450 of example operations that may be associated with a vehicle hosting or proxying resources in a vehicular ad hoc network in accordance with embodiments of this disclosure. Flow 450 may begin at 451 where OBU 30 receives a query for resources from another OBU. At 452 a determination is made as to whether the resources are available, for example in local storage 39 or locally stored cache of OBU 30. If the requested resources are available, then at 457 the requested resources may be provided to the requesting OBU (e.g., stored content in local storage 39 or cache of OBU 30 may be downloaded to the requesting OBU).

If the requested resources are not available, as determined at 452, then a store-forward technique may be used. In one embodiment, OBU 30 could store the query at 453 for further action later. If other communities or vehicles are available within the vehicular ad hoc network, then the query may be forwarded at 453 to the other communities and/or vehicles. For example, OBU 30 may be connected to peers who are not in a particular community, but OBU 30 would have knowledge of those peers and could forward the query to them. OBU 30 may also be a member of other communities having different vehicle members than the community from which the query was initiated. OBU 30 could forward the query to those other communities if authorized.

A timer may be used at 454 to provide a designated time interval for OBU 30 to retain the query for possible further processing. If a response to the query is received by OBU 30 before the timer expires, then OBU 30 can forward the response to the requesting OBU (or along a path to the requesting OBU). Alternatively, the node responding to the query may send the content to the requester OBU through a different path and the response received by OBU 30 could be a message indicating the query had been answered. In either case, if the query was saved in cache by OBU 30, it may be purged at 459.

If the timer expires without receiving a response, then in some cases, the query may be purged and a response sent to the requesting OBU that the content or services were not found. In other cases, OBU 30 may forward the query to the infrastructure in order to obtain the requested resources. This is shown at 455, where a determination is made as to whether a roadside infrastructure device is available. If not, then a response may be sent at 458 to the requesting OBU that the content or services were not found and then the query can be purged from cache at 459. If a roadside infrastructure device is available, however, then at 456 OBU 30 may forward the query to the Internet and fetch the requested resources. Once OBU 30 receives the requested resources, it can forward the response to the requesting OBU (or along a path to the requesting OBU). If the query is still in cache of OBU 30, it may be purged at 459.

Figure 20B:
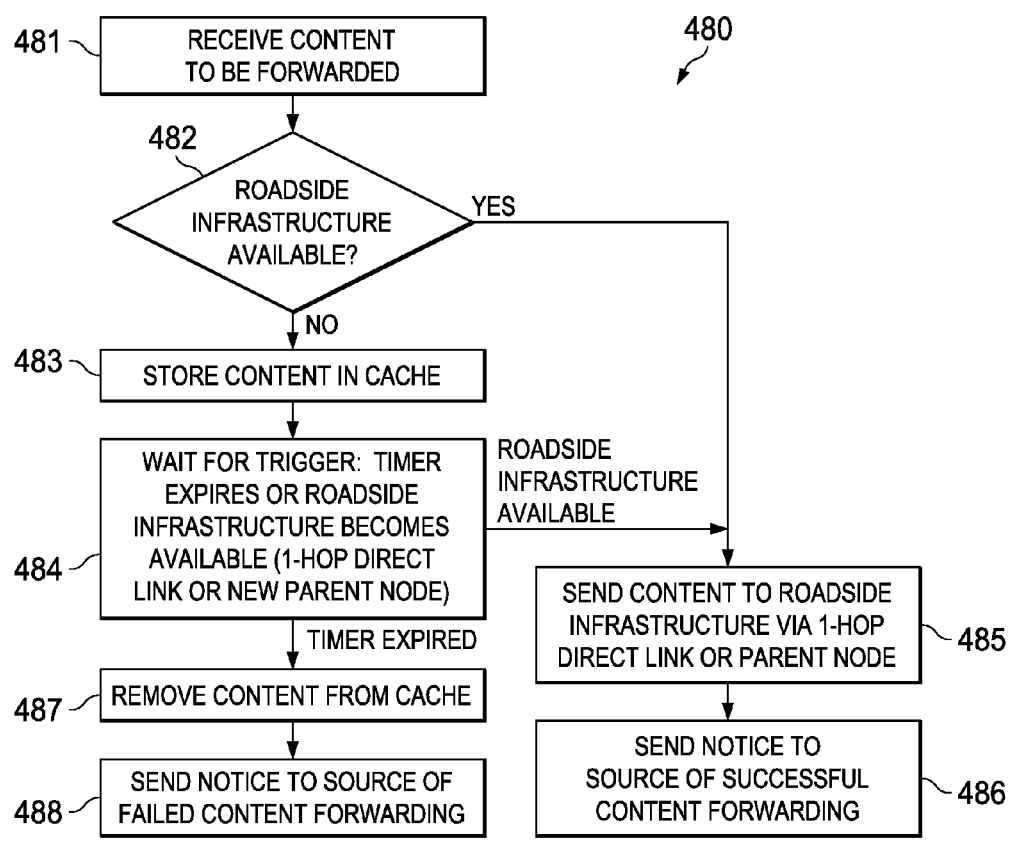
FIG. 20B is a simplified flowchart illustrating example operations that may be associated with operations related to receiving and forwarding content in a network environment in embodiments of the present disclosure.

FIGS. 20A and 20B illustrate flows 460 and 480 of example operations that may be associated with store-forward techniques for sending and receiving, respectively, non-time-sensitive content in a vehicular ad hoc network. Flow 460 may begin at 461 where a send request may be initiated on OBU 30 or on an in-vehicle device (or possibly an external device) with a communication link to OBU 30, to send content to a destination node on the Internet. The send request may be associated with non-time-sensitive content such as, for example, an electronic mail (email) message. A determination may be made at 462, as to whether roadside infrastructure is available. If it is available, then OBU 30 may use suitable routing, for example, routing in global vehicular ad hoc networks as described herein, to route packets of the non-time-sensitive content to the available roadside infrastructure (e.g., via a 1-hop direct link or via a parent node) at 471.

If roadside infrastructure is not available, as determined at 462, however, then the content may be stored in cache at 464. Roadside infrastructure may not be available if OBU 30 is part of an isolated vehicular ad hoc network or if OBU 30 is not connected to any other vehicles and is not connected to any roadside infrastructure device. A determination may be made at 466 as to whether a vehicular ad hoc network is available (i.e., whether OBU 30 has one or more peers). If a vehicular ad hoc network is available, then at 468, the content may be sent to one or more peers of OBU 30.

After the content is sent to one or more peers at 468, or if OBU 30 does not have a communication link established to any peers, then OBU 30 may leave the content in cache until a triggering event occurs. Triggering events could include a peer response, a timer expiring, or a roadside infrastructure link being established. If OBU 30 receives a peer response that the content was not successfully forwarded, then flow may return to 470 to continue to wait until either the timer expires or roadside infrastructure becomes available. If, however, OBU 30 receives a peer response that the content was successfully forwarded, then OBU 30 may remove the content from cache at 475.

If a timer expires, then OBU 30 may remove the content from cache at 472 and may send a notice to a user (e.g., a driver or passenger) at 473, if appropriate, indicating the request to send the content was not successful. If a roadside infrastructure device becomes available, because either OBU 30 detects and associates with a roadside infrastructure device or OBU 30 is notified that a peer has 1-hop or multi-hop access to a roadside infrastructure device, then at 471, OBU 30 may use suitable routing to send packets of the non-time-sensitive content to the available roadside infrastructure device.

In FIG. 20B, operations that may be associated with receiving non time-sensitive content in a vehicular ad hoc network are illustrated in flow 480. Flow 480 may begin at 481 where OBU 30 receives content to be forwarded to a destination node on the Internet. The send request may be associated with non-time-sensitive content such as, for example, an email message. A determination may be made at 482, as to whether roadside infrastructure is available. If it is available, then OBU 30 may use suitable routing, for example, routing in global vehicular ad hoc networks as described herein, to route packets of the non-time-sensitive content to the available roadside infrastructure (e.g., via a 1-hop direct link or via a parent node) at 485. At 486, OBU 30 may also send a notice to a source of the content indicating the content was successfully forwarded.

If roadside infrastructure is not available, as determined at 482, however, then the content may be stored in cache at 483. Roadside infrastructure may not be available if OBU 30 is part of an isolated vehicular ad hoc network or if OBU 30 is not connected to any other vehicles and is not connected to any roadside infrastructure device (e.g., if OBU 30 loses connectivity just after receiving the content).

After the content is stored in cache, then OBU 30 may leave the content in cache at 484 until a triggering event occurs. Triggering events could include a timer expiring or a roadside infrastructure device becoming available. If a timer expires, then OBU 30 may remove the content from cache at 487 and may send a notice to a source of the content indicating the request to forward the content was not successful. If a roadside infrastructure device becomes available, because either OBU 30 detects and associates with a roadside infrastructure device or OBU 30 is notified that a peer is a parent node with a 1-hop or multi-hop access to a roadside infrastructure device, then at 485, OBU 30 may use suitable routing to send packets of the non-time-sensitive content to the available roadside infrastructure. At 486, OBU 30 may also send a notice to a source of the content indicating the content was successfully forwarded In some embodiments, receivers of non-time-sensitive content to be forwarded may also forward the content to peers in a vehicular ad hoc network if roadside infrastructure is not available. In this embodiment, triggering events could include a peer response that the content was successfully sent, a peer response that forwarding the content failed, or a 1-hop direct link to a roadside infrastructure device becoming available. Thus, if roadside infrastructure is unavailable, content could be propagated throughout the vehicular ad hoc network so that the first vehicular node to gain access to a roadside infrastructure device via a 1-hop direct link could forward the contents.

Figure 21:
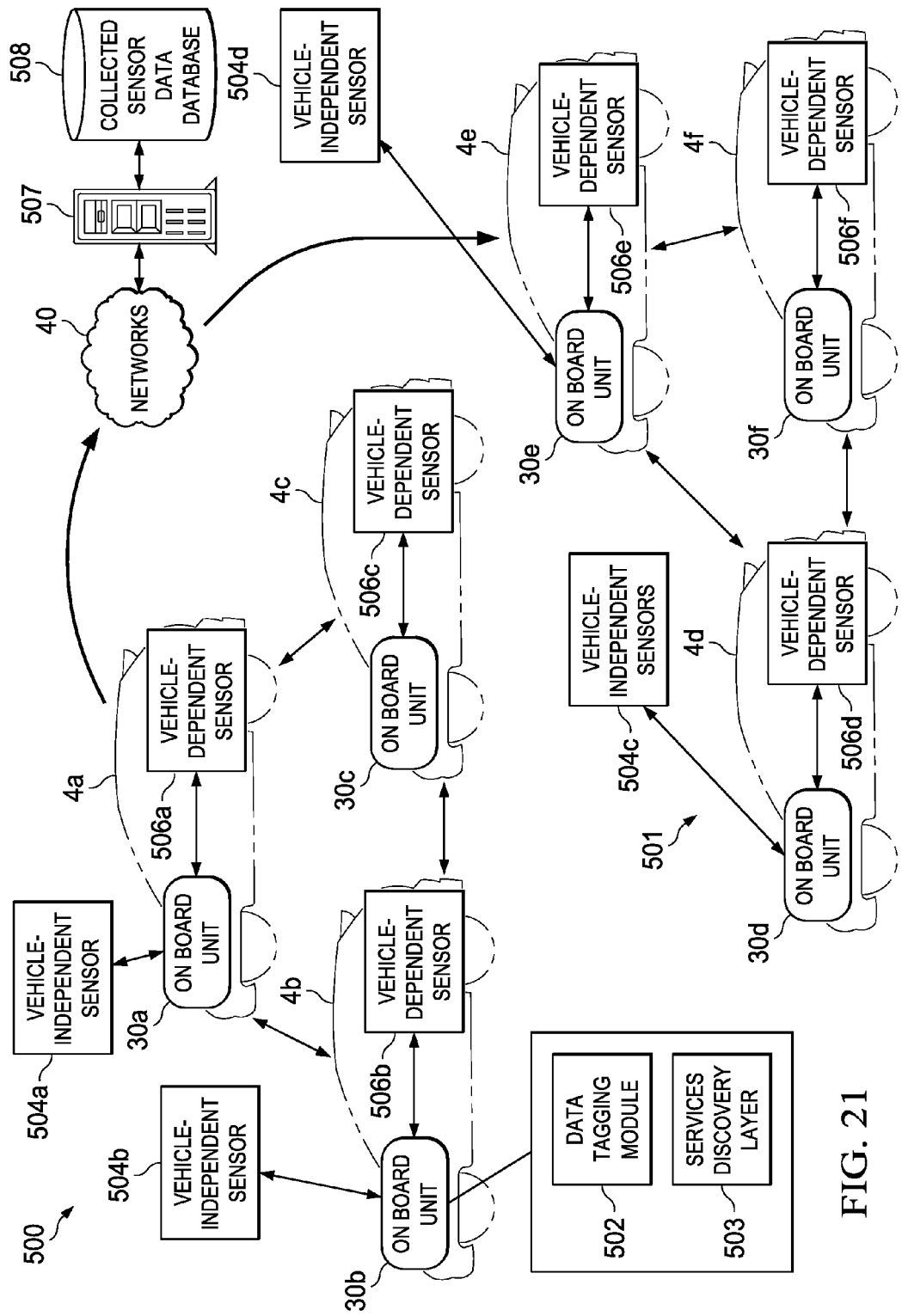
FIG. 21 is a simplified schematic diagram of an exemplary network environment illustrating one embodiment of collaborative sensing in the communication system according to embodiments of the present disclosure.
Figure 23:
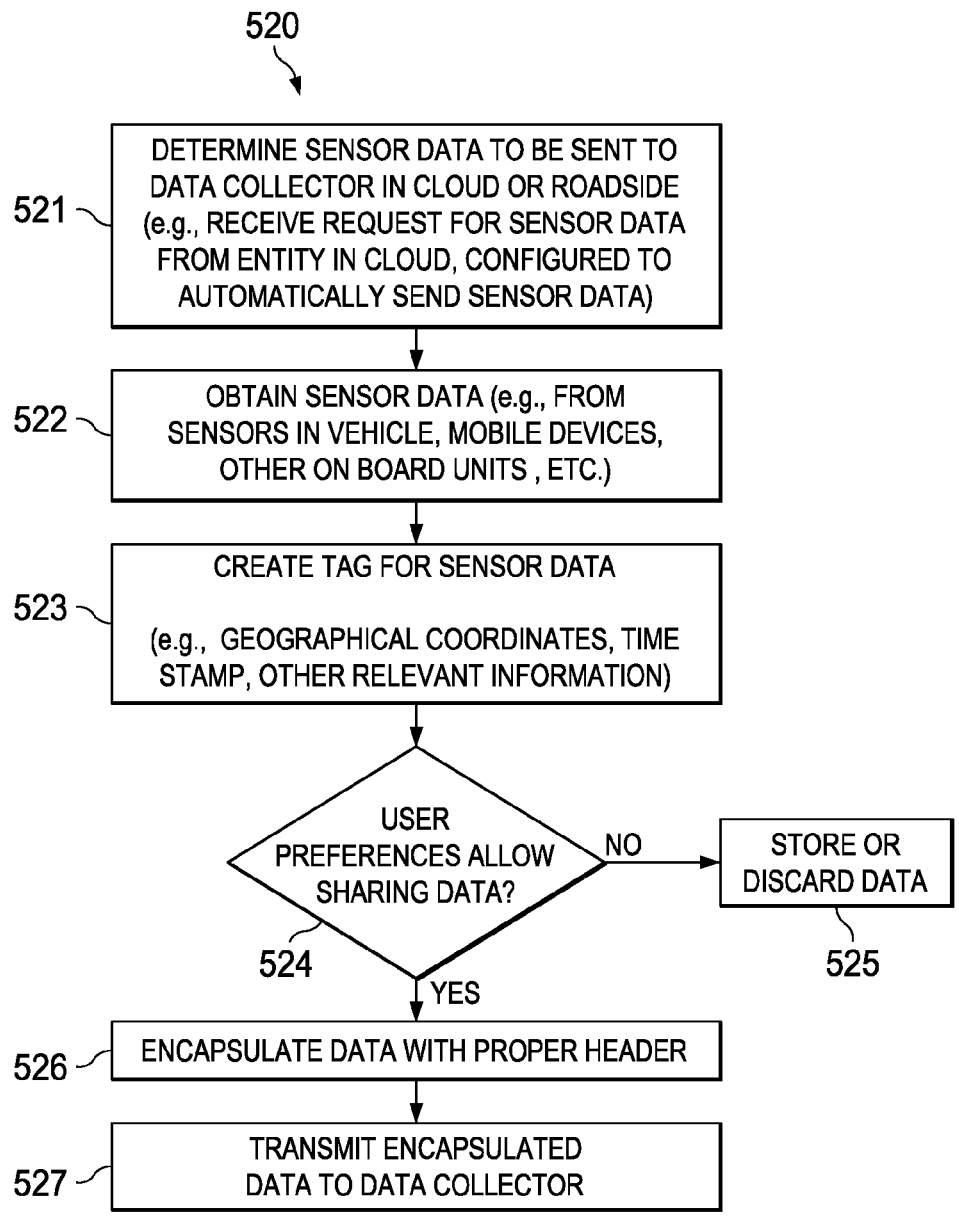
FIG. 23 is a simplified flowchart illustrating example operations that may be associated with collaborative sensing in accordance with embodiments of the present disclosure.

Turning to FIGS. 21-23, FIGS. 21-23 illustrate an embodiment of communication system 10 in which on-board units (OBUs) may be used for collaborative vehicular sensing. FIG. 21 illustrates an example network environment with a first vehicular ad hoc network 500 and a second vehicular ad hoc network 501, both of which are globally connected through networks 40. Ad hoc network 500 includes OBUs 30a, 30b, and 30c of vehicles 4a, 4b, and 4c, respectively. Ad hoc network 501 includes OBUs 30d, 30e, and 30f of vehicles 4d, 4e, and 4f, respectively. Networks 40, as previously described herein, could include any suitable uplink connection (e.g., IEEE 801.11x wireless, cellular, satellite) from one or more OBUs 30a-f to the Internet or other wide area network. Data collector 507 may be accessible through networks 40, including the Internet, for receiving sensor data from OBUs 30a-c and pushing data to OBUs 30d-f. This flow of sensor data is shown for illustrative purposes and it will be appreciated that sensor data could be pushed to data collector 507 from any OBU 30a-f and that data collector 507 could push data back to any OBU 30a-f.

Components of OBU 30b, including data tagging module 502 and services discovery layer 503, can enable collaborative vehicular sensing in accordance with embodiments disclosed herein. Services discovery layer 503 may include discovery engine 330, previously described herein, to enable discovery of OBUs, in-vehicle devices, external mobile devices, applications and services. Data tagging module 502 may facilitate collecting sensor data and providing the sensor data to appropriate entities such as data collector 507 in the Internet. Other OBUs (e.g., OBUs 30a, 30c-f) may also include data tagging module 502 and services discovery layer 503 to enable collaborative vehicular sensing. Data collector 507 could be a network element such as a server or any other suitable device, component, element, or object operable to exchange information in a network environment and configured to receive and process sensor data.

Various vehicle-dependent sensors and vehicle-independent sensors are shown connected to OBUs 30a-30f. Sensors are intended to include any type of device that senses a physical stimulus (e.g., heat, light, sound, pressure, magnetism, motion, etc.) and produces a resulting impulse, and/or that collects real-time sensory data (e.g., audio, visual, olfactory, temperature, etc.). Vehicle dependent sensors are a type of machine device integrated with, mounted on, or otherwise connected to a vehicle. Vehicle independent sensors are sensors that are not mounted or integrated with a vehicle but may, for example, be included in a mobile device's capabilities. Vehicle independent sensors could be operating within a compartment of the vehicle or operating outside the vehicle but within a wireless range of the vehicle's OBU. For example, vehicle independent sensor 504a could be integrated with a mobile device (e.g., mobile phone camera) that establishes a wireless connection to OBU 30a from within vehicle 4a or from within a wireless range of OBU 30a that is external to vehicle 4a. Examples of sensors include cameras, thermometers, accelerometers, environmental sensors, and seismic sensors. It will be apparent that numerous other types of sensors may be used in accordance with embodiments of this disclosure, and these other types of sensors may be vehicle-dependent or vehicle-independent.

In FIG. 21, vehicle-independent sensor 504a and vehicle-dependent sensor 506a are connected to OBU 30a. Vehicle-independent sensor 504b and vehicle-dependent sensor 506b are connected to OBU 30b. Vehicle-dependent sensor 506c is connected to OBU 30c. Vehicle-independent sensor 504c and vehicle-dependent sensor 506d are connected to OBU 30d. Vehicle-independent sensor 504d and vehicle-dependent sensor 506e are connected to OBU 30e. Finally, vehicle-dependent sensor 506f is connected to OBU 30f.

The embodiments disclosed herein provide a way for any sensors connected to an OBU to contribute sensor data in a crowd-sourcing fashion. In one embodiment, sensor data may be aggregated in a central repository such as collected sensor data database 508 or other memory element accessible to data collector 507. The aggregated data can then be processed, distilled, and filtered by data collector 507 or any other suitable network element with access to the data in the central repository. Data collector 507 may then push back the processed, distilled, and/or filtered data to OBUs and mobile devices for consumption by users. Central repositories and data collector functions could be centralized or distributed, for example to serve geographically defined areas.

One example form of data produced by vehicle-dependent and vehicle-independent sensors includes pictures from cameras (e.g., vehicle-mounted cameras, mobile phone cameras, etc.). Picture data can be used to produce screen displays for map services and applications, including navigation systems. Generally, the process of collecting data for map services is costly and pictures may only be taken periodically (e.g., every six months, etc.). In addition, the pictures may need to be stitched together to provide a seamless, continuous view of an area, which can be time-consuming and may rely on significant processing resources. Thus, localized and transient data may not be captured by typical map services and applications due to the high cost and latency of creating updated map tiles.

FIG. 22 provides example pictorial diagrams of two methods for storing geographic data, which may be used for location based displays by map services and applications, such as navigation systems: raw vector data 515 and a pre-rendered map tile 516. Pre-rendered map tiles such as map tile 516 offer a format that can be desirable for consumption on mobile devices, but may rely on significant processing power to be produced. An example location 517 and direction 518 are provided on raw vector data 515 to illustrate information that may be provided with sensor data such as photographs. Location 517 may be provided by a GPS, and a direction 518 may be provided by a digital compass. These map tiles also rely on knowledge of conditions across an entire map, which may not be accessible by a single device.

With collaborative sensing, as disclosed in the present application, a real-time or close to real-time view of current conditions is possible. In a "Street View" option provided by typical map services, for example, actual picture views may be displayed of a road such as a street, highway, interstate, bridge, boulevard, or any other path or geographical area that can be traversed by a vehicle or that has been captured by photographs and combined with other views of the geographical area. The street views may include other natural or man-made objects, wildlife, nature, humans, and any other object that could be photographed on a particular roadway. The street views, however, may not reflect actual current conditions of the roads or geographical areas being displayed. In accordance with the present disclosure, however, if a vehicle is equipped with an externally facing camera (e.g., front-facing, rear-facing, or side-facing camera), the vehicle can contribute photographs taken by the cameras to a data collection service such as data collector 507. In one implementation, the photographs may be uploaded in real-time if the vehicle has a communication link to the Internet or as soon as the vehicle connects directly to a roadside infrastructure device or joins a global vehicular ad hoc network.

Sensor data submissions, such as photographs, include a geo-tag so that the sensor data can be geographically contextualized. In particular, date, time, and location, of sensor data submissions can be provided in a geo-tag in order to appropriately process the sensor data. Location provides information about where the data was collected. Date and time provide information as to when the sensor data was collected. Additionally, geo-tags for some sensor data may include directional information.

A geo-tag of a photograph could include date, time, location, and directional information related to the photograph. In one example implementation, a geo-tag for a photograph is the following: <Lat (latitude), Lon (longitude), Pitch, Azimuth, Focal length, Camera Resolution, Date, Time>. The geo-tag information may be relied upon to evaluate how a corresponding photograph should be used to create, update, or add to a map. Such information may be needed because different vehicles could have cameras placed at various locations (e.g., front, back, side) providing differing directional views. Different cameras may also have different pitches, resolution, focal lengths, and the like. This directional data enables building map tiles that accurately show sides of a street depending on the direction of the view. In example implementations, GPS location data can be augmented with a digital magnetometer (compass) to provide directional information.

After a photograph is provided to OBU, either by a vehicle dependent sensor or a vehicle-independent sensor, the OBU of the vehicle can create a geo-tag before sending the photograph to data collector 507. By cross-referencing a position, direction, and time stamp with raw vector data from which the map tiles are built, the data provided by the photograph can be accurately processed in a geographical and temporal context. Accordingly, map tiles can be built with a high degree of geographic relevance while focusing on the most recent data points. Additionally, location based and transient events can be captured and made available in real-time, or close to real-time, unlike traditional map services approaches. As more and more vehicles participate in providing geo-tagged photographs, the "Street View" may approach a live view of roads.

Collaboratively collecting sensor data and aggregating the data by pushing it to a data collection system in the Internet is not limited to photographs. Any sensor data can be geo-tagged, time-stamped, and uploaded to a data collection system by leveraging an OBU's vehicular network. This includes sensors built into the cars themselves (i.e., machine devices), as well as any sensors that may be exposed as services using geo-aware discovery layer 503 of an OBU, which could be implemented as described in co-pending Provisional Application No. '138.

In one example scenario of collaboratively collecting sensor data, assume an accident occurs and the first responders (e.g., police, emergency medical, fire, etc.) want to assess the situation while in route to the scene. Using an OBU's discovery layer 503, camera services can be requested from anyone in the relevant geographic area. Because fixed vehicular cameras (e.g., mounted on a vehicle) may not provide a useful view of the accident, drivers and passengers nearby, or pedestrians within a wireless connectivity range of a vehicle, could offer their cell phone cameras or other mobile device cameras as a source of a video stream. Because the users' phones can be connected to an OBU, camera services could be requested by the responders through a vehicular ad hoc network, if the vehicular ad hoc network encompassed vehicles proximate to the accident. Otherwise, the responders could query data collector 507 for camera services of any connected vehicles proximate the accident. Data collector 507 could then query connected vehicles proximate the accident. Because mobile phones and other mobile devices of drivers, passengers, and other users (e.g., pedestrians) may connect to a vehicular ad hoc network and/or roadside infrastructure through an OBU of a vehicle, a wide variety of services may be available even if such services cannot be served directly by sensors on the vehicle itself.

In another example scenario, collaborative data sensing could provide critical information not otherwise available during a natural phenomenon, like an earthquake. Measuring propagation of an earthquake across hundreds of miles using a conventional network of static sensors may be impractical and financially prohibitive. Embodiments of the present disclosure, however, could enable scientists to leverage vehicular ad hoc networks provided by OBUs and connected mobile devices to query sensors in numerous vehicles (e.g., machine devices), OBUs, and connected mobile devices. For example, many mobile phones currently include accelerometers, which could be queried and could provide a massive number of data points related to the earthquake. This sensor data could be relayed from an OBU through a vehicular ad hoc network and up to any appropriate network (e.g., data center accessible through the Internet), such as data collector 507, for processing.

The Internet (also referred to herein as "the cloud") interconnects numerous computer systems with massive computing power. The cloud, however, lacks the ability to collect location-sensitive data. Instead, many Internet-based systems may avoid having services tied to a particular location. In contrast, mobile devices such as an OBU and a mobile phone can communicate using a location-aware network, such as a vehicular ad hoc network, to provide a rich source of real-time, location-specific data. The generally limited computing power and storage capacity of each mobile device, however, presents restrictions on how well each device can interpret the data as a whole. Accordingly, communication system 10 can be configured such that raw sensor data can be collected by these location-aware devices (e.g., OBUs and any sensor devices connecting to the OBUs) and relayed to the cloud for processing. For this to work effectively, services discovery layer 503 and applications 31 need a geographically aware and flexible network for communications. Embodiments as shown and described herein offer such a geographically aware and flexible network.

After data has been processed by the cloud, such as data collector 507, it can be pushed back to individual clients (e.g., users, drivers, and passengers in vehicles requesting particular sensor data) for consumption. In the earthquake scenario, for example, assume a network of 100,000 mobile phones and OBUs is spread out over 300 square miles. As the earthquake happens, accelerometer data can be streamed from the mobile phones, through respective OBUs, and up to the cloud for processing. After leveraging the massive compute power of the cloud, map tiles could be generated that, instead of showing roads and highways, show a propagation pattern and relative strength of the earthquake geographically. Within minutes, this data could be streamed back down to the same clients that collected it and other clients in a format suitable for consumption. In effect, each device receives the benefit of being connected to this massive network by getting a rich data stream as if it was connected to a large, expensive sensor network of 100,000 accelerometer measurement units spaced over 300 square miles.

Embodiments disclosed herein enable pulling data from a large network of geographically aware sensors and combining the data into a holistic view. This data can then be redistributed to clients (e.g., OBUs and mobile devices), giving a global overview of sensor data, without requiring the clients to have massive amounts of computing power or network bandwidth. Each stage uses the best resource for its specific focus. Computation and global interpretations may be done in Internet-based systems, such as data centers designed to handle large amounts of data and computation of data, while sensor data collection and consumption may be performed on OBUs and mobile devices, for example. Additionally, some types of sensor data may be more geographically confined and could be requested and processed by roadside infrastructure devices connected to one or more vehicular ad hoc networks.

FIG. 23 illustrates example operational steps that may be associated with a flow 520 for collecting sensor data, creating a geo-tag for the data, and providing the geo-tagged data to an Internet-based system like data collector 507 and database 508. Flow 520 may begin at 521 where a determination is made as to what sensor data would be sent to a data collector in the cloud or, alternatively, to a roadside infrastructure device. The determination could be made in response to receiving a request for the sensor data from an entity in the cloud (e.g., data collector 507) or from a roadside infrastructure device connected to the OBU. Alternatively, the OBU making the determination could be configured to automatically send certain sensor data on any appropriate periodic basis, based on particular needs. Available sensor data may be identified by an OBU using services discover layer 503.

Sensor data is obtained or collected at 522 from sensors in the vehicle, mobile devices, other OBUs, etc. Once sensor data has been collected, a geo-tag may be created at 523. The geo-tag can include geographical coordinates, time stamp, data stamp, and any other relevant information. At 524, a determination is made as to whether user preferences allow sharing data. If not, then the data may be stored or discarded at 525. Additionally, OBU could be configured to provide a request to the user for authorization to share certain data. For example, if data is regarded as critical or urgent (e.g., accident, earthquake, etc.) a request may be sent to the user/driver on, for example, display 28, requesting authorization to permit sharing for the critical data. If the user preferences allow sharing data, or if a user provides authorization to share data, then packets are encapsulated with a proper header at 526. After the packets have been encapsulated, they may be transmitted at 527 to data collector 507 for processing, distilling, and filtering.

Turning to FIGS. 24-29, FIGS. 24-29 illustrate an embodiment of communication system 10 in which on-board units (OBUs) are configured to access map tiles from the Internet, from roadside infrastructure devices, and/or from other OBUs of other vehicles, and intelligently cache the map tiles to minimize network traffic when dynamically updating a location-based display. Both raw vector data 515 and pre-rendered map tiles 516, used by navigation systems, present benefits and drawbacks for mobile devices. Storing raw vector data requires less storage space, but significant processor resources may be dedicated to rendering that data into a visually pleasing format for users at run time. Pre-rendered map tiles are typically pre-rendered from the vector data by servers in the cloud and chopped up into equally sized square images. Mapping/navigation/location-based applications may rely on fewer processor resources to draw pre-rendered map tiles on a mobile device, but the mobile devices may need much more memory for storing the map tiles than for storing raw vector data. This can be problematic, as many mobile devices have limited amounts of storage shared among many different applications. Moreover, downloading pre-rendered map tiles may require significantly more bandwidth. In a connected vehicle environment, depending on the particular connectivity available at any given location, it may be desirable to minimize network traffic and bandwidth used for accessing the Internet.

The embodiments shown and described with reference to FIGS. 24-29 leverage network connectivity provided by an OBU to effectively store, share, and fetch pre-rendered map tiles in an intelligent way. Accordingly, users may perceive that they have access to an entire map, when actually only a small number of map tiles are used by the system at any point in time.

Figure 24:
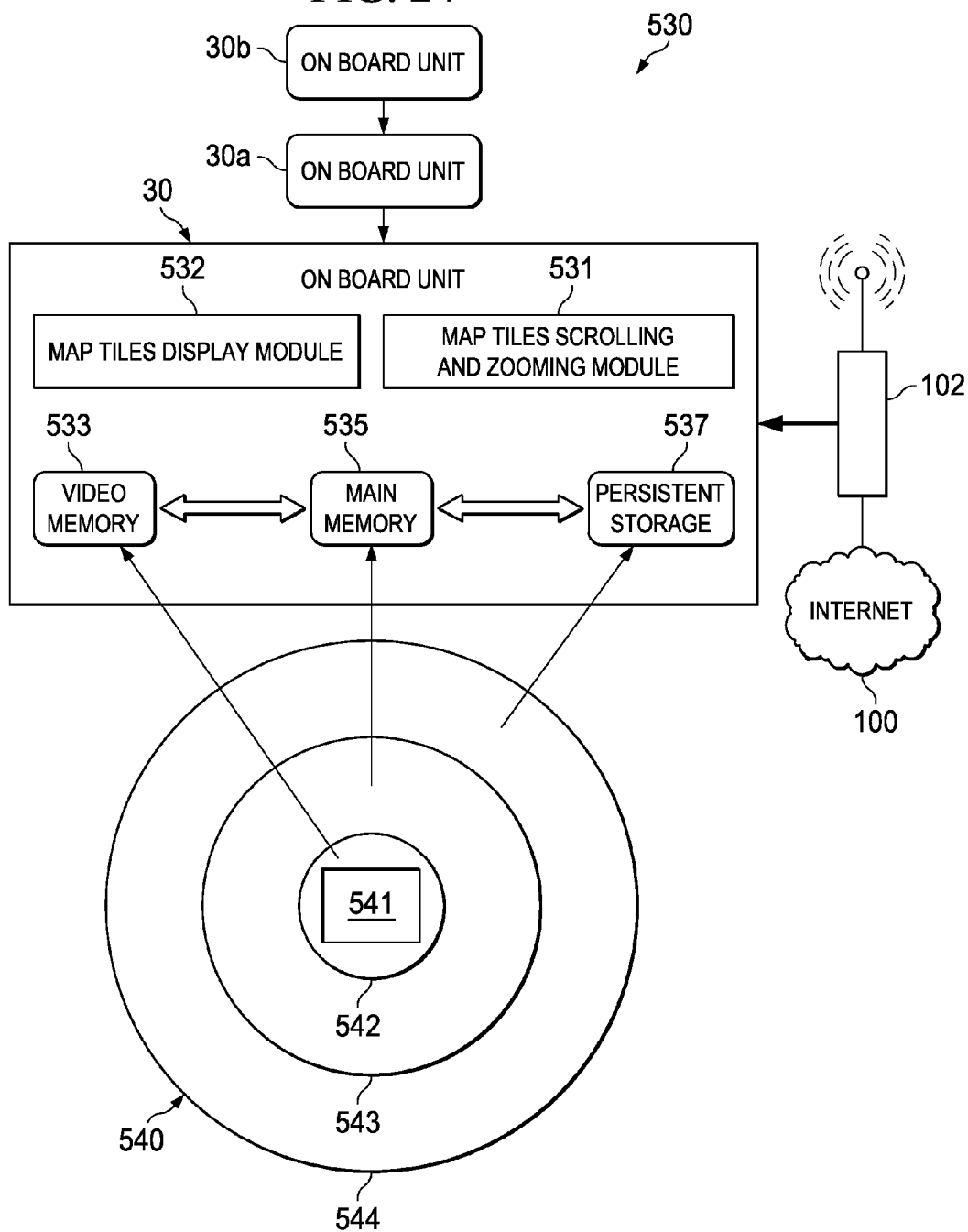
FIG. 24 is a simplified block diagram illustrating an example embodiment for updating location based displays in an exemplary ad hoc network environment in accordance with the present disclosure.

FIG. 24 illustrates an example network environment with additional details that may be associated with an embodiment of OBU 30 to achieve dynamically updating cache for displaying, for example, location based displays or maps of a navigation system using vehicle-to-vehicle and vehicle-to-cloud communications. FIG. 24 illustrates a vehicular ad hoc network 530, a roadside infrastructure device 102 (e.g., base station, WiFi access point, etc.) and Internet cloud 100. OBU 30 is connected to roadside infrastructure device 102 with access to Internet 100. In this illustrative scenario, map tiles for any location-based display could be provided by a map provider such as a data center or other repository for map tiles (e.g., data collector 507 and collected sensor data database 508) connected to Internet 100, by roadside infrastructure device 102, or by OBUs 30a and/or 30b. For simplicity, vehicles are not shown with OBUs 30, 30a, and 30b. However, it will be apparent that each OBU is assumed to be installed in a different vehicle.

Roadside infrastructure device 102 may be any type of roadside infrastructure device (e.g., WiFi, WiMAX, 3G, 4G, etc.) configured to store map tiles of a geographically relevant location or to access map tiles from another network element. For example, a WiFi access point may store map tiles representing a geographic area covered by the access point's wireless range. Roadside infrastructure device 102 may also be configured to push relevant map tiles to vehicles or other mobile devices or to respond to requests for map tiles from vehicles or other mobile devices.

OBUs 30, 30a, and 30b in vehicular ad hoc network 530 may cache map tiles, for example, of a current geographic area, after receiving such map tiles from other OBUs, from a map provider in the Internet, or from a roadside infrastructure device. For example, if OBU 30b is ahead of OBUs 30 and 30a and encounters roadside-infrastructure device 102 first, then OBU 30b may cache map tiles available from roadside infrastructure device 102. Thus, when OBU 30a and OBU 30 encounter the wireless range of roadside infrastructure device 102, map tiles for the current geographic area could be available from roadside infrastructure device 102, Internet 100, or OBU 30b. Accessing OBU 30b may be significantly less expensive than accessing the other options and may reduce the load on existing cellular networks such as 3G and 4G networks. Consequently, the bandwidth needed for fetching map tiles could potentially be reduced by a large factor. Moreover, the richly connected networks and location-sensitive context provided by OBUs may allow map tiles to continue to be dynamically updated in OBUs even when direct connectivity to a roadside infrastructure device is lost.

Requesting map tiles can be accomplished using dynamic discovery and communities of interest (e.g., navigation community), for example, as previously described herein. If neither OBU 30a nor OBU 30b has cached relevant map tiles requested by OBU 30 (or if OBUs 30a-b do not share information, for example, by not joining any communities of interest) then OBU 30 may request map tiles from roadside infrastructure device 102 and/or a map provider accessible through Internet 100.

In one example scenario, if a mobile phone does not have 3G access and can only display map tiles cached in its own memory, then the mobile phone may be able to get more or newer map tiles if it can connect to OBU 30. OBU 30 could fetch requested map tiles via roadside infrastructure device 102, or potentially from a vehicle within a vehicular ad hoc network to which OBU 30 is connected (e.g., ad hoc network 530). Other vehicles within the same ad hoc network could have relevant map tiles since the vehicles are likely to be geographically close to each other.

Any device or network element capable of connecting to and communicating with a vehicular ad hoc network could offer map tiles to vehicles (and any devices connected to the vehicles) in the ad hoc network. In one example scenario, cities could deploy roadside devices that may not necessarily offer connectivity to the Internet, but act as central repositories of geographically relevant information. For example, these roadside devices could be a repository of map tiles, potentially including other location-aware information (e.g., local businesses, local sporting and entertainment events, etc.), which cover a defined geographical area such as a 50-mile radius.

The embodiment of OBU 30 in FIG. 24 is shown with additional details for enabling intelligent caching once map tiles are received. Like many mobile devices, OBU 30 may have multiple levels of memory storage. Memory storage of OBU 30 may include video memory 533, main memory 535, and persistent storage 537. A map tiles display module 532 and a map tiles scrolling and zooming module 531 may also be included in OBU 30. Also shown in FIG. 24 is a diagrammatic view of a 2-dimensional caching scheme with geographic rings 540 surrounding a display screen 541.

In one embodiment of OBU 30, intelligent caching of map tiles may operate at multiple levels. Generally, for pre-rendered map tiles to be drawn on a display screen such as screen 541, the map tiles are first loaded into video memory 533. Mobile devices and possibly OBU 30, however, may have very little video memory. OBU 30 may also have additional main memory 535, which can be shared with applications and other data. On top of main memory 535, OBU 30 may have a larger amount of persistent storage 537, which could be some kind of flash memory, for example.

One example embodiment of a caching scheme shown and described with reference to FIGS. 24-29, includes both 2-dimensional and 3-dimensional caching. Multiple levels of caching are used for panning (2-dimensional) and zooming (3-dimensional). The map tiles are always just one cache level away when they enter the screen and need to be drawn. This allows the users to interact with the map by panning and zooming around in real-time without having to store an entire map on OBU 30 or another device connected to OBU 30.

The 2-dimensional caching scheme shown in FIG. 24 creates a series of 2-dimensional concentric, geographic rings 540 around a current center of a map and keeps each map tile within a particular ring loaded in a proper level of the cache. The center of the map, represented by map tiles within inner ring 542, may be drawn on screen 541 and may be stored in video memory 533. Map tiles between inner ring 542 and middle ring 543 may be stored in the next level of cache, main memory 533. Finally, map tiles between middle ring 543 and outer ring 544 may be stored in the next level of cache, persistent storage 537.

Figure 25:
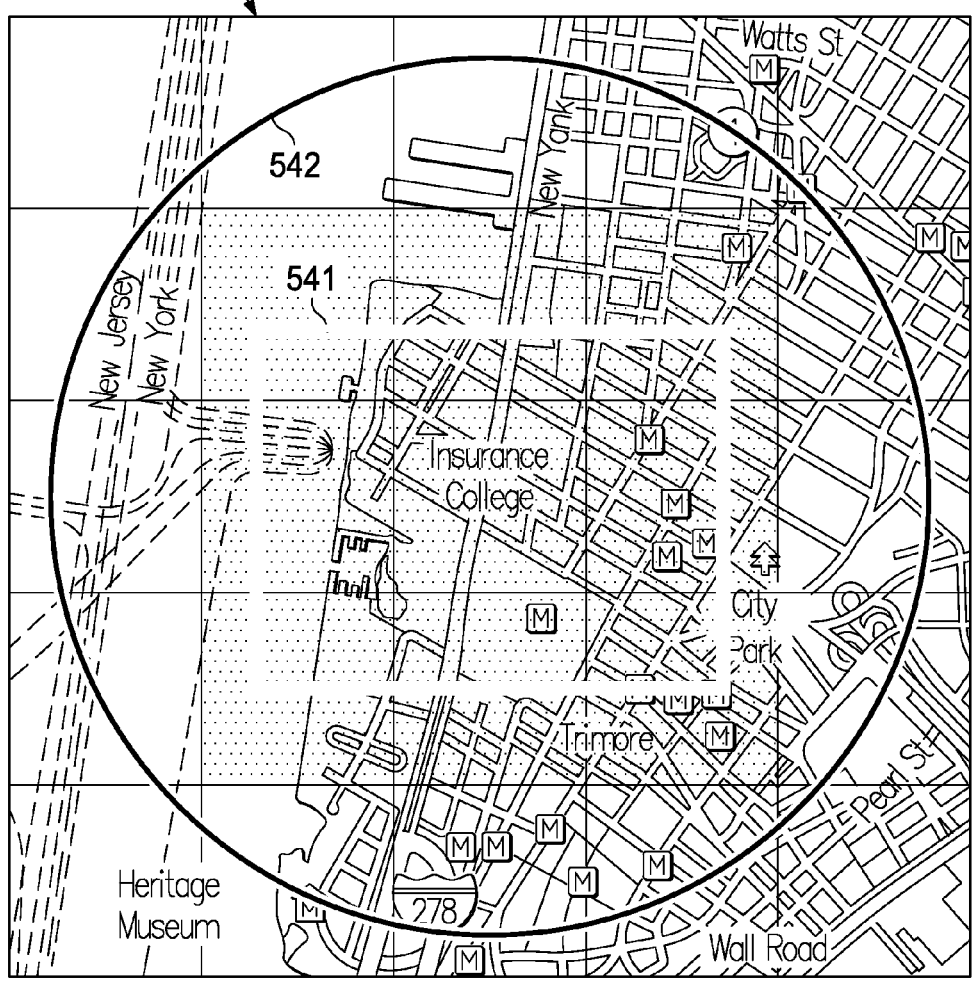
FIG. 25 is a pictorial diagram of an exemplary location based display in accordance with the present disclosure.

FIG. 25 illustrates example map tiles 556 drawn on display screen 541 with adjacent map tiles in various cache levels or rings. Display screen 541 is shown with shaded map tiles that are drawn in video memory 533 actively being used to display the map to the user. The shaded map tiles are within inner ring 542. Unshaded map tiles are geographically near the drawn map tiles (i.e., the shaded map tiles), but are some distance away from a center of the view. Thus, adjacent unshaded map tiles may be defined by middle and outer rings 543 and 544 (not shown in FIG. 25), and may be loaded, for example in main memory 535 and persistent storage 537, but not yet drawn. The circumference of geographic rings 540 and the amount of map tiles within geographic rings 540 may be configured in accordance with particular design choices and implementations.

When a user is interacting with the map shown on display screen 541, or if an associated navigation system is updating its current position, scrolling can occur in two directions: on an x-axis of the map tiles (which corresponds to moving across longitudes on the map) and on a y-axis of the map tiles (which corresponds to moving across latitudes on the map). Since the user only sees the tiles, which are inside the bounds of display screen 541, only those map tiles are drawn. Display screen 541 is, effectively, the user's 'window' into the map. Drawing map tiles can be an expensive operation on many mobile devices, and also possibly on OBU 30. Therefore, in one embodiment, only map tiles that can be seen through the 'window' are drawn (i.e., loaded in video memory 533).

If the user scrolls the view, however, some tiles that are not currently drawn (and therefore not in video memory 533) might need to be drawn to accommodate the user's scrolling commands. For example, the unshaded map tiles, which are geographically near the shaded (drawn) map tiles, may be loaded in main memory 535 such that they are ready to be drawn at a moment's notice, for example when the user scrolls the view into that area. Accordingly, map tiles move between each cache level as they enter and leave the geographical region around the center of the screen.

Figure 26:
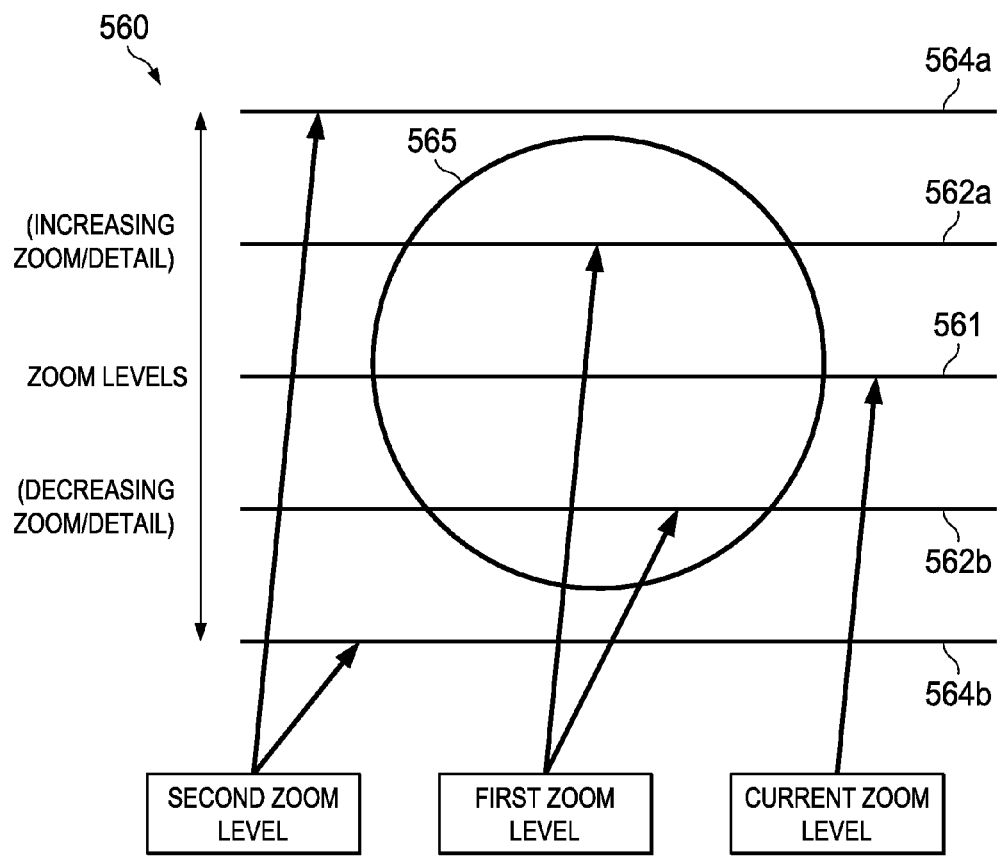
FIG. 26 is a block diagram illustrating details that may be associated with storing data for a location based display in accordance with the present disclosure.

FIG. 26 is a diagrammatic representation of a side view of a 3-dimensional caching scheme 560, which enables the user to move on a third axis, perpendicular to the x and y axes. The third axis is referred to herein as a 'zoom axis.' Zoom levels of the map are shown in FIG. 26 as if they are stacked on top of each other, like sheets of paper in a stack. In caching scheme 560, a current zoom level 561, first zoom levels 562a and 562b, and second zoom levels 564a and 564b are shown. In one embodiment, map tiles within a zoom ring 565 could be loaded in various memory storage, but only map tiles on current zoom level 561 are drawn, and thus, are stored in video memory 533.

Zoom and map details are increased or decreased depending on the particular zoom level of map tiles. In the example shown in FIG. 26, first and second zoom levels 562a and 564a, respectively, represent increasing map details (i.e., zoom-in). First and second zoom levels 562b and 564b, respectively, represent decreasing map details (i.e., zoom-out).

When a user zooms in or out on the map, new tiles may be downloaded that contain more detail (for a zoom-in command) or less detail (for a zoom-out command). Because the user could just as easily zoom in or out on the map as scrolling along x and y axes, nearby map tiles with more detail and nearby map tiles with less detail may also be cached. For example, map tiles at current zoom level 561 may be drawn and, therefore, stored in video memory 533. Map tiles at first zoom levels 562a and 562b may need to be drawn quickly and, therefore, may be stored in the next cache level, main memory 535. Map tiles at second zoom levels 564a and 564b are some distance away, but still may need to be drawn fairly quickly. Therefore, these tiles may be stored in the next cache level, persistent storage 537. Consequently, map tiles may be cached in 3-dimensions in a similar way to caching map tiles in 2-dimensions.

Figure 27:
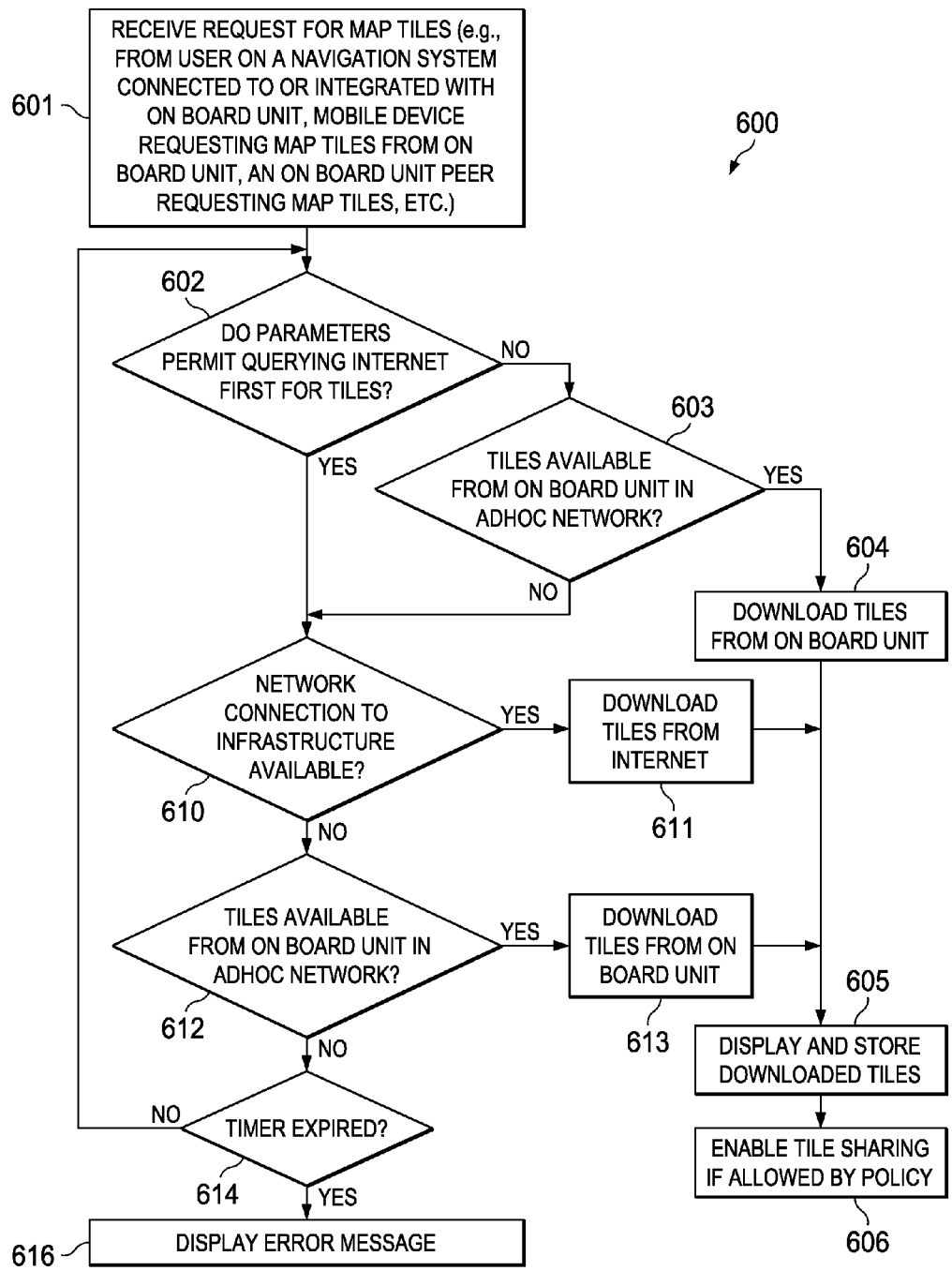
FIG. 27 is a simplified flowchart illustrating example operations that may be associated with a location based display in accordance with embodiments of the present disclosure.

FIG. 27 illustrates example operational steps that may be associated with a flow 600 for requesting, obtaining, and displaying map tiles through OBU 30. In one example embodiment, flow 600 may be performed by map tiles display module 532 of OBU 30. Flow 600 may begin at 601 where OBU 30 receives a request for map tiles. This request could be received, for example, from a navigation system coupled to or integrated with OBU 30, a mobile device connected to OBU 30, or another OBU in a vehicular ad hoc network such as OBU 30a or 30b in vehicular ad hoc network 530. A determination is made at 602 as to whether parameters permit querying Internet 100 for the map tiles first. These parameters could be policies set up by a driver or other user (e.g., possibly stored in a user profile) or could be preconfigured by a manufacturer, dealer, or other authorized entity.

If parameters do not permit querying the Internet first, then a determination is made at 603 as to whether the requested map tiles are available from another vehicle in a vehicular ad hoc (mesh) network. In one embodiment, OBU 30 can use a vehicle directory to form a community of interest and request the map tiles, as previously described herein. If another vehicle is hosting and sharing the map tiles, then at 604 the map tiles can be downloaded from the host vehicle to OBU 30. Tiles may then be stored by OBU 30 in appropriate memory components and displayed at 605. If policy allows OBU 30 to host and share the map tiles, then hosting is enabled at 606 and, for example, appropriate vehicle directories may be updated.

With reference again to 603, if the requested map tiles are not available in another vehicle, or if parameters do permit querying Internet 100 first for map tiles, then a determination is made at 610 as to whether a network connection to a roadside infrastructure device (e.g., roadside infrastructure device 102) is available. If a connection is available, either by a single hop or multi-hop connection, then the requested map tiles are downloaded from Internet 100 at 611. Tiles may then be stored by OBU 30 in appropriate memory components and displayed at 605. If policy allows OBU 30 to host and share the map tiles, then hosting is enabled at 606 and, for example, appropriate vehicle directories may be updated.

If it is determined at 610 that a network connection to a roadside infrastructure device is not available, then a determination is made at 612 as to whether the requested map tiles are available in another vehicle in a vehicular ad hoc (mesh) network, which may be performed in a similar manner as in 603. If another vehicle is hosting and sharing the map tiles, then at 613 the map tiles are downloaded from the host vehicle to OBU 30. Tiles may then be stored by OBU 30 in appropriate memory components and displayed at 605. If policy allows OBU 30 to host and share the map tiles, then hosting is enabled at 606 and, for example, appropriate vehicle directories may be updated.

If it is determined at 612 that the requested map tiles are not available in a vehicular ad hoc (mesh) network to which OBU 30 is connected, then a determination is made at 614 as to whether a timer has expired. In one embodiment, OBU 30 may only look for map tiles for a predetermined amount of time. Once the timer has expired, OBU 30 may discontinue searching for the map tiles until another request for the map tiles is made. Thus, if the timer has expired, then an error message may be displayed at 616 for the user to view, indicating that the map tiles are not currently available to OBU 30. If, however, the timer has not expired, then flow may pass back to 602 to repeat the search for the map tiles.

Figure 28:
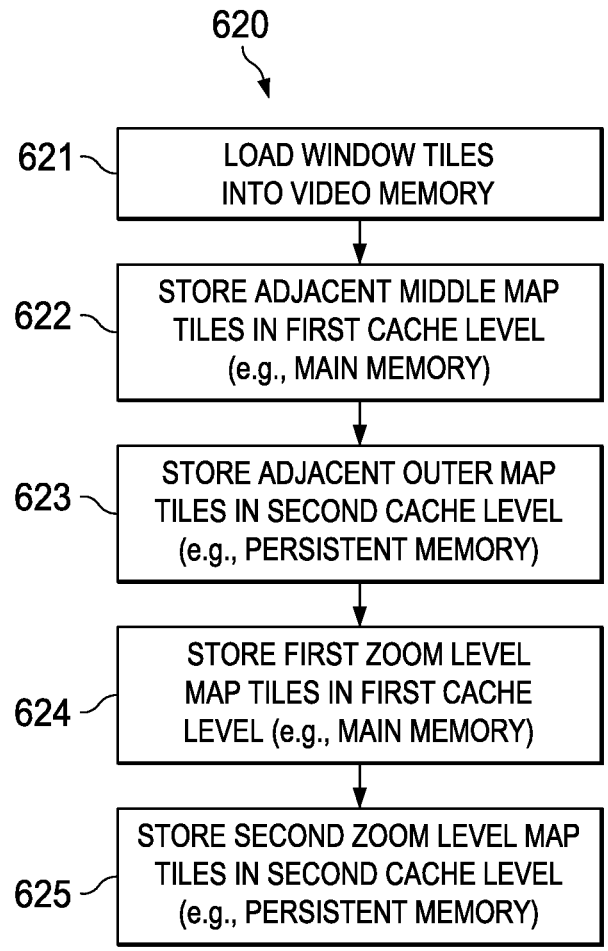
FIG. 28 is a simplified flowchart illustrating further example operations that may be associated with a location based display in accordance with embodiments of the present disclosure.

FIG. 28 illustrates example operational steps that may be associated with a flow 620 for storing received map tiles in appropriate cache levels (e.g., step 605 of flow 600). Once OBU 30 locates and downloads requested map tiles, the window tiles may be loaded into video memory 533 and drawn on the display screen at 620. At 622, adjacent middle map tiles (between middle ring 543 and inner ring 542) may be stored in a first cache level or main memory 535. At 623, adjacent outer map tiles (between outer ring 544 and middle ring 543) may be stored in a second cache level or persistent storage 537. At 624, map tiles at first zoom levels 562a and 562b may be stored in the first cache level or main memory 535. At 625, map tiles at second zoom levels 564a and 564b may be stored in the second cache level or persistent storage 537.

Figure 29:
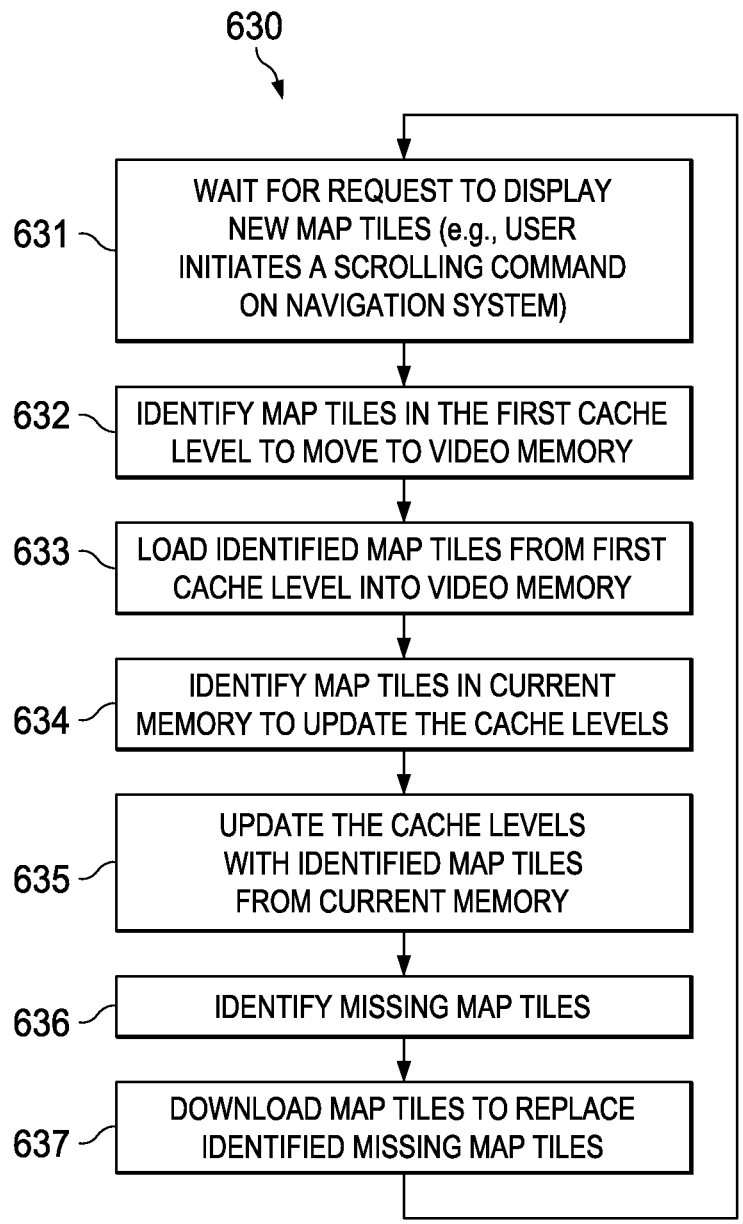
FIG. 29 is a simplified flowchart illustrating example operations that may be associated with scrolling on a location based display in accordance with embodiments of the present disclosure.

FIG. 29 illustrates example operational steps that may be associated with a flow 630 for responding to scrolling or panning requests by a user, along the x and/or y axes of the displayed map. In one example embodiment, flow 630 may be performed by map tiles scrolling and zooming module 531 of OBU 30. Flow 630 may begin at 631 where OBU 30 waits for a request from a user to display map tiles that may not be in the window tiles (e.g., the user initiates a scrolling command). At 632, map tiles in the first cache level or main memory 535 are identified to move into video memory. At 633, the identified map tiles from the first cache level are loaded into video memory and drawn on display screen 541. This resets the center of the displayed map and new map tiles may be in middle and outer rings 543 and 544, respectively.

At 634 map tiles are identified in current memory that may be used to update the first cache level (main memory 535) and the second cache level (persistent storage 537). For example, some of the map tiles from video memory (map tiles that were displayed and have been pushed out due to scrolling) and some map tiles from the second cache level (map tiles that have moved closer to the window due to scrolling) may be identified to update the first cache level. Similarly, some map tiles from the first cache level (map tiles that have moved farther away from the window due to scrolling) may be identified to update the second cache level. At 635, the first and second cache levels are updated with the identified map tiles.

At 636 missing map tiles from the first and second cache levels may be identified. The identified missing map tiles correspond to map tiles within geographic rings 540 overlaying the newly centered map. For example, as some map tiles in the second cache level move closer to the window, no other cached map tiles are available to replace them. Thus, at 637 the identified missing map tiles are downloaded from an available source (e.g., another vehicle, a roadside infrastructure device, a map provider in the Internet) and stored in the appropriate cache levels.

Figure 30:
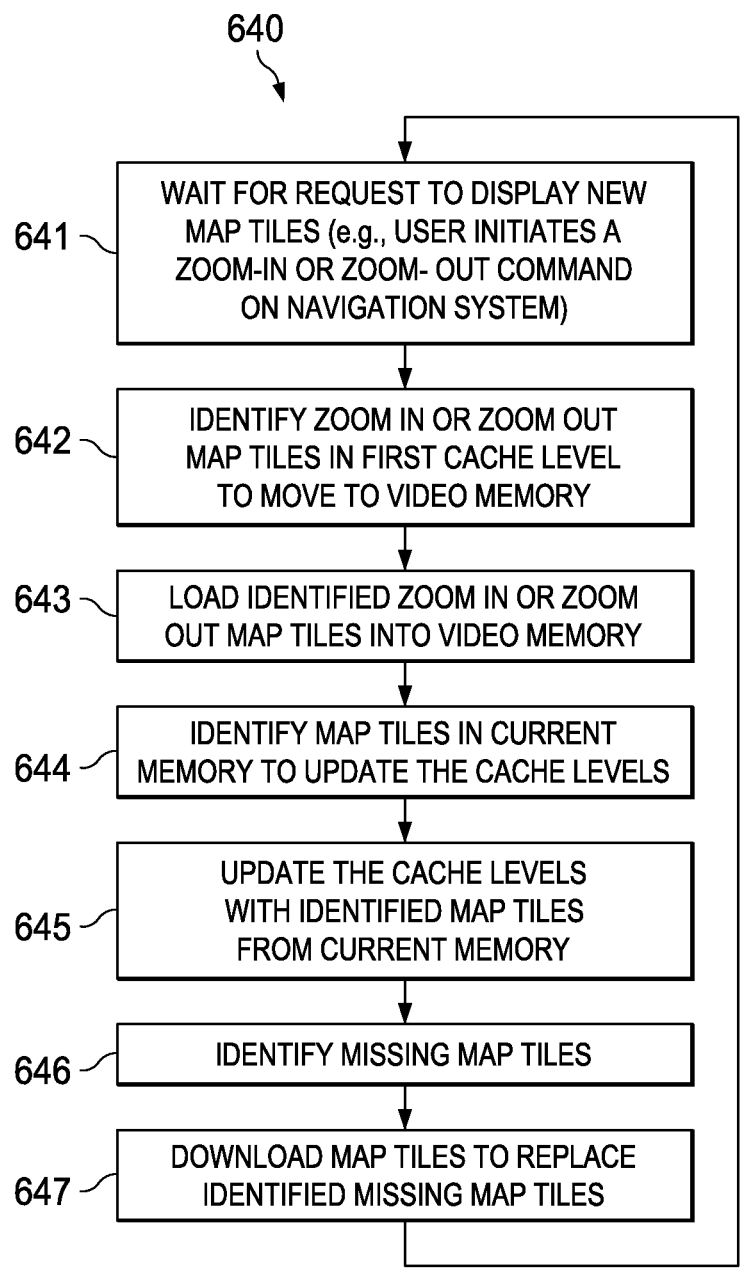
FIG. 30 is a simplified flowchart illustrating example operations that may be associated with zooming on a location based display in accordance with embodiments of the present disclosure.

FIG. 30 illustrates example operational steps that may be associated with a flow 640 for responding to zoom-in and zoom-out requests by a user, along the zoom axis of the displayed map. In one example embodiment, flow 640 may be performed by map tiles scrolling and zooming module 531 of OBU 30. Flow 640 may begin at 641 where OBU 30 waits for a request from a user to display map tiles that may not be in the window tiles (e.g., the user initiates a zoom command). At 642, map tiles in the first cache level or main memory 535 are identified to move into video memory 533. The identified map tiles may be more detailed first zoom level 562a or less detailed first zoom level 562b, depending on the type of zoom requested. At 643, the identified map tiles from the first cache level are loaded into video memory and drawn on display screen 541. This resets the current zoom level of the displayed map.

At 644 map tiles are identified in current memory that may be used to update the first cache level (main memory 535) and the second cache level (persistent storage 537). For example, if a user zooms in, map tiles at current zoom level 561 in video memory (map tiles that were displayed and have been pushed out due to zooming) and map tiles at second zoom level 564b in persistent storage 537 (map tiles that have moved closer to the window due to zooming) may be identified to update the first cache level. Additionally, map tiles in first zoom level 562a (map tiles that have moved farther away from the window due to scrolling) may be identified to update the second cache level. At 645, the first and second cache levels are updated with the identified map tiles.

At 646 missing map tiles from the first and second cache levels may be identified. The identified missing map tiles correspond to map tiles within zoom ring 565 overlaying the new current zoom level. For example, as some map tiles in the second cache level move closer to the window, no other cached map tiles are available to replace them. Thus, at 647 the identified missing map tiles are downloaded from an available source (e.g., another vehicle, a roadside infrastructure device, a map provider in the Internet) and stored in the appropriate cache levels.

Figure 31:
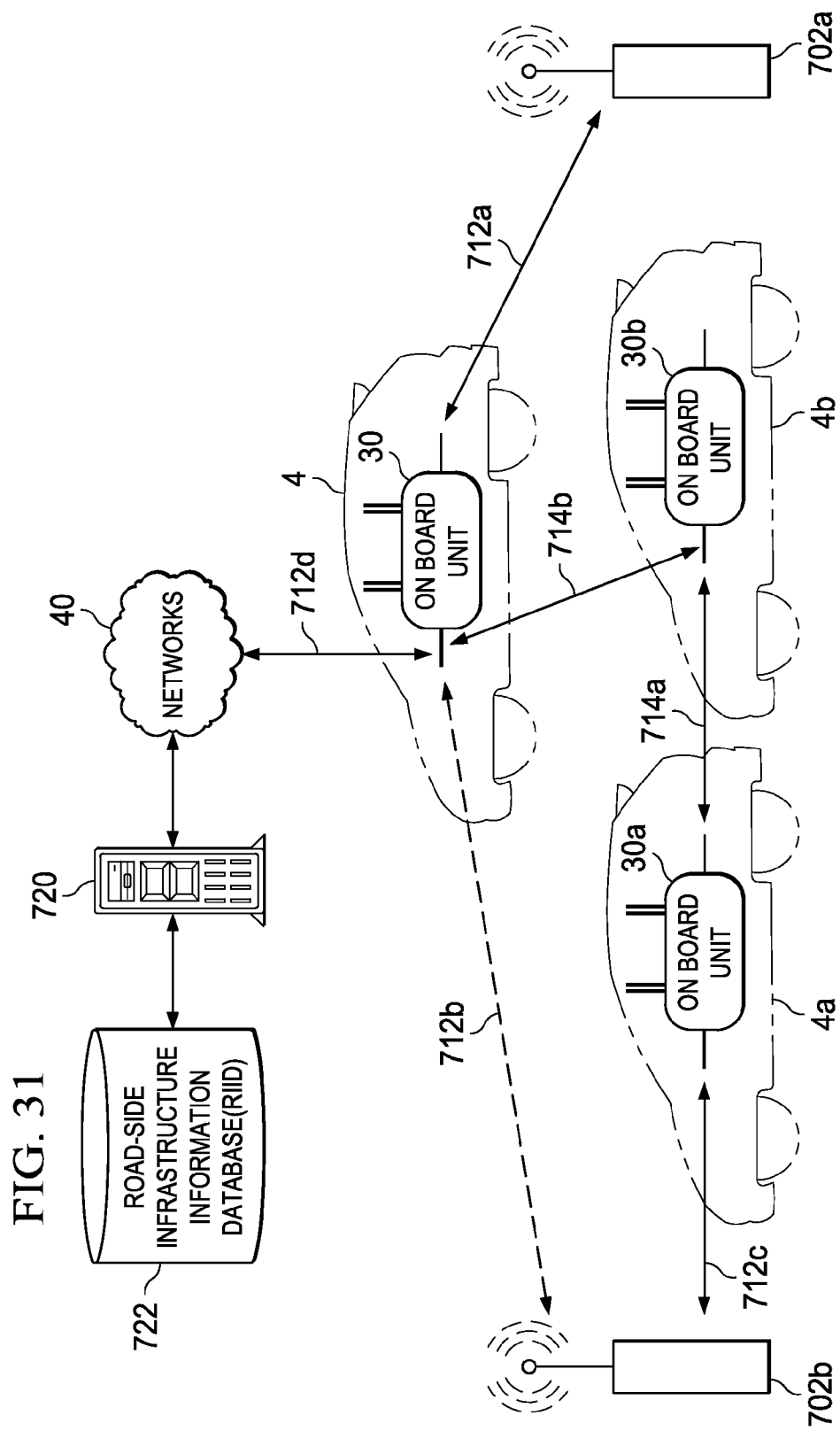
FIG. 31 is a simplified schematic diagram of an exemplary network environment illustrating possible discovery and routing scenarios that may be associated with embodiments of the present disclosure.

Turning to FIG. 31, FIG. 31 illustrates an exemplary vehicular network environment, with an embodiment of communication system 10 enabling opportunistic connections from OBU 30 of vehicle 4 to roadside infrastructure devices 702a and 702b and enabling geographical location assisted routing. By obtaining particular information such as global positioning system (GPS) locations, OBU 30 can perform faster, more efficient connections to roadside infrastructure devices along a particular route. Additionally, OBU 30 can evaluate one or more threshold parameters to determine whether to switch from directly communicating with a roadside infrastructure device to directly communicating with a different roadside infrastructure device or, alternatively, to communicating with a roadside infrastructure device via a multi-hop vehicular ad hoc network.

Although the embodiments described herein can be applied to any suitable roadside infrastructure devices and may be described generally with reference to roadside infrastructure devices, the embodiments are particularly advantageous for enabling OBUs to make more efficient connections to local infrastructure devices (e.g., WiFi access points (APs), Femto, Micro, and Pico base stations, etc.), which have shorter ranges of wireless communication than other roadside infrastructure devices. Although local infrastructure devices can have shorter wireless ranges, wireless communication using these devices may be preferred in some cases because, generally, they tend to be less expensive than other roadside infrastructure devices such as 3G and 4G base stations and satellites. In embodiments described herein, both OBUs and roadside infrastructure devices may be equipped with location tracking facilities such as a global positioning system (GPS).

In the embodiment shown in FIG. 31, OBU 30 can communicate via one or more wireless interfaces through networks 40 to access a roadside infrastructure information database (RIID) 722. An information server 720 may provide access to RIID 722, which can contain information and statistics related to roadside infrastructure devices. RIID entries may be indexed with global positioning system (GPS) locations of roadside infrastructure devices. OBU 30 may request information from RIID 722 related to roadside infrastructure devices along a particular route, such as roadside infrastructure devices 702a and 702b, and use this information to make more efficient connections to those devices. Information server 720 can be an information provider configured as a network element such as a server or any other suitable device, component, element, or object operable to exchange information in a network environment. Information server 720 and RIID 722 may be centralized or distributed and may collect updated information of roadside infrastructure devices in a global network.

In one example scenario explained with reference to FIG. 31, assume for simplicity that RIID 722 contains only information related to WiFi access points (APs) and the teachings herein are implemented to aid in opportunistic connections from vehicles to WiFi APs. A cellular wireless interface of OBU 30 could be used to either push or pull data associated with WiFi APs from RIID 722, because cellular coverage is generally more extensive. In a push-based implementation, information server 720 could periodically send (or push) information from RIID 722 to OBU 30. In a pull-based implementation, OBU 30 could periodically or at any other time initiated by a user, send a request to information server 720 for geographically relevant information from RIID 722.

In either of the push or pull-based implementations, location, direction, speed, and possibly destination point of vehicle 4, can be used by information server 720 to find and return a list of WiFi access points that vehicle 4 is likely to pass in the near future. In this particular scenario, the list of access points could include roadside infrastructure devices 702a and 702b (assuming they are WiFi access points). Another wireless interface of OBU 30 discovers, associates, and communicates with the WiFi access points. This other wireless interface can scan for a new WiFi access point based on the information provided by RIID 722 at an opportune time and/or location using specific access point information. Thus, discovering new access points along a route can be performed intelligently with information from RIID 722, providing distinct resource and time savings compared to customary periodic access point scanning without receiving information prior to scanning.

When vehicle 4 has a direct communication link 712a to roadside infrastructure device 702a, a predetermined threshold may be used to determine whether to switch vehicle 4 from being directly connected to roadside infrastructure device 702a to either being directly connected to another roadside infrastructure device (e.g., device 702b) or being connected through a multi-hop vehicular ad hoc network to a roadside infrastructure device (e.g., devices 702a or 702b). In one example, the predetermined threshold of link quality may be configured in terms of one or more of signal strength from vehicle 4 to roadside infrastructure device 702a, loss rate on infrastructure link 712a, and data rate on infrastructure link 712a. Additionally, OBU 30 may leverage information obtained from RIID 722 to help determine whether another infrastructure link can be established directly to new roadside infrastructure device 702b (e.g., if RIID information indicates new roadside infrastructure device 702b is nearby) or whether connectivity to new roadside infrastructure device 702b or current roadside infrastructure device 702a may need to be established via a peer link to another node in a vehicular ad hoc network.

With reference to the example scenario in FIG. 31, when vehicle 4 is physically close to roadside infrastructure device 702a, a signal strength from roadside infrastructure device 702a may be sufficient to allow OBU 30 to directly connect to roadside infrastructure device 702a via infrastructure link 712a. However, as OBU 30 moves farther away, the signal strength decreases and OBU 30 may not be able to sustain the direct infrastructure link 712a. Thus, at some point, OBU 30 may seek alternative connectivity options based on the threshold.

If another roadside infrastructure device 702b is within a wireless range of OBU 30, then OBU 30 may be received this information from RIID 722 and, therefore, can establish a new infrastructure link 712b to roadside infrastructure device 702b. In one embodiment, a different physical or virtual wireless interface of OBU 30 could be used to establish infrastructure link 712b, before or after infrastructure link 712a terminates. On the other hand, if a gap in coverage exists between roadside infrastructure devices 702a and 702b, and therefore, direct connectivity to roadside infrastructure devices 702a or 702b is not possible for a period of time, vehicle 4 may nevertheless want to find an alternative communication link in order to maintain continuous connectivity to the Internet. However, knowing this gap in coverage exists prevents unnecessary and wasteful scanning for wireless access points that are not currently available.

In this example, OBU 30 could join an ad hoc network by establishing a peer link 714b to OBU 30b. Connectivity to the Internet could be available from OBU 30 through peer link 714b to OBU 30b, peer link 714a to OBU 30a, and infrastructure link 712c to roadside infrastructure device 702b. When operating in ad hoc mode, at any point in time, OBU 30 may need to find a path to a destination node (e.g., another OBU or a roadside infrastructure device) through a potentially rapidly changing topology of cars. OBU 30 may route packets to other OBUs in the direction of the best roadside infrastructure device in its vicinity. Similarly, OBUs that act as intermediate hops (e.g., OBU 30a and OBU 30b) may continue to send/route packets from the source to the destination. Similar routing decisions may be made when packets are sent from the roadside infrastructure device towards OBU 30. Moreover, as OBU 30 travels along the road, the nearest roadside infrastructure device may be behind it or in front of it.

Deciding which roadside infrastructure device to route towards may depend on various factors such as mobility, speed, number of OBUs (node density), signal strength, time for the routing protocol to find a path, delay and bandwidth of the roadside infrastructure device, etc. In one embodiment, delay and bandwidth of the roadside infrastructure device may potentially be obtained from RIID 722.

In one embodiment, a current location of vehicle 4 can be provided by the vehicle's GPS, and a location (and other data) associated with nearby roadside infrastructure devices can be provided by RIID database 722. In other embodiments, OBU 30 could be preconfigured with or otherwise provided with a map having geographical coordinates of roadside infrastructure devices. In yet another embodiment, OBUs with infrastructure links to roadside infrastructure devices can determine a current/predicted location of the roadside infrastructure devices to which they are connected based on received signal strength information (RSSI) measurements. This information can be propagated to other vehicles within the vicinity, which could help them build their own topology information even when maps or RIID information is unavailable.

At any given time, OBU 30 can determine which direction to route packets so that the packets have a highest likelihood of reaching an optimal roadside infrastructure device. The optimal roadside infrastructure device could be the next roadside infrastructure device (e.g., device 702*b*) along the route vehicle 4 is traveling. Alternatively, the optimal roadside infrastructure device could be behind vehicle 4 (e.g., device 702*a*). In one example implementation, determining which roadside infrastructure device is 'optimal' can be a quality of service measure (e.g., most stable route). As vehicle 4 moves closer to device 702*b*, OBU 30 can leverage the information from RIID 722 to determine an opportune time and/or location to establish an infrastructure link with roadside infrastructure device 702*b*, thereby switching from ad hoc mode to station mode. Although OBU 30 can have multiple wireless interfaces, this switching is possible even if OBU 30 has a single wireless interface.

Any suitable routing algorithm may be used to find a path from vehicle 4 to roadside infrastructure device 702*b* (or gateway) through the network of mobile vehicles (e.g., 4*a* and 4*b*), whose coordinates may need to be discovered. Any routing algorithm that leverages GPS or coordinates to route packets and that converges quickly may be used. The disruption tolerant ad hoc network routing algorithm, which is shown and described herein, is one example routing protocol that may be suitable to use with these concepts.

Figure 32:
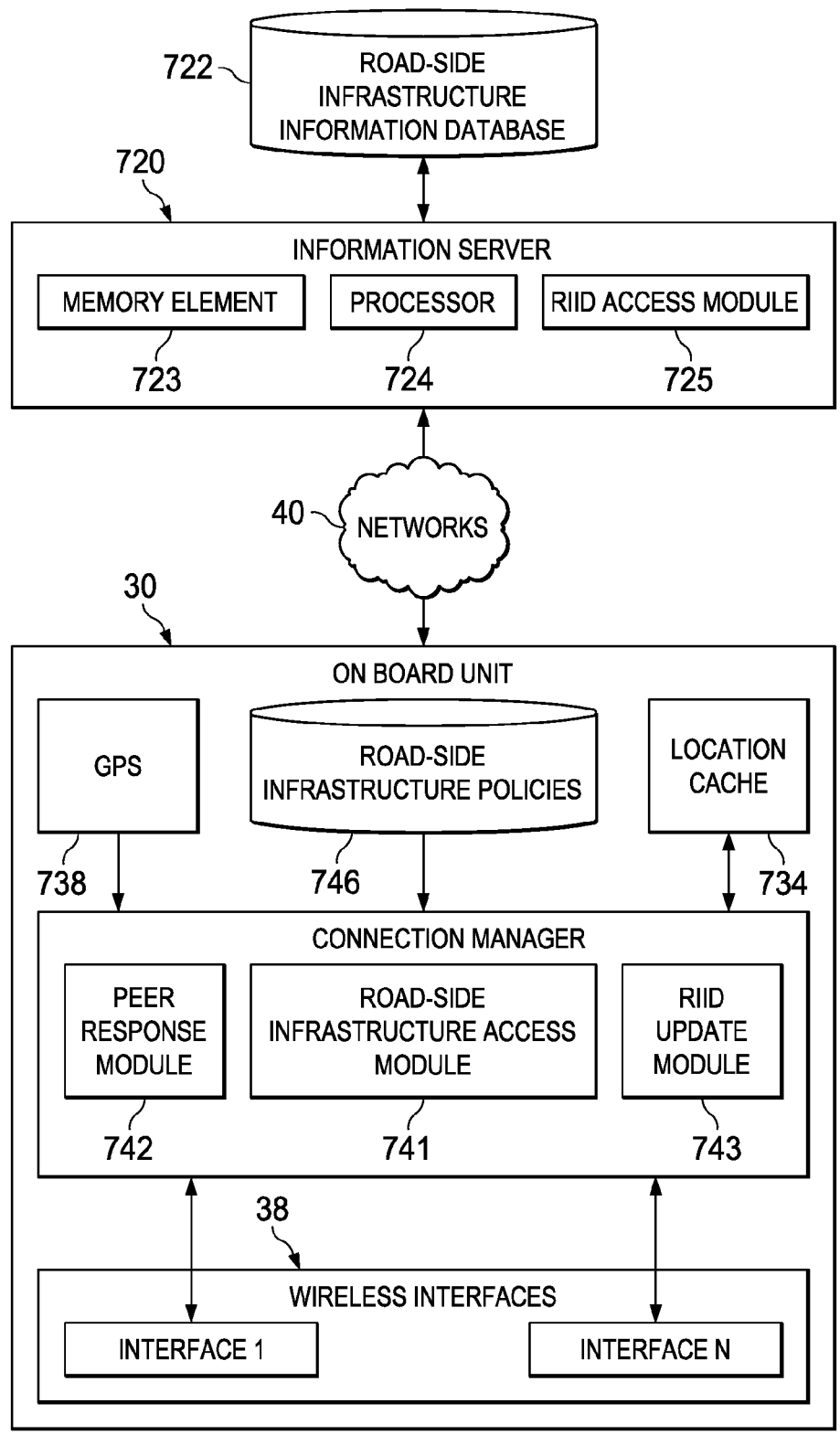
FIG. 32 is a simplified block diagram illustrating additional details that may be associated with an on board unit (OBU) of a vehicle and an information server in the communication system in accordance with embodiments of the present disclosure.

FIG. 32 illustrates additional details that may be associated with OBU 30 and information server 720 in an example embodiment of communication system 10. OBU 30 includes multiple wireless interfaces 38 (as previously described with reference to network interfaces 26), connection manager 65, a location cache 734, and a roadside infrastructure policies database 746. Wireless interfaces 38 may include multiple physical and/or virtual wireless interfaces, which can be associated with multiple roadside infrastructure devices and/or neighboring OBUs. OBU 30 also includes or is suitably connected to a GPS 738. In one example, GPS 738 could be part of navigation system 17. Connection manager 65 can include various modules such as roadside infrastructure access module 741, peer response module 742, and RIID update module 743. Information server 720 may include a memory element 723, a processor 724, and an RIID access module 725.

In one embodiment, information server 720 and RIID 722 reside in a cloud (i.e., any network accessible over the Internet) and may be collaboratively populated, pre-populated, or any suitable combination thereof. Collaboratively populating RIID 722, which may also be referred to as 'crowdsourcing', refers to many individual OBUs (e.g., OBU 30, 30*a*, and 30*b*) discovering roadside infrastructure devices and uploading associated information, along with a corresponding GPS location, to RIID 722. Pre-populating RIID 722 can be done by a service provider or other entity having knowledge and information of deployed roadside infrastructure devices and authorization to perform such updates.

RIID update module 743 can be configured to enable OBU 30 to populate RIID 722. Because this information is not generally time sensitive, such information could be uploaded through any opportunistic communication link to the Internet, without necessarily relying on more expensive communication links (e.g., 3G, 4G). Additionally, when connection manager 65 associates with an access point (or other types of roadside infrastructure devices having information included in RIID 722), delay and bandwidth measurements may be performed and this information can be included in communications sent to RIID 722. RIID 722 can use this information to appropriately save and remove records.

Database records in RIID 722 may include various information associated with roadside infrastructure devices. In one example implementation, each RIID entry for wireless access points (e.g., IEEE 802.11x APs) could include: latitude 1 (Lat1), longitude 1 (Lon1), latitude 2 (Lat2), longitude 2 (Lon2), Basic Service Set Identifier (BSSID), Extended Service Set Identifier (ESSID), provider, password/credentials, bandwidth (BW), delay, timestamp, and operating frequency channel. Additionally an RIID entry may also include: IP address, Internet connection indicator (e.g., binary indicator for connected or not connected to Internet), backhaul speed (i.e., speed at which the roadside infrastructure device is connected to the Internet), actual location or current estimated x-y coordinates possibly based on triangulation or other localization techniques (e.g., from received signal strength indicator (RSSI), time of flight, angle of arrival information, or any suitable combination thereof from multiple OBUs), link statistics experienced by different OBUs at particular locations and time along with an IP address of OBUs providing the updates, time of last update, record expiration time, and the like. In one implementation, record expiration time may be set to a default value (e.g., one week). In this implementation, if no new updates are received within the designated time period, then the record may be deemed stale and could be deleted or archived. RIID entries for roadside infrastructure devices with other wireless technologies (e.g., Femto/Micro/Pico base stations) could be similarly configured for those technologies.

In the example RIID 722 database record for wireless access points, Lat1, Lon1, Lat2, and Lon2 could represent outer perimeter locations on a road where wireless coverage (e.g., access point beacons) of the associated roadside infrastructure device can be detected. For example, for a particular direction a vehicle is driving along a particular road, Lat1 and Lon1 could represent a first location on the road that wireless coverage can be detected. Lat2 and Lon2 could represent a second location on the road where the wireless coverage ends. These two points could mark the start and end points of the wireless coverage for a particular direction of travel. For a vehicle traveling in an opposite direction along the same road, Lat2 and Lon2 could represent the starting point of wireless coverage and Lat1 and Lon1 could represent the ending point of wireless coverage.

BSSID is a globally unique identifier for an access point and ESSID is a human readable text associated with the access point. The provider field could include an identifier for the operator of the access point. If the access point is security enabled, then the password could be a string required to fulfill authentication. The BW field can indicate the expected bandwidth of the associated access point, for example, as based on previous measurements. The delay field can indicate the expected delay from the access point to a fixed known point on the Internet, and the frequency channel field can be the center frequency of the operating communication channel. Each record could also include a time stamp of the last time the information was updated.

Policies may be applied on both the OBU side and the RIID side. When RIID 722 receives a query for roadside infrastructure device information, policies may be implemented as filters on records. For example, location and time of the query may be applied as filters. In one example scenario, all access points of a first service provider could be filtered from responses sent to vehicles in California during the evening. Similarly, once OBU 30 receives a response with roadside infrastructure information, roadside infrastructure policies database 746 may be used to apply policies to control which roadside infrastructure devices are accessed by connection manager 65.

Connection manager 65 of OBU 30 can maintain location cache 734 including information associated with a list of roadside infrastructure devices that vehicle 4 is likely to pass in the near future. Roadside infrastructure access module 741 can update location cache 734 by sending requests to RIID 722 based on current location and route information of vehicle 4, which could be obtained from navigation system 17. Responses received from information server 720 with requested information from RIID 722 can be used to update local cache 734. At any location, connection manager 65 can select a roadside infrastructure device from location cache 734, based on connectivity requirements. Example connectivity requirements could be maximizing bandwidth or minimizing delay.

Figure 33:
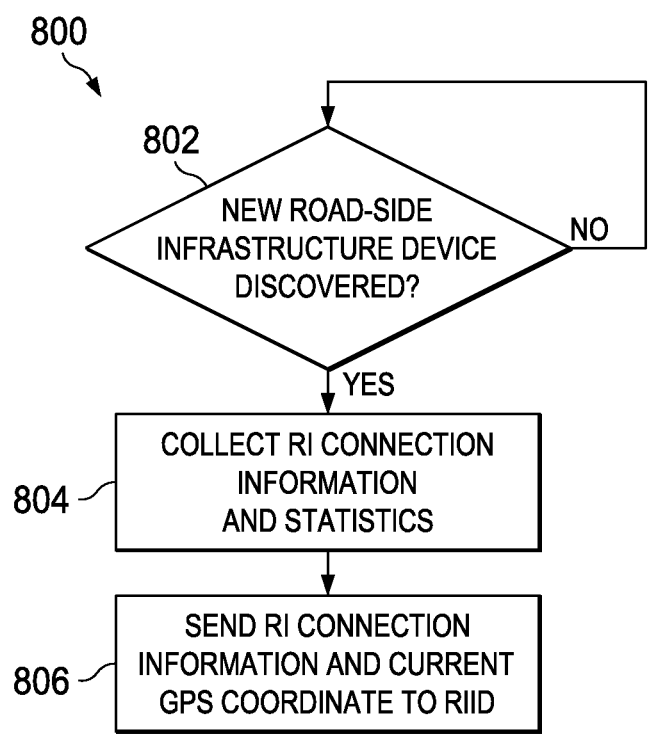
FIG. 33 is a simplified flowchart illustrating example operations that may be associated with discovery of roadside infrastructure devices in certain embodiments of the communication system in accordance with the present disclosure.

Turning to FIGS. 33 through 37, simplified flowcharts illustrate example operations that may be associated with discovery of roadside infrastructure devices and routing in certain embodiments shown and described in FIGS. 31 and 32. FIG. 33 illustrates example operations of an update flow 800 that may be performed by RIID update module 743 of connection manager 65. Update flow 800 enables collaborative discovery of roadside infrastructure devices and aggregation of collected data related to the devices. Update flow 800 may begin at 802 where it is determined whether a new roadside infrastructure device has been discovered by connection manager 65. If not, then the query continues until a new roadside infrastructure is discovered and flow passes to 804. At 804, roadside infrastructure connection information and statistics are collected. Finally, at 806 roadside connection information and current GPS coordinates can be sent to RIID via information server 720.

Figure 34:
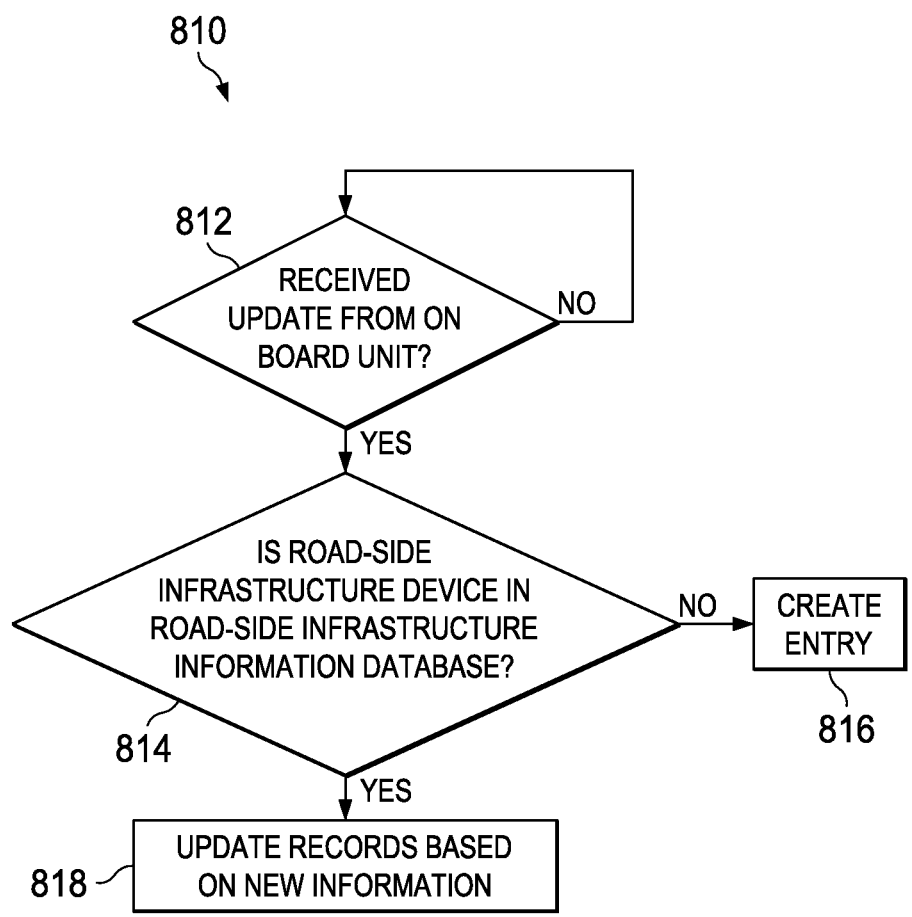
FIG. 34 is a simplified flowchart illustrating further example operations that may be associated with discovery of roadside infrastructure devices in certain embodiments of the communication system in accordance with the present disclosure.

FIG. 34 illustrates example operations of a flow 810 that may be performed by RIID access module 725 of information server 720. Flow 810 may begin at 812 where a determination is made as to whether an update has been received from OBU 30. If not, then the query continues until an update has been received and flow passes to 814. A determination is made at 814 as to whether a roadside infrastructure device in the received update is already in RIID 722. If not, then an entry is created at 816 for the new roadside infrastructure device. However, if the roadside infrastructure device is already in RIID 722, then records related to the roadside infrastructure device can be updated at 818 with the information received from OBU 30.

Figure 35:
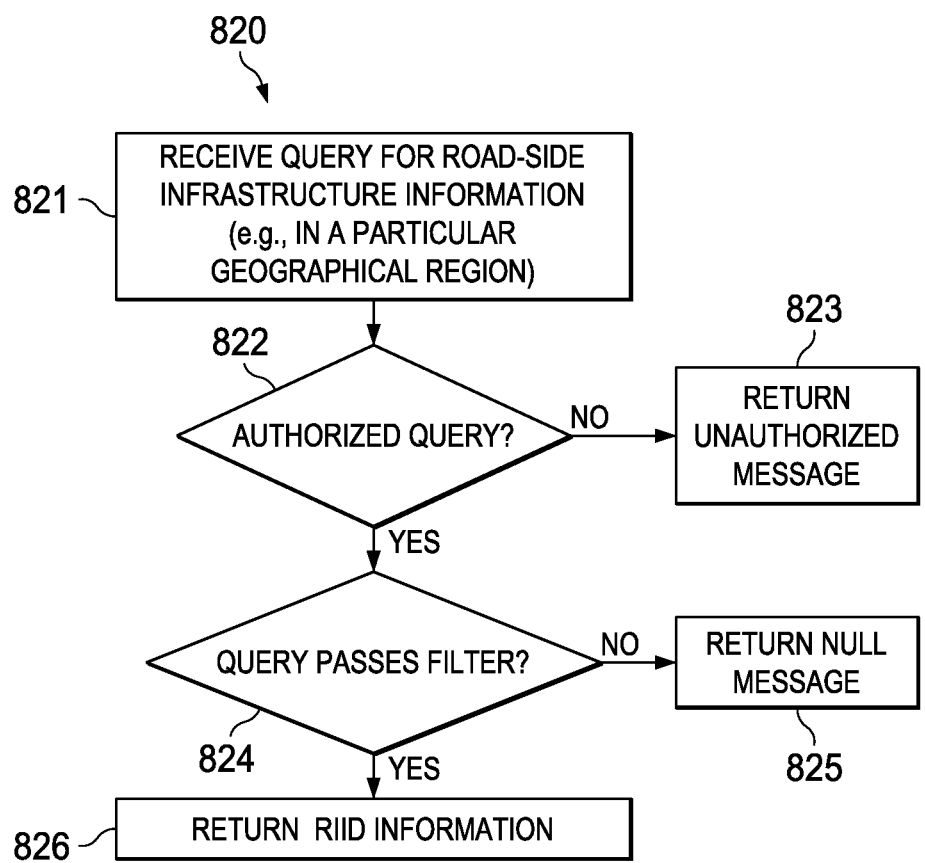
FIG. 35 is a simplified flowchart illustrating yet further example operations that may be associated with discovery of roadside infrastructure devices in certain embodiments of the communication system in accordance with the present disclosure.

FIG. 35 illustrates example operations of a flow 820 that may also be performed by RIID access module 725 of information server 720. Flow 820 may begin at 821 by receiving a query for roadside infrastructure information (e.g., in a particular geographical region, along a particular route, etc.) A determination is made at 822 as to whether the query is authorized. If not, then a message may be returned at 823 indicating the query is not authorized. If the query is authorized, then a determination may be made at 824 as to whether the query passes one or more filters (e.g., particular types of roadside infrastructure devices not provided in certain locations during certain times, etc.). If the query does not pass, then a null message may be returned at 825. If the query passes, however, then the requested RIID information may be returned to OBU 30 at 826.

Figure 36:
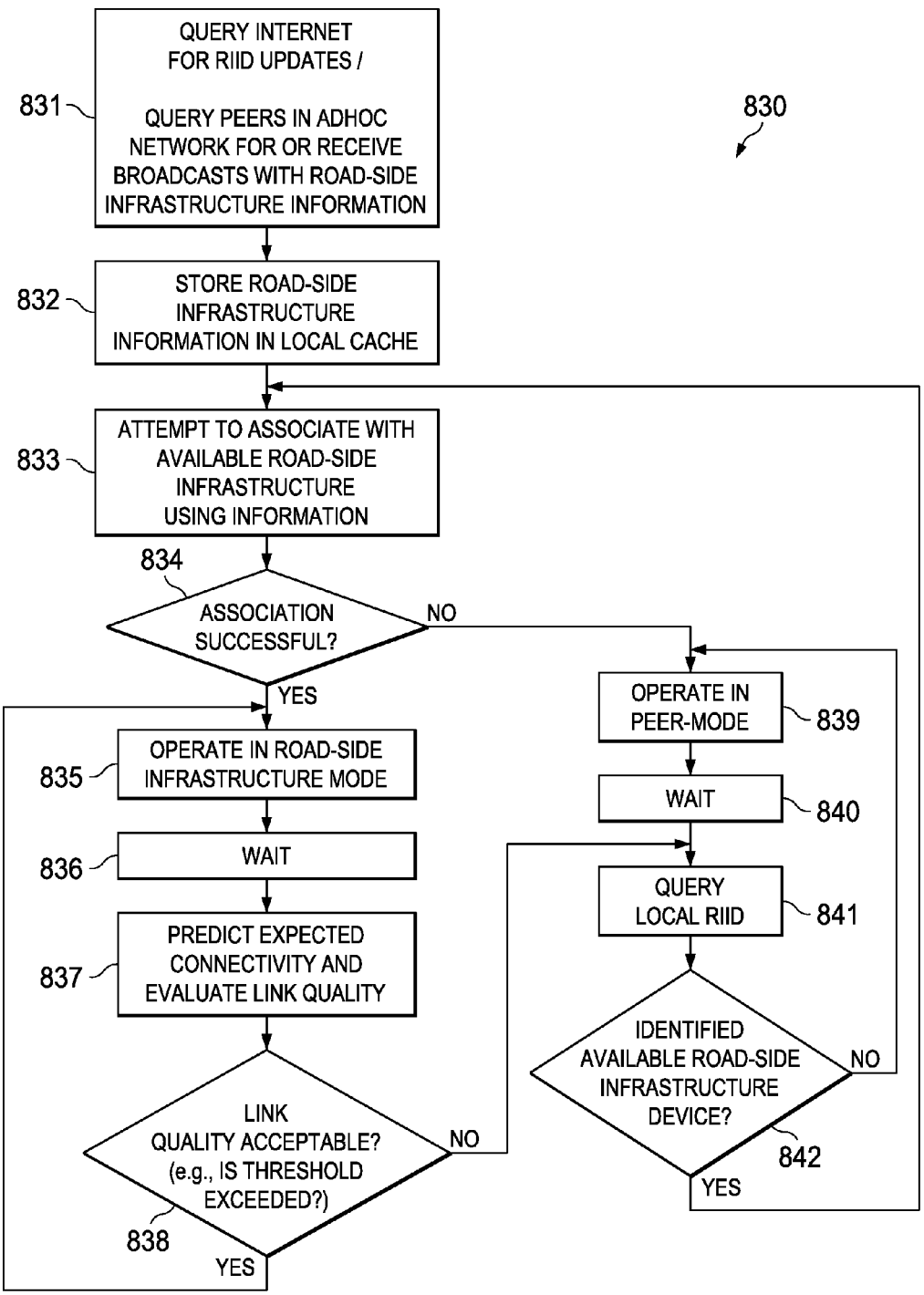
FIG. 36 is a simplified flowchart illustrating example operations that may be associated with possible modes of operation of vehicles in certain embodiments of the communication system in accordance with the present disclosure.

FIG. 36 illustrates example operations of a flow 830 that may be performed by roadside infrastructure access module 741 of connection manager 65. Flow 830 may begin at 831 by either querying the Internet for RIID updates, querying peers in a vehicular ad hoc network for roadside infrastructure information, or receiving broadcasts with roadside infrastructure information. Once roadside infrastructure information has been received, it may be stored at 832 in local cache 734 of OBU 30. An attempt to associate with available roadside infrastructure is made at 833, using the received information. A determination is made at 834 as to whether the association was successful. If the association was successful, OBU 30 may operate in roadside infrastructure mode at 835.

At 836, a wait may be imposed, the expected connectivity can be predicted, and link quality can be evaluated at 837. A determination is made at 838 as to whether the link quality is acceptable, which may be based on a predetermined threshold (e.g., signal strength, loss rate, and/or data rate). In one embodiment, the determination could be whether the predetermined threshold has been exceeded. If the threshold has not been exceeded, and therefore link quality is acceptable, then OBU 30 continues to operate in roadside infrastructure mode at 835. It will be apparent that threshold values could be configured in a way that the determination could be whether the link quality meets, exceeds, or falls below a defined threshold.

With reference again to 834, if the association of OBU 30 to an available roadside infrastructure device is not successful, OBU 30 may operate in peer mode at 839 if one or more peer links are established between OBU 30 and one or more peers, respectively. At 840, a wait may be imposed. After the wait has finished at 840, or if a link quality is not acceptable based on a threshold as determined at 838, the local RIID may be queried at 841. A determination is made at 842 as to whether an available roadside infrastructure device can be identified from local cache. If not, OBU 30 may continue to operate in peer mode at 839. However, if a roadside infrastructure device is identified at 842, then an attempt to associate with the identified available roadside infrastructure device can be made at 833 and flow continues as previously described.

While OBU 30 is operating in peer-mode, if a new roadside infrastructure device is detected and OBU successfully associates with the new device, then OBU 30 may update RIID 722 with information and statistics related to the new roadside infrastructure device. For example, OBU can perform measurements on link quality, obtain location coordinates, determine data and time information, and the like. OBU 30 can then send this information to Information server 720 to update RIID 722. OBU 30 may also update local cache 734.

Figure 37:
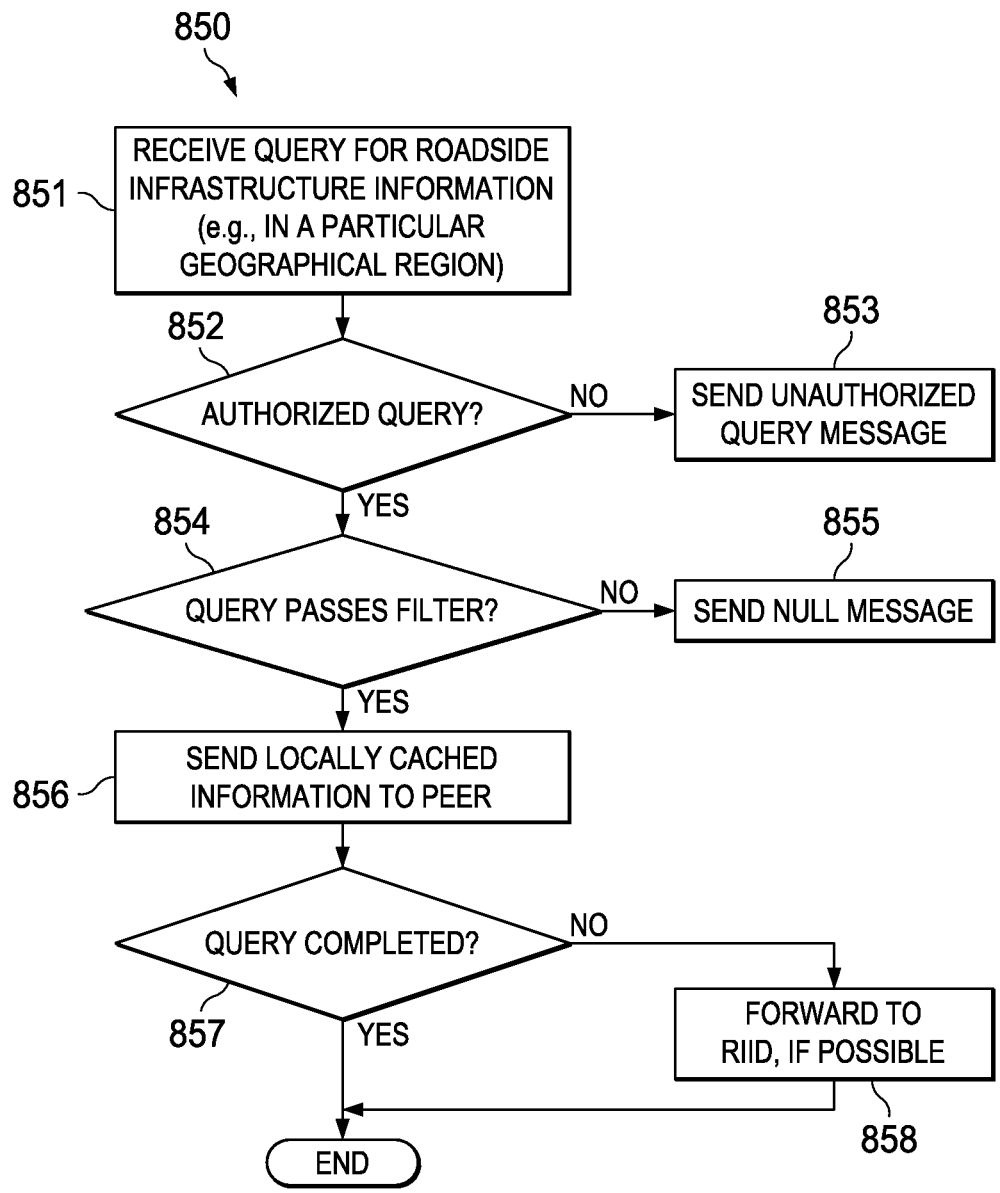
FIG. 37 is a simplified flowchart illustrating additional example operations that may be associated with discovery of roadside infrastructure devices in certain embodiments of the communication system in accordance with the present disclosure.

FIG. 37 illustrates example operations of a flow 850 that may be performed by peer response module 742 of connection manager 65. Flow 850 may begin at 851 by receiving a query from a peer (e.g., another OBU) for roadside infrastructure information (e.g., in a particular geographic region, along a particular route, etc.). The query may originate from a peer, or from another node such as an OBU, that is multiple hops away. A determination is made at 852 as to whether the query is authorized. If not, then a message may be returned to the requesting node at 853, indicating the query is not authorized. If the query is authorized, then a determination may be made at 854 as to whether the query passes one or more filters (e.g., particular types of roadside infrastructure devices not provided in certain locations during certain times, etc.). If not, then a null message may be returned to the requesting node at 855. If the query passes, however, then locally cached information may be sent to the requesting node at 856. If the requesting node is more than 1-hop away from OBU 30, then OBU 30 may use appropriate routing protocols, such as those described herein, to route the information to the requesting node.

A determination is made at 857 as to whether the query was completed. If the query was not completed, then it may be forwarded at 858 to information server 720 to query RIID 722, if possible. Once the unfulfilled query has been forwarded to the Internet, or if the query was completed at 857, flow 850 may end.

Turning to FIG. 38, FIG. 38 illustrates an exemplary vehicular network environment, with an embodiment of OBU 30 enabling automatic discovery and selection of mobility schemes. OBU 30, or any other mobile access point, may be configured to support multiple mobility protocols, to automatically discover a mobility stack and capabilities of an endpoint device, and to adjust mobility services accordingly. According to embodiments disclosed herein, OBU 30 can enable an endpoint IP device to maintain its native or original mobility scheme while benefiting from connectivity services of OBU 30. Although the embodiments described herein are described with reference to on-board unit (OBU) 30 in a vehicular environment, the features and teachings related to automatic discovery and selection of mobility schemes could be applied to any network mobility device, mobile router, or other mobile access point in any suitable network environment in which mobility schemes are employed.

In FIG. 38, a mobility aware endpoint device 910 and a mobility unaware endpoint device 911 may be connected to OBU 30 in order to use services of OBU 30 to access Internet 100. With the plurality of wireless interfaces 38 on OBU 30, multiple communication links can be established to Internet 100 via various roadside infrastructure devices such as, for example, WiFi access point 102a and base stations 102b and 102c. In this embodiment, mobility manager 33 of OBU 30 includes gateway module 70 and mobility module 71 to offer mobility services to connected endpoint devices 910 and 911 in accordance with mobility schemes provided on the connected endpoint devices 910 and 911.

In addition, a mobile device 913 may also access OBU 30, but may be located outside of vehicle 4 and may have other connections to roadside infrastructure, such as WiFi access point 102a. Mobility services of OBU 30 accommodating both mobility aware and mobility unaware endpoint devices may also be provided to endpoint device 913.

Other vehicles may also be connected to Internet 100 via roadside infrastructure devices. For example, vehicle 4a with OBU 30a may be connected to Internet 100 via roadside infrastructure device 102b. OBU 30a may also be connected to a mobility aware endpoint device 910a and a mobility unaware endpoint device 911a.

As used herein, the term 'endpoint device' can be any mobile device, end user device, or in-vehicle device. An endpoint device is considered 'mobility aware' if it has a mobility scheme such as, for example, Mobile IP. An endpoint device is considered 'mobility unaware' if it does not have its own mobility scheme and implements a legacy IP stack 915, as illustrated in FIG. 38. Consequently, a mobility unaware endpoint device may rely on another device such as a mobile router, for mobility services. On the other hand, mobility aware device 910 could be a handheld device such as a cell phone that has its own mobility scheme such as mobile IP, and may prefer to continue to use its own mobility services when connected to the infrastructure through OBU 30.

In one embodiment, OBU 30 can detect mobility capabilities of a connected endpoint device by inspecting the device's traffic. Typically, mobility protocols use special port numbers for control and data messages. For instance, Mobile IP uses port number 434 for control messages, while another mobility scheme, Cisco® Locator/Identifier Separation Protocol (LISP) uses 4342 for control messages and 4341 for data messages. By inspecting the connected endpoint device's traffic and detecting protocol specific properties such as destination port, OBU 30 can infer the mobility scheme used by the connected endpoint device.

In one example scenario, mobility unaware endpoint device 911 could be a user's laptop that does not have its own mobility scheme. Thus, the laptop may opt in to services provided by OBU 30, such as IP connectivity and mobility support, including transport continuity, in order to hide the mobility events and seamlessly run IP-based applications in a mobile environment. In particular, mobility module 71 of OBU 30 could offer one or more of the following services to mobility unaware device 911: 1) provisioning endpoint device 911 with a layer 3 (L3) address, 2) acting as a default gateway (router) for packets to/from endpoint device 911, 3) supporting network address translation (NAT) functionality if the provisioned L3 address is from a private address space, and 4) implementing and operating the mobility protocol on behalf of endpoint device 911.

When provisioning mobility unaware endpoint device 911 with an L3 address, mobility module 71 may have the capability to cover both IPv4 and IPv6. Additionally, if endpoint device 911 is incompatible with a default IP version of OBU 30, OBU 30 may be configured to accommodate endpoint device 911 by, for example, supporting native dual stack functionality, external proxy, or NAT with protocol translation. Implementing and operating the mobility protocol on behalf of endpoint device 911 includes maintaining a state of the protocol and addressing requirements (e.g., updating the mapping system, notifying the corresponding node when a handover happens, etc.) on behalf of mobility-unaware endpoint device 911.

In another example scenario, mobility aware endpoint device 910 could be a user's mobile cellular phone that includes a mobility scheme such as Mobile IP. OBU 30 could detect and identify the mobility scheme or protocol of endpoint device 910 and then OBU could self adapt its services accordingly. For instance, OBU 30 could reflect mobility events to endpoint device 910, such that endpoint device 910 could activate its own mobility procedures and re-establish its state appropriately. In particular, gateway module 70 of OBU 30 could offer one or more of the following services to mobility aware device 910: 1) if the service provider allows for multiple DHCP requests, acting as a gateway allowing endpoint device 910 to obtain its L3 address from a service provider, and 2) if the service provider does not allow multiple DHCP requests, provisioning endpoint device 910 with an L3 address, acting as a default gateway (router) for packets to/from endpoint device 910, and supporting NAT functionality.

When provisioning mobility aware endpoint device 910 with an L3 address when the service provider does not allow multiple DHCP requests, gateway module 71 may have the capability to cover both IPv4 and IPv6. Additionally, if endpoint device 910 is incompatible with a default IP version of OBU 30, OBU 30 may be configured to accommodate endpoint device 910 by, for example, supporting native dual stack functionality, external proxy, or NAT with protocol translation. Finally, DHCP service can reflect mobility events (handovers) to mobility aware endpoint device 910 such as, for example, forcing new registration or changing a leased address.

FIG. 39 is a simplified flow 930 illustrating example operations that may be associated with determining mobility capabilities of an endpoint device. Flow 930 may begin at 931 where OBU 30 receives an endpoint device's network traffic. OBU 30 may inspect the endpoint device's network traffic at 932. By inspecting the endpoint device's network traffic and detecting protocol specific properties (e.g., a destination port), OBU 30 can infer the existence of a mobility scheme on the endpoint device. If the endpoint device is determined at 933 to be mobility aware, then at 935 the mobility scheme is inferred from the protocol specific properties. For example, if port 434 is being used for control messages, then it can be inferred that the endpoint device is using Mobile IP as its mobility scheme. Gateway module 70 can then adapt mobility services to accommodate the inferred mobility scheme of the endpoint device at 936. If the endpoint device is determined at 933 to be mobility unaware (i.e., a mobility scheme was not detected on the endpoint device), then mobility module 71 can provide mobility services to the endpoint device at 934. Mobility module 71 can also hide mobility events from the endpoint device at 934.

FIG. 40 is a simplified flow 940 illustrating example operations that may be associated with accommodating a mobility aware endpoint device. Flow 940 may begin at 941 where a determination is made as to whether a service provider allows multiple DHCP requests. If the service provider does allow multiple requests, then at 942 the mobility aware endpoint device is enabled to obtain an L3 address from the service provider. Flow then passes to 946, where OBU 30 acts as a default gateway for and reflects mobility events to the mobility aware endpoint device.

If the service provider does not allow multiple DHCP requests, however, a determination may be made at 943 as to whether the mobility aware endpoint device is compatible with OBU 30 (or whatever mobile access point is making the determination). If they are not compatible, then at 944 OBU 30 may provide services to the endpoint device to enable compatibility (e.g., native dual stack, external proxy, NAT with protocol translation). After services are provided at 944, or if endpoint device is compatible with OBU 30, then the endpoint device may be provisioned with an L3 address at 945. OBU 30 can then act as a default gateway for and reflect mobility events to the mobility aware endpoint device at 946.

In certain implementations and numerous examples provided herein, vehicle 4 is described with reference to an automobile. Communication system 10, however, is not limited to automobiles, but can be applied to a myriad of other types of vehicles (e.g., airplanes, boats, trains, etc.). It will be appreciated that the broad teachings disclosed herein are intended to include any type of vehicle used to move from one location to another location, including vehicles that are not designed to transport humans.

In the FIGURES and Specification of the present disclosure, references are made to various embodiments of OBU 30. References to other OBUs 30*a-h* are also intended to represent various embodiments or combinations of embodiments of OBU 30. Depending on particular needs and implementations, OBU 30, and therefore, OBUs 30*a-h*, may include one or more of the embodiments shown and described herein.

Elements of FIG. 1, and elements of other FIGURES illustrated herein depicting various embodiments of communication system 10 and associated network environments, may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs.

In one example implementation, the on-board unit (OBU) (e.g., OBUs 30 and 30*a-h*), controllers, and servers (e.g., GLS 80, information server 720, data collector 507) are network elements that facilitate or otherwise help coordinate the activities disclosed herein associated with a vehicular network environment. As used herein, the term 'network element' is meant to encompass computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

OBU 30, controllers, servers, and other associated or integrated components can include one or more memory elements (e.g., memory element 24, local storage 39, routing option table 64, vehicle location information database 86, memory element 82, vehicle directories 325*a-c*, collected sensor data database 508, video memory 533, main memory 535, persistent storage 537, RIID 722, memory element 723, local cache 734, roadside infrastructure policies database 746) for storing information to be used in achieving operations associated with the routing, mobility, application services, data exchange, discovery, sensing, and other activities, as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory or storage options discussed herein should be construed as being encompassed within the broad term 'memory element' as used herein in this Specification.

In example embodiments, the operations as outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 24, memory element 82, memory element 723, etc.) can store data used for the operations described herein. This includes the memory elements being able to store software, logic, code, or processor instructions that are executed to carry out the activities described in this Specification.

Additionally, OBU 30 and associated or integrated components may include processing elements 21 (e.g., computing processor 22, routing processor 23, processor 84, processor 724, etc.) that can execute software or algorithms to perform activities to enable routing, mobility, application services, discovery, sensing, and other functions described herein. A processor can execute any type of instructions associated with the data to achieve the operations detailed herein in this Specification. In one example, the processors (as shown in various FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term 'processor.'

In example implementations, at least some portions of the routing, mobility, application services, discovery, sensing, and other activities outlined herein may be implemented in software in, for example, the OBU, servers, and/or controller. In some embodiments, one or more of these features may be implemented in hardware, provided external to these elements, or consolidated in any appropriate manner to achieve the intended functionality. The OBU, controllers, and servers may include software (or reciprocating software) that can coordinate in order to achieve the operations, as outlined herein. In still other embodiments, any of these elements may include any suitable algorithms, hardware, software, components, modules, interfaces, or objects that facilitate the operations thereof. Furthermore, OBUs, controllers, and servers described and shown herein may also include suitable interfaces for receiving, transmitting, and/or otherwise communicating data or information in a network environment. Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements or other components. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims;

and (b) does not intend, by any statement in the specification, to limit this disclosure in any way that is not otherwise reflected in the appended claims.

What is claimed is:

1. A method, comprising:
receiving, by a processor of a mobile access point, network traffic associated with a first endpoint device;
discovering a mobility capability of the first endpoint device by inspecting the network traffic and identifying one or more protocol specific properties of the network traffic;
inferring a type of mobility scheme on the first endpoint device based on the one or more protocol specific properties identified from the network traffic;
adjusting a first set of mobility services of the mobile access point according to the protocol specific properties of the mobility capability of the first endpoint device, wherein the first set of mobility services includes reflecting a mobility event to the first endpoint device to re-establish a first endpoint device state based on the mobility scheme on the first endpoint device;
discovering a second endpoint device lacks mobility capabilities based on inspecting other network traffic associated with the second endpoint device;
establishing, on the mobile access point, a second endpoint device state based on discovering the second endpoint device lacks mobility capabilities; and
providing a second set of mobility services of the mobile access point to the second endpoint device including hiding mobility events from the second endpoint device.

2. The method of claim 1, wherein the mobility event includes at least one of forcing a new registration or changing a leased address.

3. The method of claim 1, wherein the inspecting includes detecting a destination port of the network traffic.

4. The method of claim 1, wherein the first set of mobility services includes enabling the first endpoint device to get a layer 3 (L3) address from a service provider if the service provider allows multiple dynamic host configuration protocol (DHCP) requests.

5. The method of claim 1, wherein the first set of mobility services includes provisioning first the endpoint device with a layer 3 (L3) address based on determining a service provider does not allow multiple dynamic host configuration protocol (DHCP) requests.

6. The method of claim 1, further comprising:
receiving the other network traffic from the second endpoint device.

7. At least one non-transitory computer readable media including code for execution that, when executed by at least one processor, is operable to perform operations comprising:
receiving network traffic associated with a first endpoint device;
discovering a mobility capability of the first endpoint device by inspecting the network traffic and identifying one or more protocol specific properties of the network traffic;
inferring a type of mobility scheme on the first endpoint device based on the one or more protocol specific properties identified from the network traffic;
adjusting a first set of mobility services of a mobile access point according to the protocol specific properties of the mobility capability of the first endpoint device, wherein the first set of mobility services includes reflecting a mobility event to the first endpoint device to re-establish a first endpoint device state based on the mobility scheme on the first endpoint device;
discovering a second endpoint device lacks mobility capabilities based on inspecting other network traffic associated with the second endpoint device;
establishing, on the mobile access point, a second endpoint device state based on discovering the second endpoint device lacks mobility capabilities; and
providing a second set of mobility services of the mobile access point to the second endpoint device including hiding mobility events from the second endpoint device.

8. The at least one non-transitory computer readable media of claim 7, wherein one of the one or more protocol specific properties is a destination port of the network traffic.

9. The at least one non-transitory computer readable media of claim 7, wherein the first set of mobility services includes enabling the first endpoint device to get a layer 3 (L3) address from a service provider if the service provider allows multiple dynamic host configuration protocol (DHCP) requests.

10. The at least one non-transitory computer readable media of claim 7, wherein the second set of mobility services includes provisioning the first endpoint device with a layer 3 (L3) address.

11. The at least one non-transitory computer readable media of claim 7, wherein the code for execution, when executed by the at least one processor, is operable to perform further operations comprising:
receiving the other network traffic from the second endpoint device.

12. An apparatus, comprising:
a mobility manager; and
at least one processor operable to execute instructions associated with the mobility manager to perform operations to:
receive network traffic associated with a first endpoint device;
discover a mobility capability of the first endpoint device by inspecting the network traffic and identifying one or more protocol specific properties of the network traffic;
determine the endpoint device has a mobility scheme based on the inspecting;
infer a type of mobility scheme on the first endpoint device based on the one or more protocol specific properties identified from the network traffic;
adjust a first set of mobility services of the apparatus according to the protocol specific properties of the mobility capability of the first endpoint device, wherein the first set of mobility services includes reflecting a mobility event to the first endpoint device to re-establish a first endpoint device state based on the mobility scheme on the first endpoint device;
discover a second endpoint device lacks mobility capabilities based on inspecting other network traffic associated with the second endpoint device;
establish a second endpoint device state based on discovering the second endpoint device lacks mobility capabilities; and
provide a second set of mobility services of the apparatus to the second endpoint device including hiding mobility events from the second endpoint device.

13. The apparatus of claim 12, wherein the inspecting includes detecting a destination port of the network traffic.

14. The apparatus of claim 12, wherein the at least one processor is operable to execute the instructions to perform further operations to:
  receive the other network traffic from the second endpoint device.

15. The method of claim 1, wherein the second set of mobility services includes providing a mobility protocol on behalf of the second endpoint device.

16. The at least one non-transitory computer readable media of claim 7, wherein the second set of mobility services includes providing a mobility protocol on behalf of the second endpoint device.

17. The apparatus of claim 12, wherein the second set of mobility services includes providing a mobility protocol on behalf of the second endpoint device.

* * * * *